United States Patent [19]

Chen et al.

[11] Patent Number: 5,673,156
[45] Date of Patent: Sep. 30, 1997

[54] HARD DISK DRIVE SYSTEM HAVING VIRTUAL CONTACT RECORDING

[75] Inventors: Tu Chen, Monte Sereno; Tsutomu Tom Yamashita, Milpitas; Kyou H. Lee, San Jose; Yasuo Sakane, Cupertino, all of Calif.

[73] Assignee: Komag, Inc., Milpitas, Calif.

[21] Appl. No.: 390,909

[22] Filed: Feb. 17, 1995

Related U.S. Application Data

[63] Continuation of Ser. No. 80,339, Jun. 21, 1993, abandoned.

[51] Int. Cl.⁶ ............................. G11B 17/00; G11B 21/21
[52] U.S. Cl. ......................................... 360/97.01; 360/103
[58] Field of Search ........................... 360/97.01, 97.03, 360/98.01, 102, 103, 104, 135

[56] References Cited

U.S. PATENT DOCUMENTS

| | | | |
|---|---|---|---|
| 3,855,625 | 12/1974 | Garnier et al. | 360/103 |
| 4,218,715 | 8/1980 | Garnier | 360/103 |
| 4,386,162 | 5/1983 | Beall | 501/3 |
| 4,549,238 | 10/1985 | Ertingshausen | 360/103 |
| 4,673,996 | 6/1987 | White | 360/103 |
| 4,833,001 | 5/1989 | Kijima et al. | 428/141 |
| 4,839,756 | 6/1989 | Chew et al. | 360/105 |
| 4,870,519 | 9/1989 | White | 360/103 |
| 4,898,774 | 2/1990 | Yamashita et al. | 428/336 |
| 4,929,500 | 5/1990 | Yamashita et al. | 428/336 |
| 4,933,785 | 6/1990 | Morehouse et al. | 360/78.04 |
| 5,010,429 | 4/1991 | Taguchi et al. | 360/103 |
| 5,029,317 | 7/1991 | Kawai et al. | 360/131 |
| 5,045,165 | 9/1991 | Yamashita et al. | 204/192.16 |
| 5,052,099 | 10/1991 | Taguchi et al. | 29/603 |
| 5,055,359 | 10/1991 | Tsuno et al. | 428/448 |
| 5,063,464 | 11/1991 | Astheimer et al. | 360/104 |
| 5,079,657 | 1/1992 | Aronoff et al. | 360/103 |
| 5,082,709 | 1/1992 | Suzuki et al. | 428/64 |
| 5,087,481 | 2/1992 | Chen et al. | 427/129 |
| 5,094,897 | 3/1992 | Morita et al. | 428/64 |
| 5,097,368 | 3/1992 | Lemke et al. | 360/97.02 |
| 5,128,822 | 7/1992 | Chapin et al. | 360/103 |
| 5,180,640 | 1/1993 | Yamashita et al. | 428/611 |

FOREIGN PATENT DOCUMENTS

| | | |
|---|---|---|
| 0 090 055 A1 | 10/1983 | European Pat. Off. . |
| 0441611 | 8/1991 | European Pat. Off. ............... 360/103 |
| 42 00 350 A1 | 7/1992 | Germany . |

(List continued on next page.)

OTHER PUBLICATIONS

Williams, et al. "An Analytical Model of the Write Process in Digital Magnetic Recording", 17th Annu. AIP Conf. Proc., Part 1, No. 5, 1971, pp. 738–742

(List continued on next page.)

*Primary Examiner*—Stuart S. Levy
*Assistant Examiner*—William J. Klimowicz
*Attorney, Agent, or Firm*—Skjerven, Morrill, MacPherson, Franklin & Friel

[57] ABSTRACT

A hard disk drive utilizing a combination of thin film recording heads and media allows high density recording through virtual contact recording, while still providing excellent contact start stop performance and low stiction. The air bearing surface of the head has a microscopically fine texture which provides reliable mechanical performance with a constant and very low flying height. A skew insensitive constant flying height over the disk surface can be provided with the use of transverse pressure contour or cross-cut slider designs. The slider air bearing surface is textured by selective mechanical removal of subsurface damaged regions left behind during the diamond lapping of the slider air bearing surface, thereby leaving the slider less abrasive to the disk. A slider with this fine texture on the air bearing surface permits the use of a much smoother texture and thinner overcoat on the disk than currently possible using conventional sliders. This combination of slider and the disk allows the head to fly very close to the magnetic layer of the media without suffering from head crash or high stiction. This combination offers a low cost and simplified method of achieving a high recording density.

52 Claims, 25 Drawing Sheets

FOREIGN PATENT DOCUMENTS

| | | | |
|---|---|---|---|
| 5423517 | 2/1979 | Japan | 360/103 |
| 63-209082 | 8/1988 | Japan | 360/103 |
| 1311484 | 12/1989 | Japan | 360/103 |
| 2281485 | 11/1990 | Japan | 360/103 |
| 3232174 | 10/1991 | Japan | 360/103 |
| 4-32080 | 2/1992 | Japan | 360/103 |
| 4-76875 | 3/1992 | Japan | 360/103 |
| 4139621 | 5/1992 | Japan | 360/103 |
| 4163774 | 6/1992 | Japan | 360/103 |
| 5128468 | 5/1993 | Japan | 360/103 |

OTHER PUBLICATIONS

Marchon, et al. "Significance of Surface Roughness Measurements. Application to the Tribology of the Head/Disc Interface", Tribology and Mechanics of Magnetic Storage Systems VI, ASLE SP-26, p. 71, 1990.

Lee, et al. "Effect of Disk Cross Hatch Texture on Tribological Performance", IEEE Transactions on Magnetics, vol. 28, No. 5, Sep. 1992.

Yamada, et al. "Load–Unload Slider Dynamics in Magnetic Disk Drives", IEEE Transactions on Magnetics, vol. 24, No. 6, Nov. 1988.

Jeong, et al. "An Experimental Study of the Parameters That Determine Slider–Disk Contacts During Dynamic Load–Unload", Journal of Tribology, vol. 114, pp. 507–514, Jul. 1992.

Clifford, et al. "An Air Bearing Minimizing the Effects of Stider Skew Angle", IEEE Transactions on Magnetics, vol. 25, No. 5, Sep. 1989.

H.E. Boyer, et al. "Metals Handbook", Published by American Society For Metals, 1985, pp. 27–20 and 27–21.

Database WPI Week 9206 Derwent Pulications Ltd., London GB; AN 91–018251 & US–A–5 080 948 (Haruyuki M. et al.), 14 Jan. 1992 *abstract*.

Patent Abstracts of Japan vol. 011 No. 313 (P–626), 13 Oct. 1987 & JP–A–62 103823 (Sony Corp) 14 May 1987, *abstract*.

Database WPI Week 9029 Derwent Pulications Ltd., London GB; AN 90–224227 & US–A–4 939 614 (Shirakura T. et al.), 3 Jul. 1990. *abstract*.

Patent Abstracts of Japan vol. 015 No. 466 (P–1280), 26 Nov. 1991 & JP–A–03 198215 (Hitachi Metals Ltd.) 29 Aug. 1991, *abstract*.

Patent Abstracts of Japan vol. 014 No. 389 (P–1095), 22 Aug. 1990 & JP–A–02 146109 (Fujitsu Ltd) 5 Jun. 1990, *abstract*.

Patent Abstracts of Japan vol. 13 No. 403 (P–929) [3751], 7 Sep. 1989 & JP–A–01 146103 (Hitachi Metals Ltd.) *abstract*.

Patent Abstracts of Japan vol. 013 No. 543 (P–970), 6 Dec. 1989 & JP–A–01 224922 (Alps Electric Co. Ltd.) 7 Sep. 1989, *abstract*.

Database WPI Week 9207 Derwent Publications Ltd., London, GB; AN 92–055817 & US–A–5 083 365 (Matsumoto T.), 28 Jan. 1992 *abstract*.

Patent Abstracts of Japan vol. 12 No. 327 (P–753) 6 Sep. 1988 & JP–A–63 090025 (Hitachi Ltd.) 20 Apr. 1988 *abstract*.

Patent Abstracts of Japan, vol. 005 No. 107 (P–070), 11 Jul. 1981 & JP–A–56 047958 (NEC Corp) 30 Apr. 1981.

Patent Abstracts of Japan, vol. 016 No. 404 (P–1410), 26 Aug. 1992 & JP–A–04 134717 (TDK Corp) 8 May 1992.

Patent Abstracts of Japan, vol. 017 No. 585 (P–1632), 25 Oct. 1993 & JP–A–05 166321 (Matsushita Electric Ind Co Ltd) 2 Jul. 1993.

Patent Abstracts of Japan, vol. 012 No. 188 (P–711), 2 Jun. 1988 & JP–A–62 295208 (Hitachi Metals Ltd) 22 Dec. 1987.

Patent Abstracts of Japan, vol. 015 No. 349 (P–1247), 4 Sep. 1991 & JP–A–03 132907 (Tokin Corp) 6 Jun. 1991.

Patent Abstracts of Japan, vol. 005 No. 150 (P–081), 22 Sep. 1981 & JP–A–56 083843 (Fujitsu Ltd) 8 Jul. 1981.

Patent Abstracts of Japan, vol. 012 No. 001 (M–656), 6 Jan. 1988 & JP–A–62 166969 (Sony Corp) 23 Jul. 1987.

Patent Abstracts of Japan, vol. 011 No. 170 (P–581), 2 Jun. 1987 & JP–A–62 001117 (Hitachi Maxell Ltd) 7 Jan. 1987.

Patent Abstracts of Japan, vol. 007 No. 150 (P–207), 30 Jun. 1983 & JP–A–58 060424 (Nihon Mikuro Kooteingu KK) 9 Apr. 1983.

Patent Abstracts of Japan, vol. 012 No. 001 (M–656), 6 Jan. 1988 & JP–A–62 166970 (Sony Corp) 23 Jul. 1987.

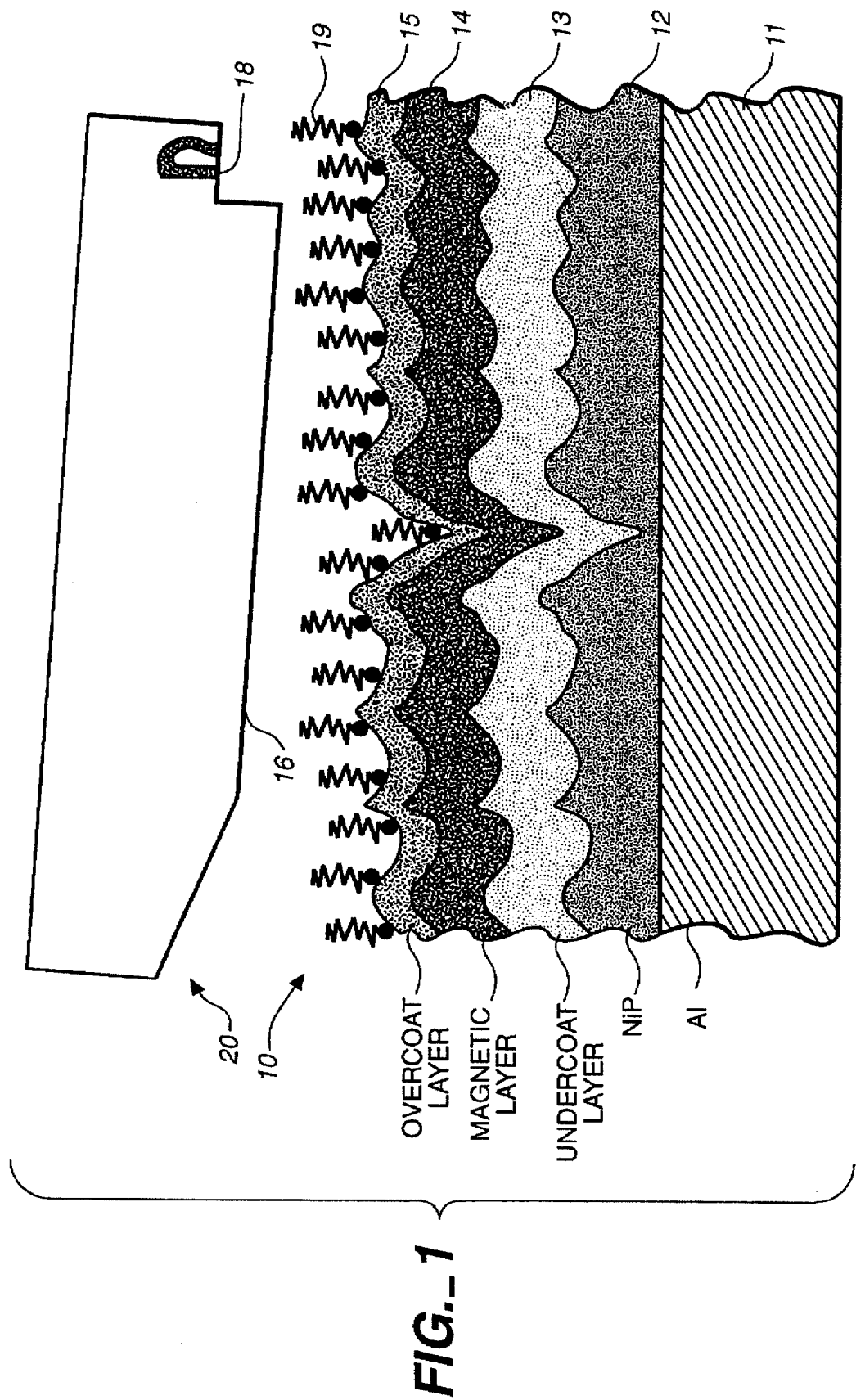
FIG._1

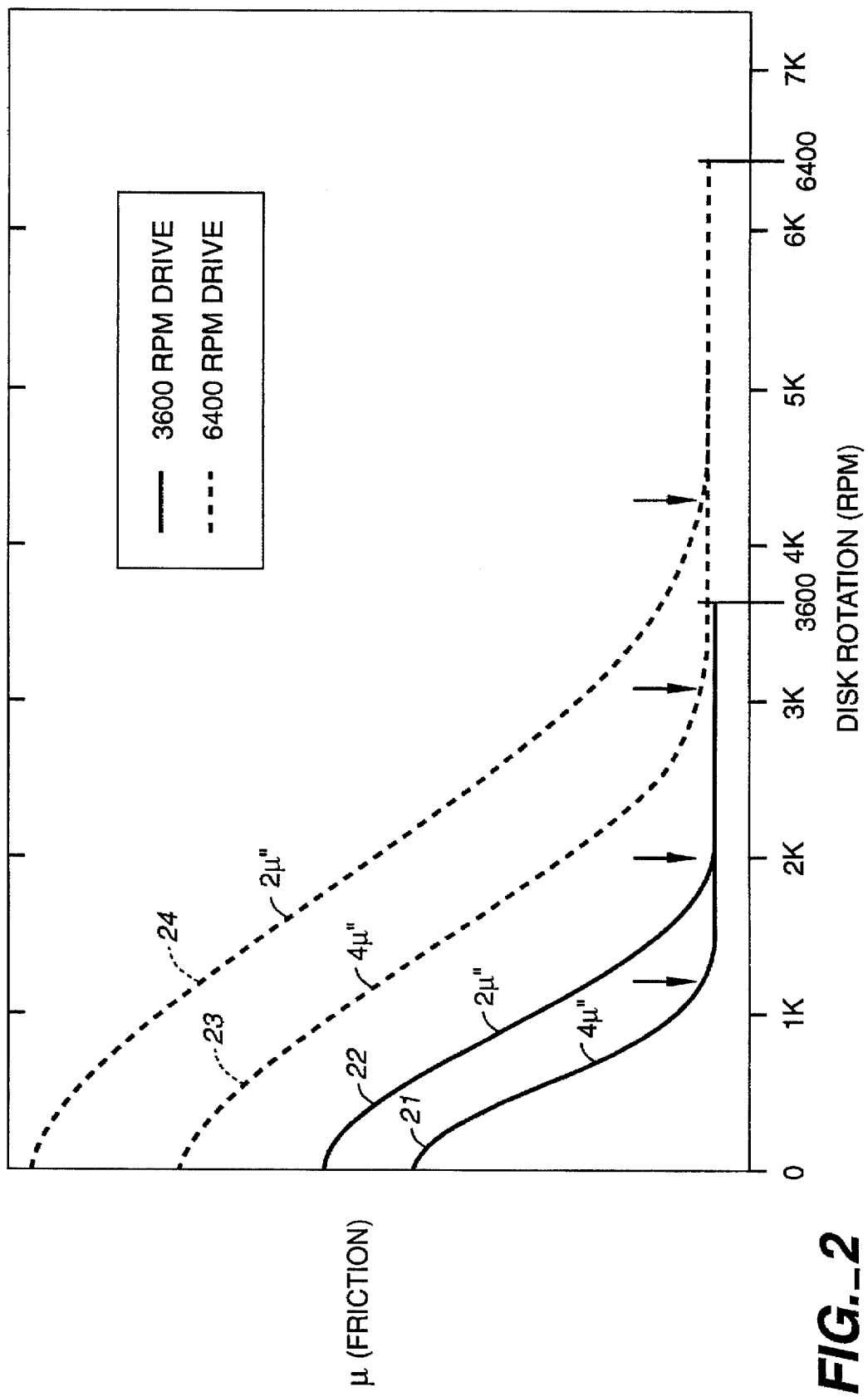
FIG._2

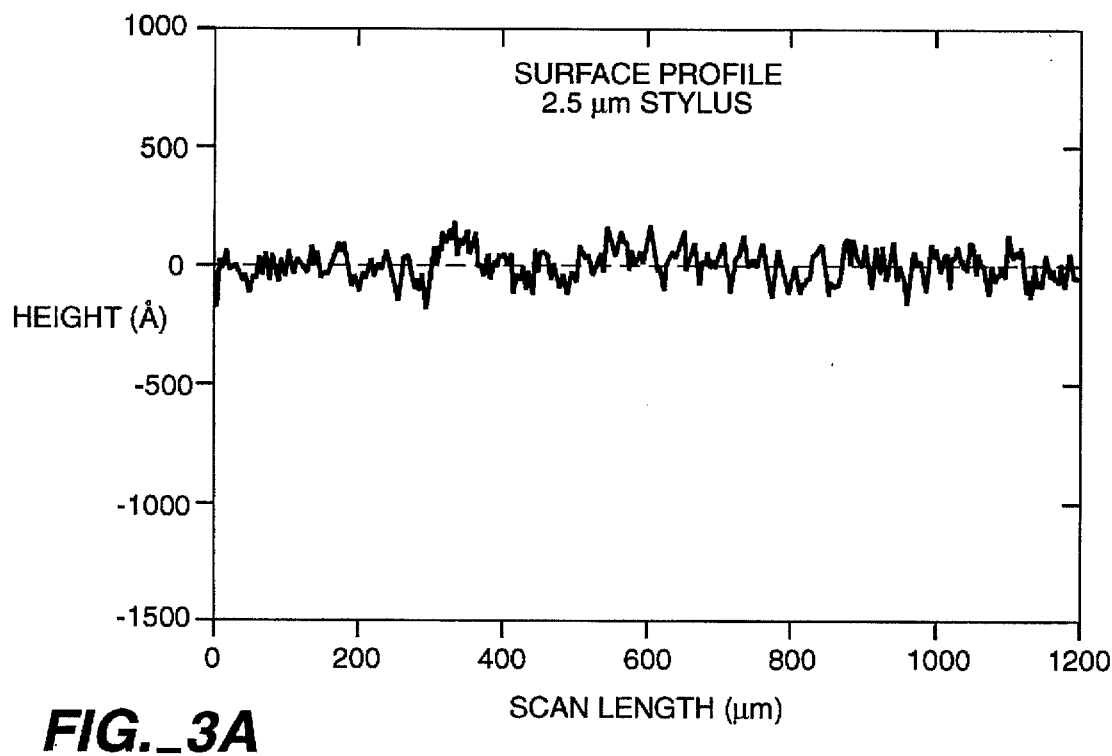
FIG._3A
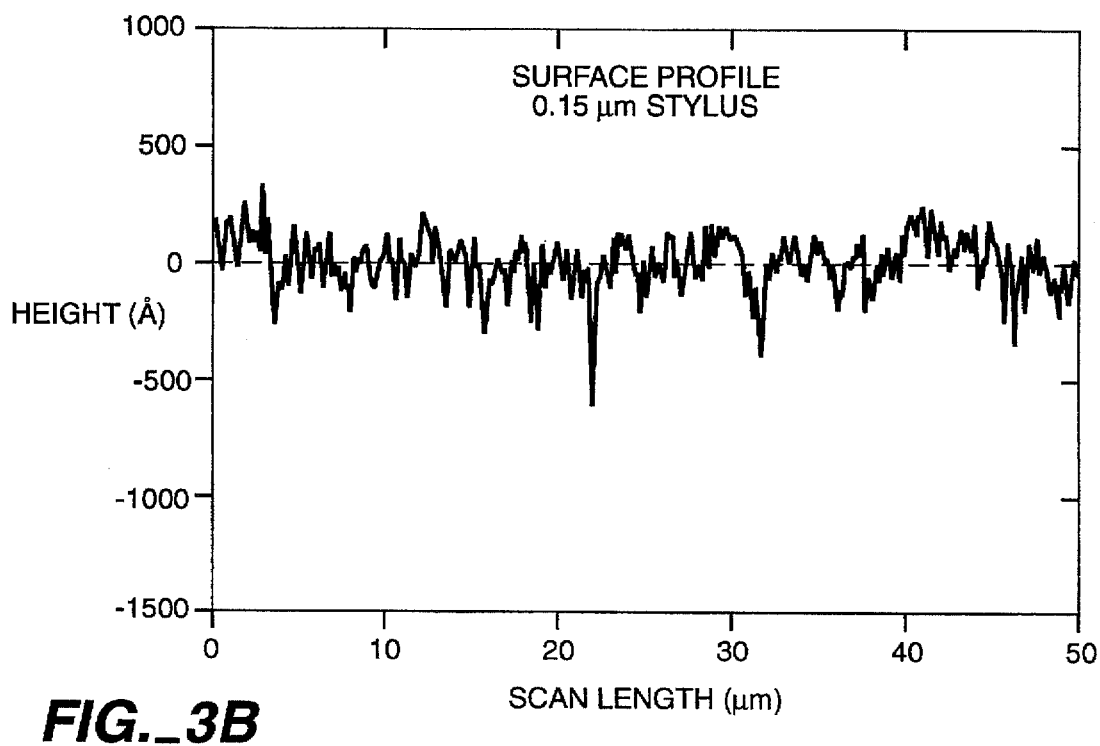
FIG._3B

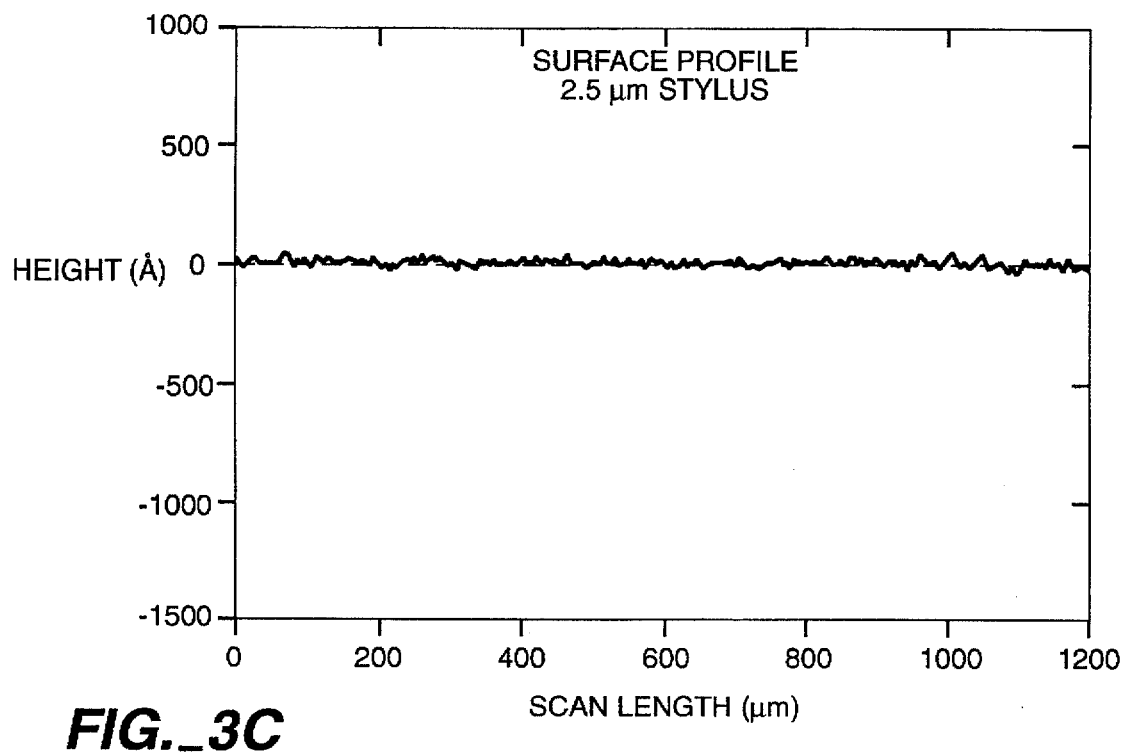
FIG._3C
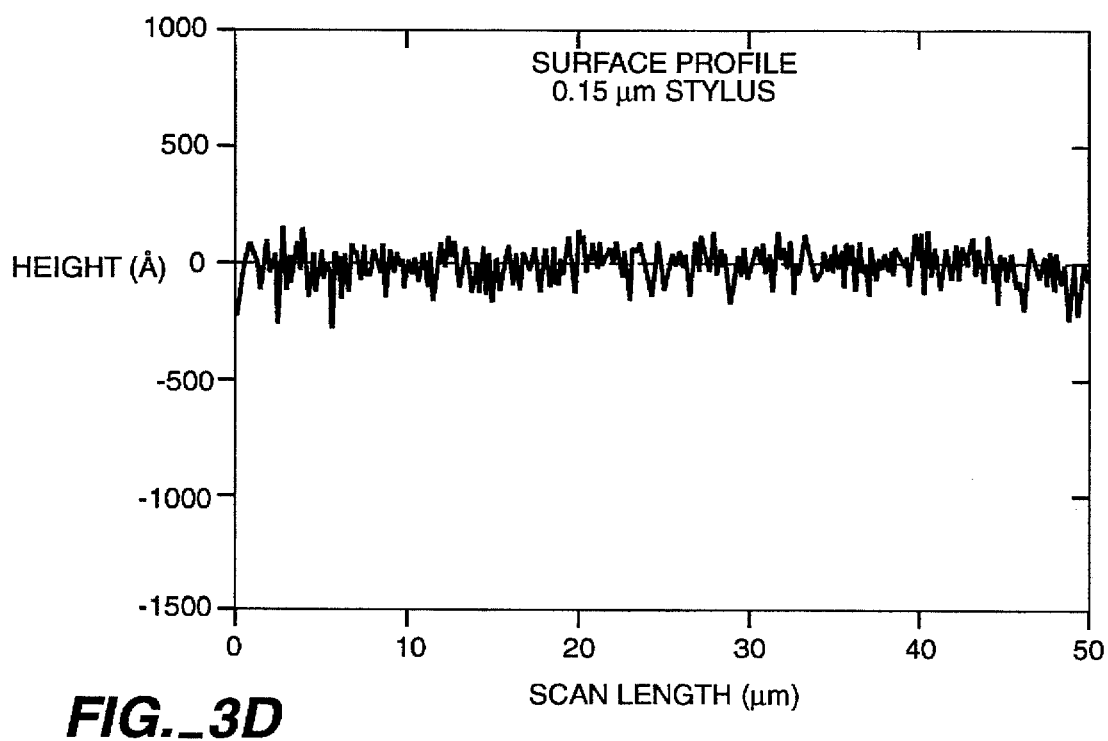
FIG._3D

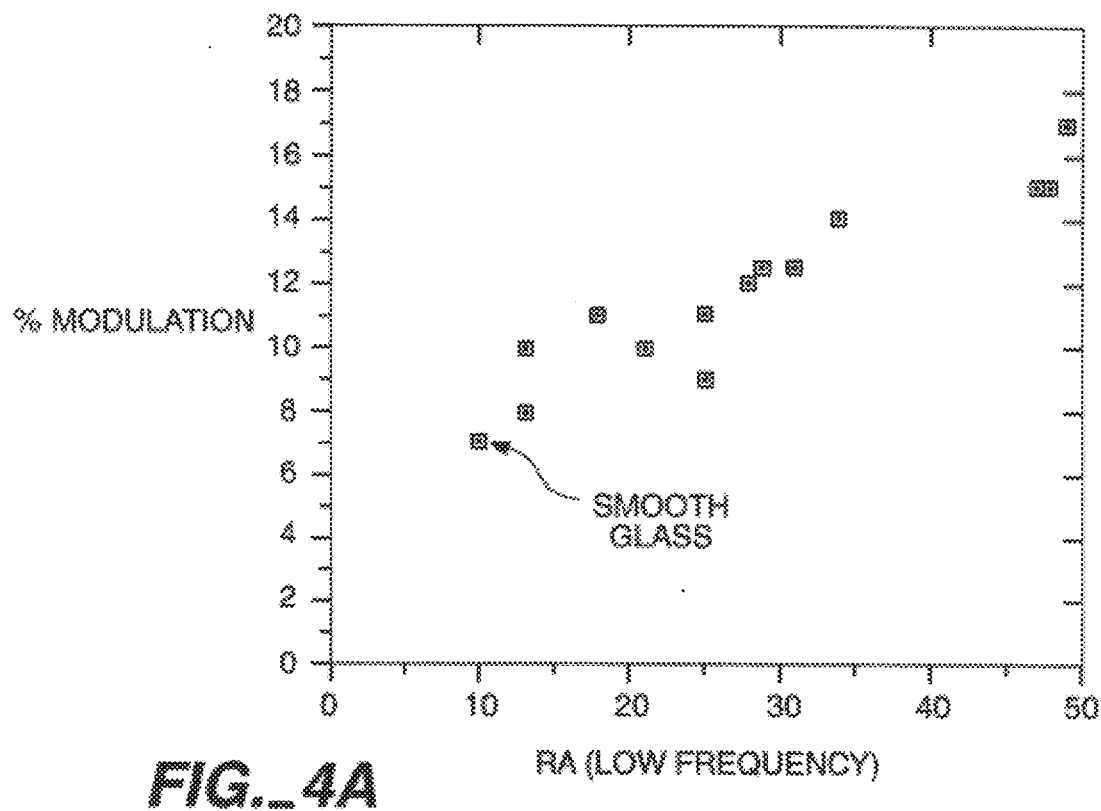
FIG._4A
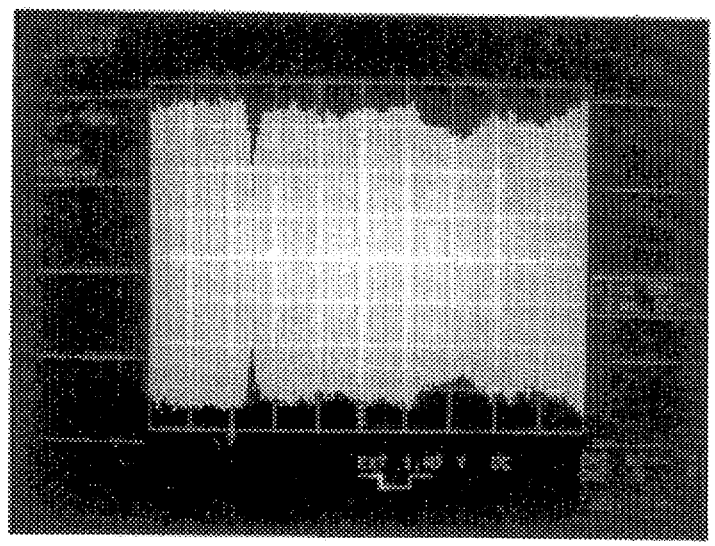
FIG._4B

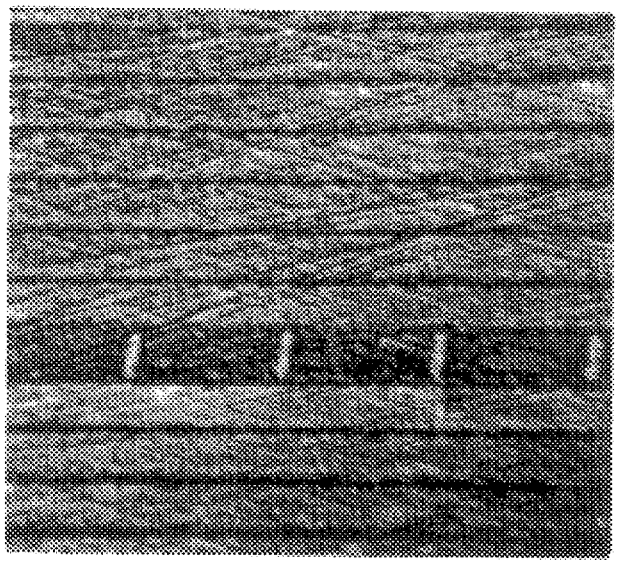
FIG._4C
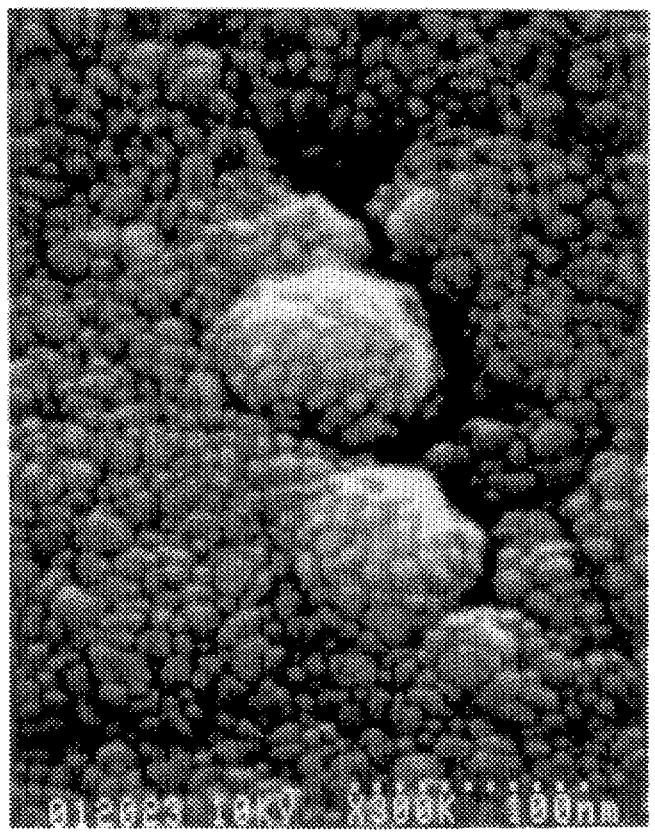
FIG._5A

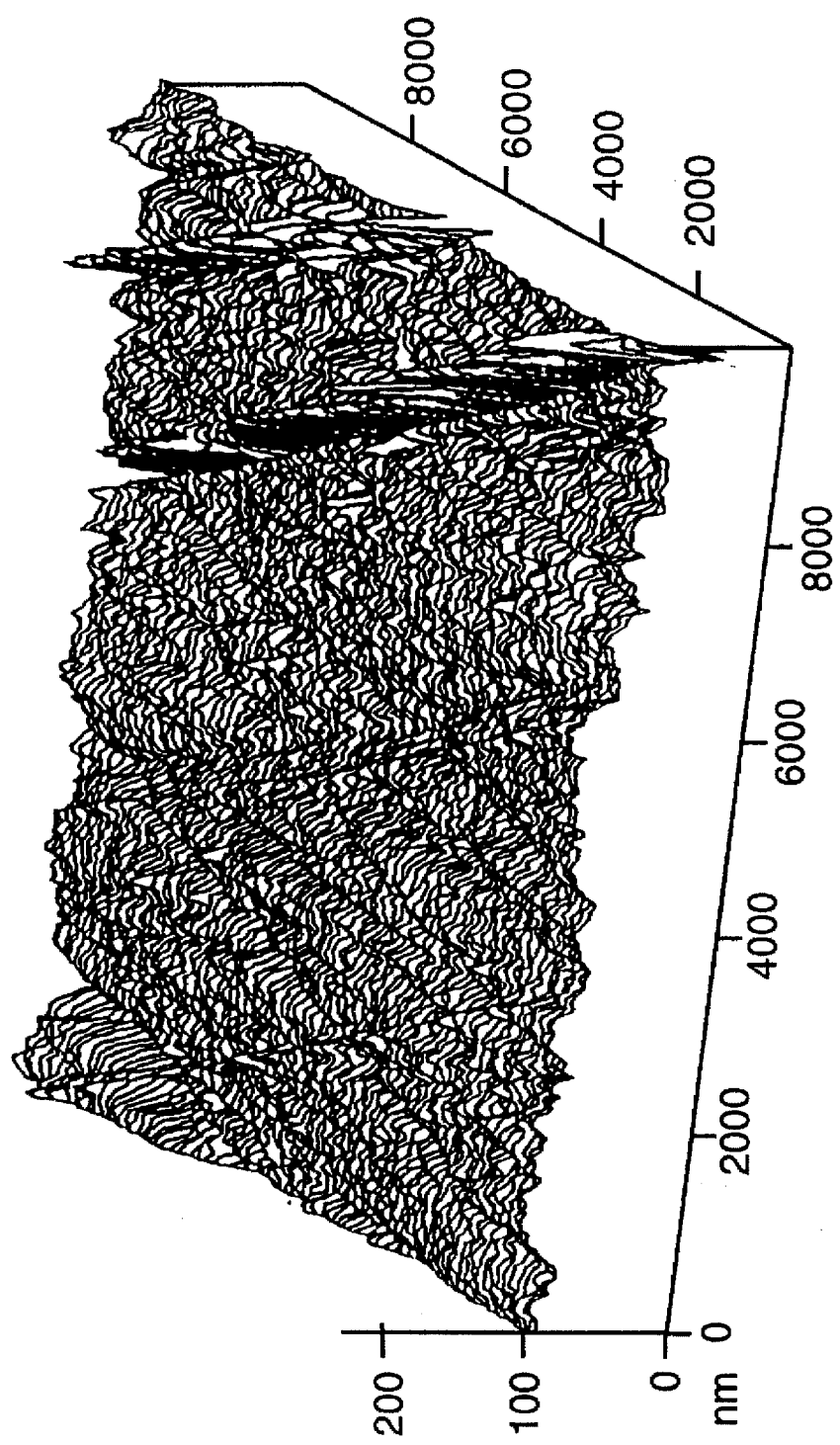
FIG._5B

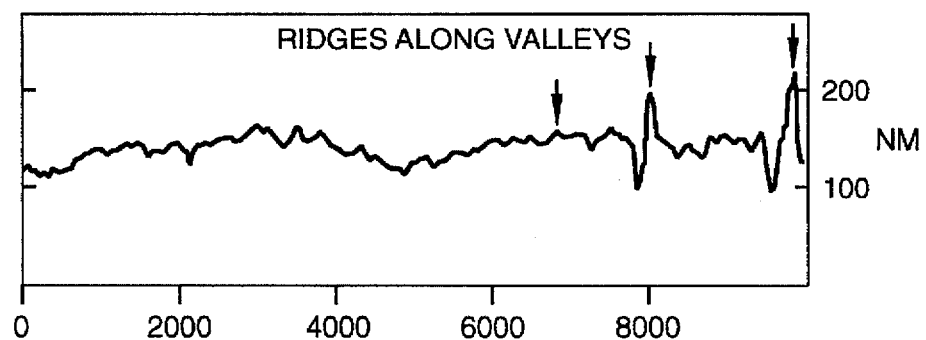
FIG._5C
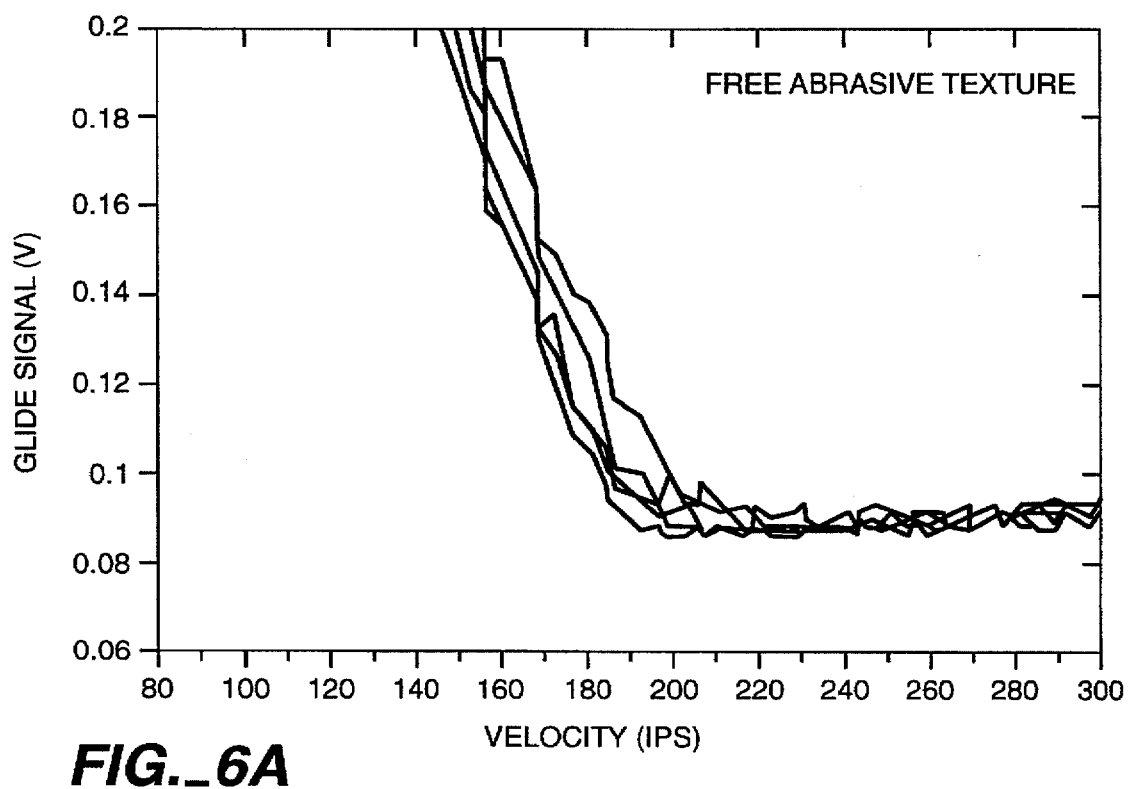
FIG._6A

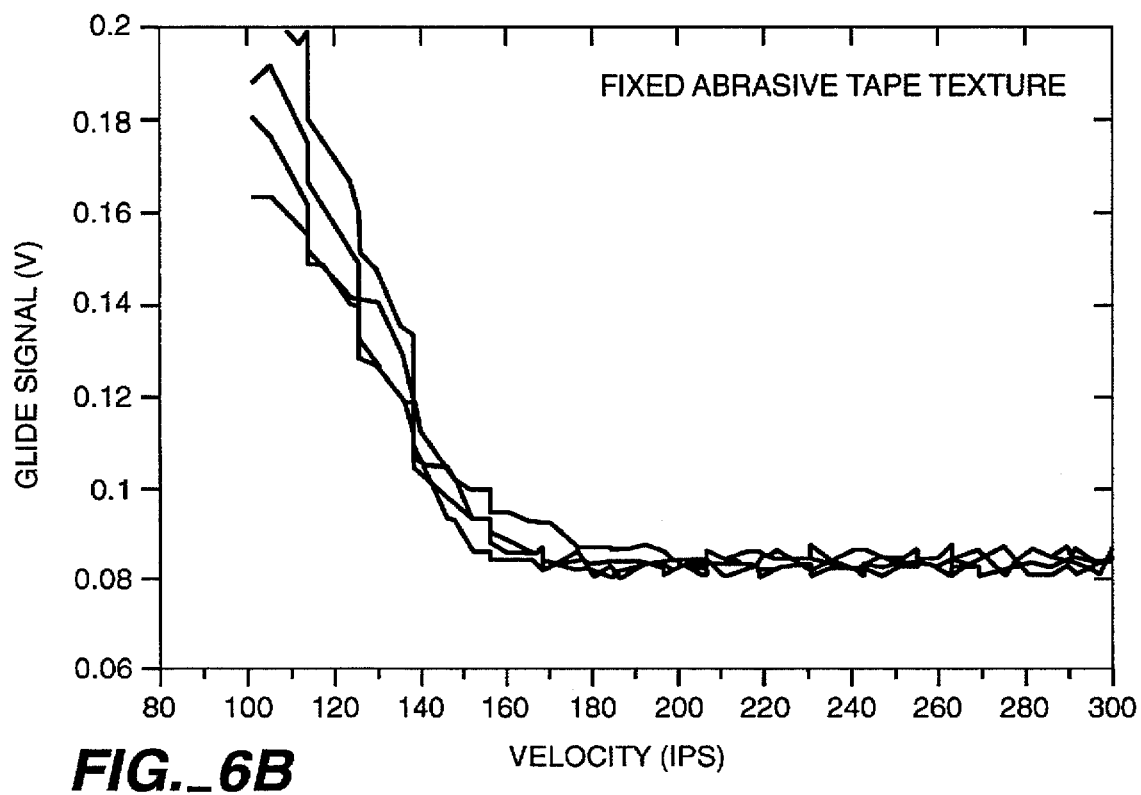
FIG._6B
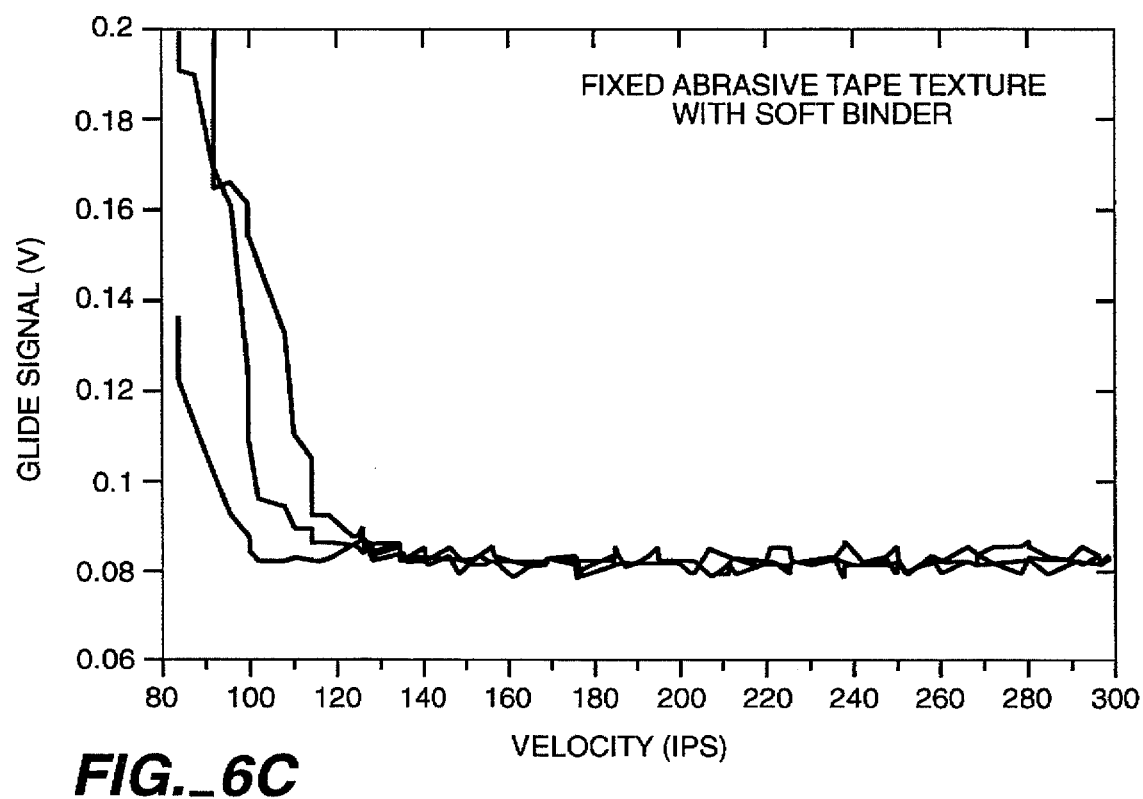
FIG._6C

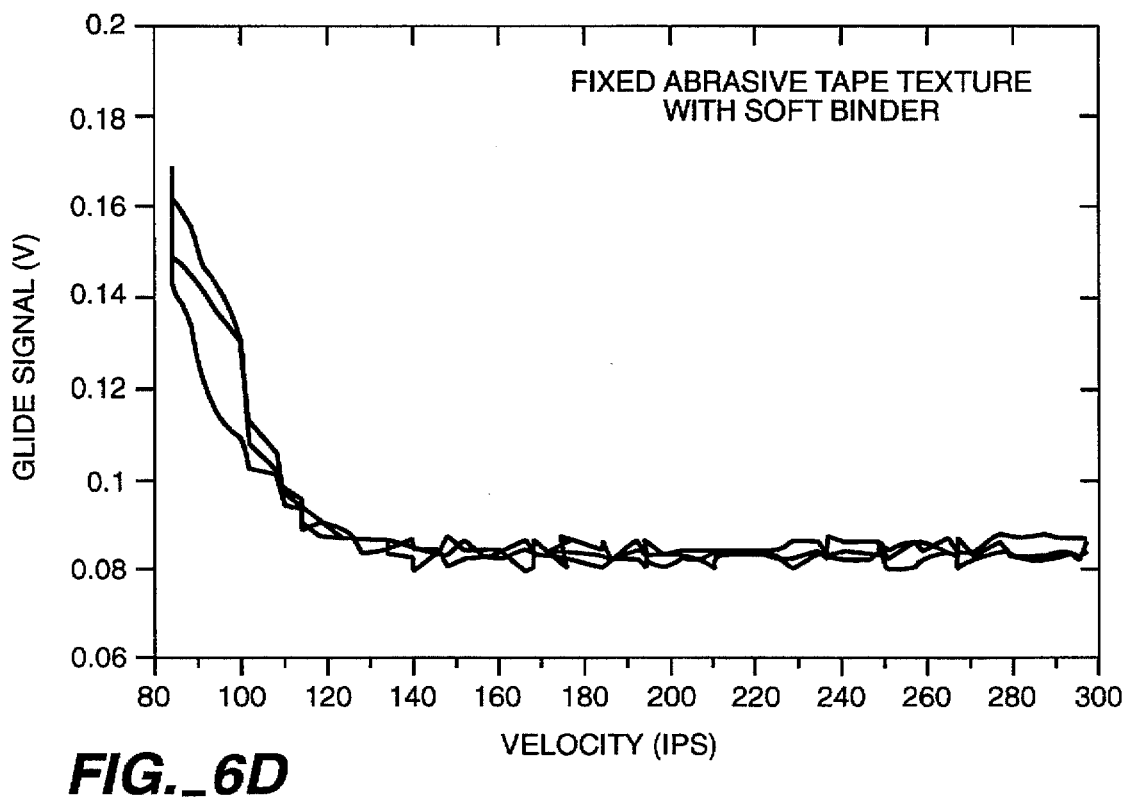
FIG._6D
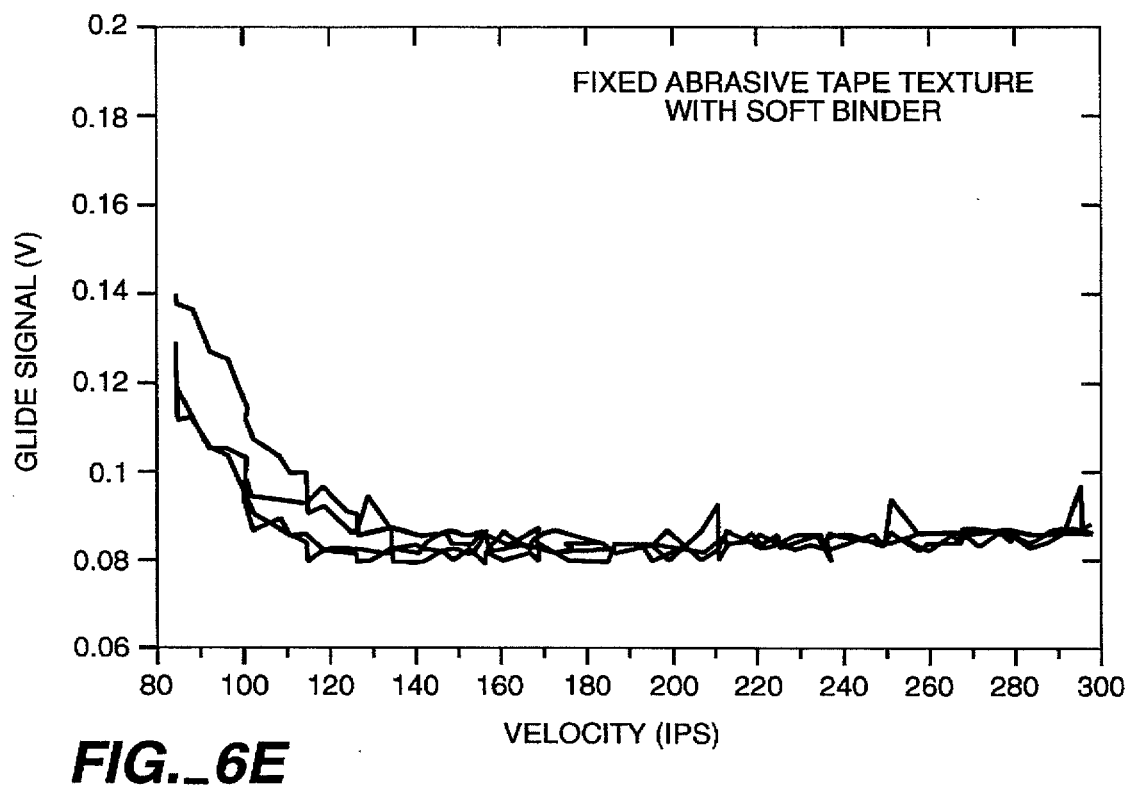
FIG._6E

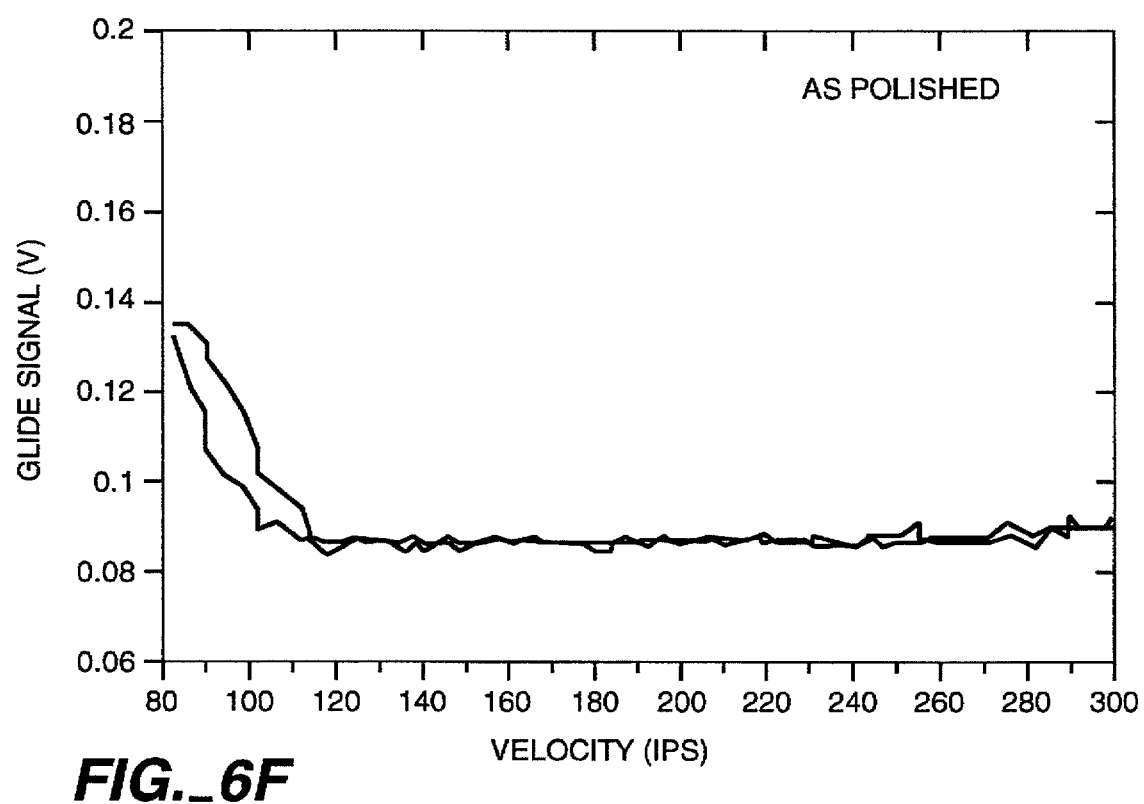
FIG._6F

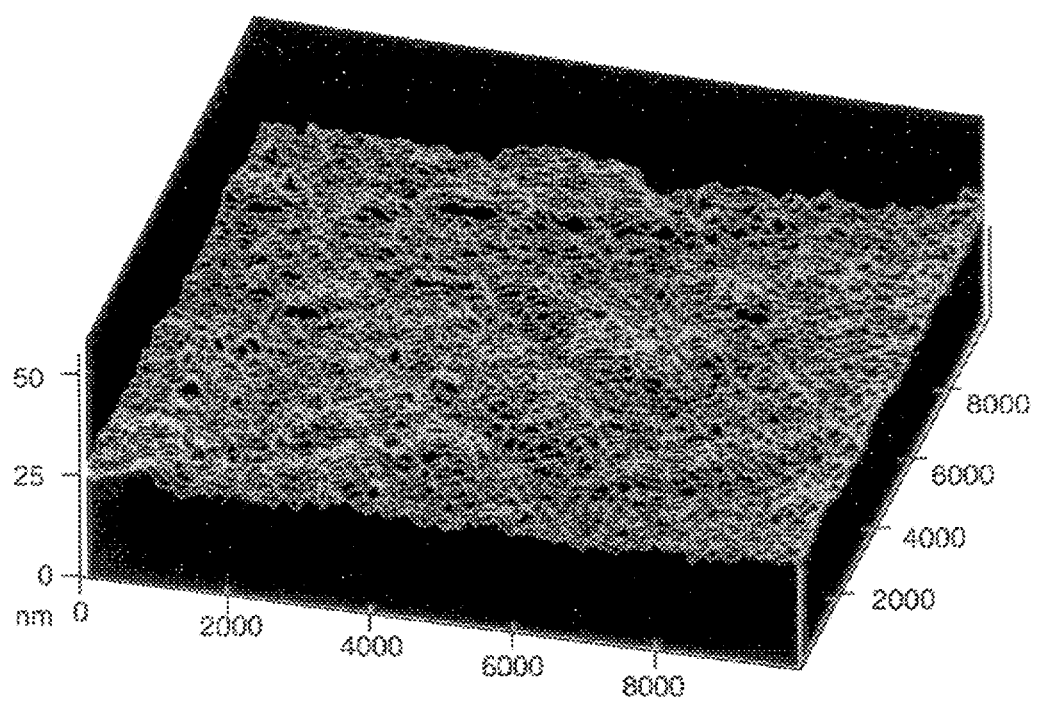
FIG._7A

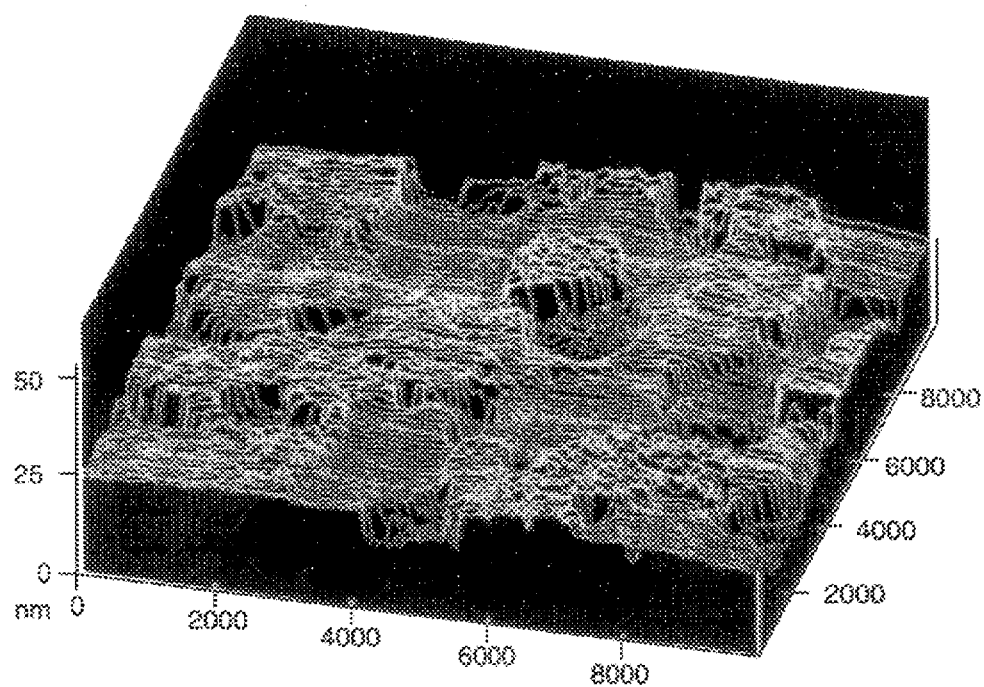
FIG._7B

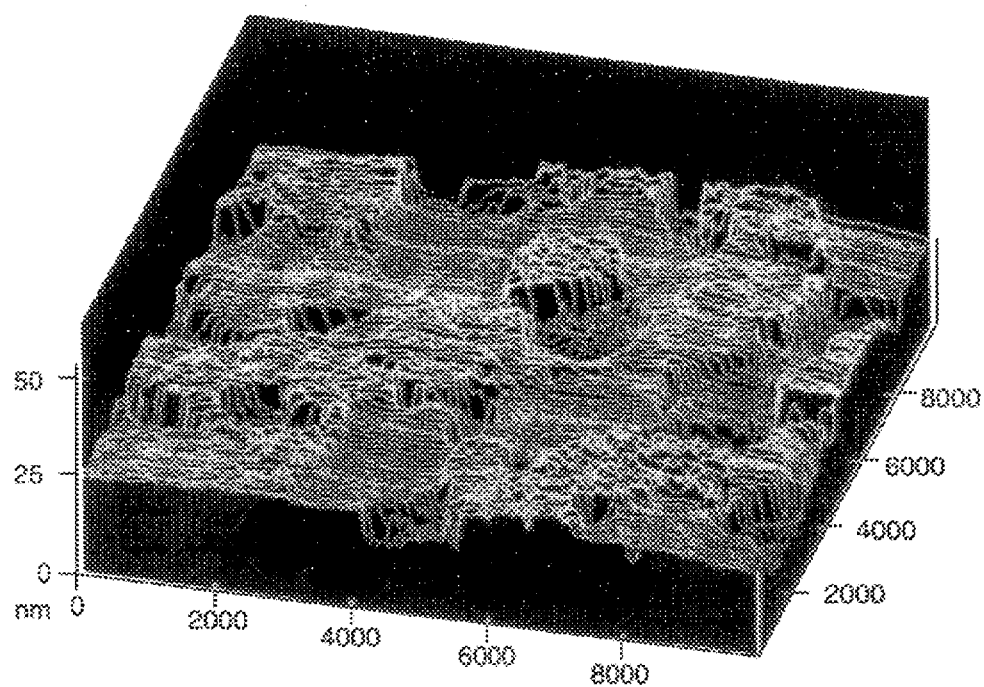
FIG._7B

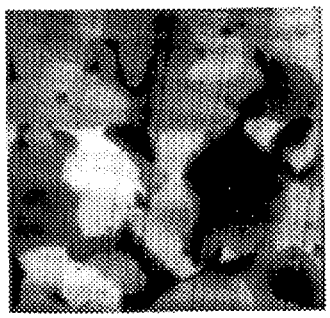
FIG._7D-1
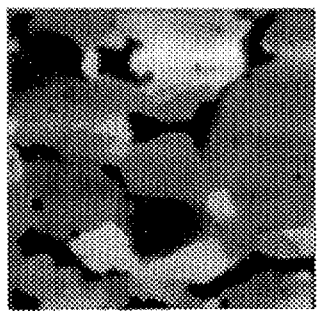
FIG._7D-2
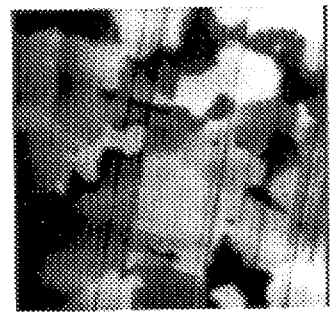
FIG._7D-3
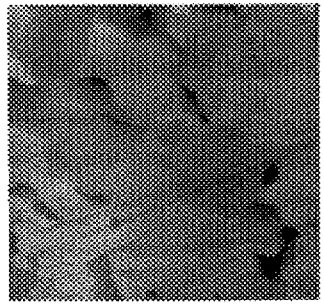
FIG._7D-4
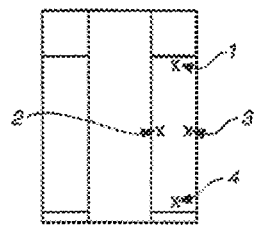
FIG._7D-5
| NO. | RMS (Å) | RA (Å) |
|---|---|---|
| 1 | 80.1 | 71.0 |
| 2 | 77.4 | 56.2 |
| 3 | 100.4 | 85.8 |
| 4 | 26.4 | 14.0 |
FIG._7D-6

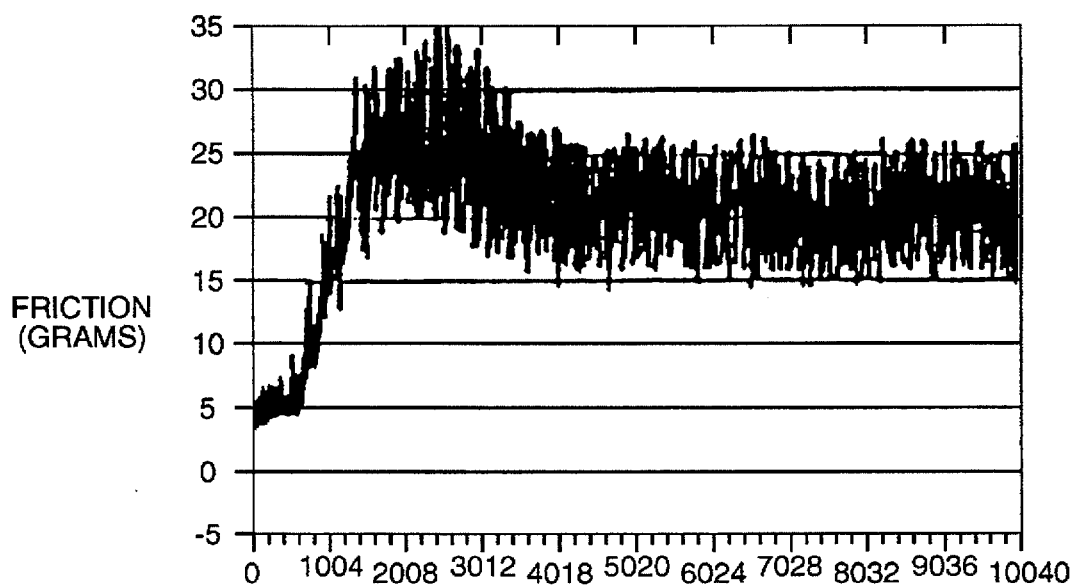
FIG._8A
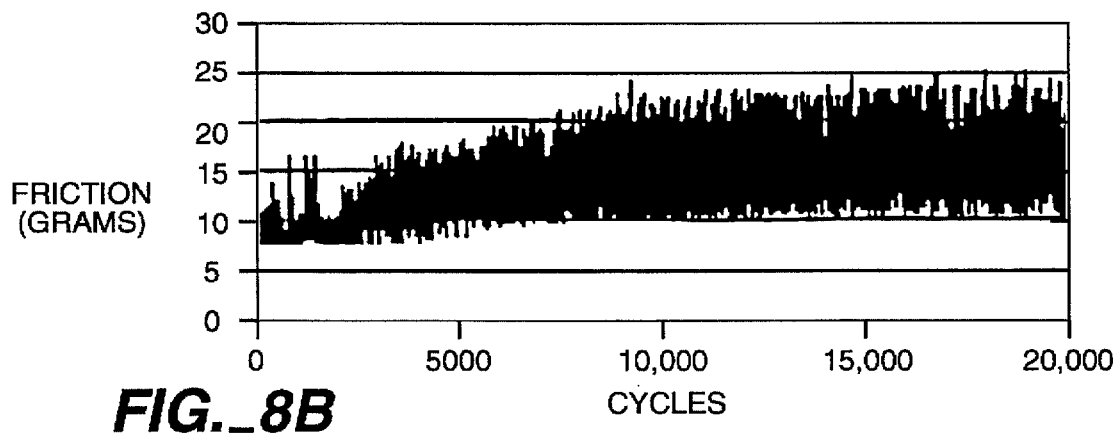
FIG._8B
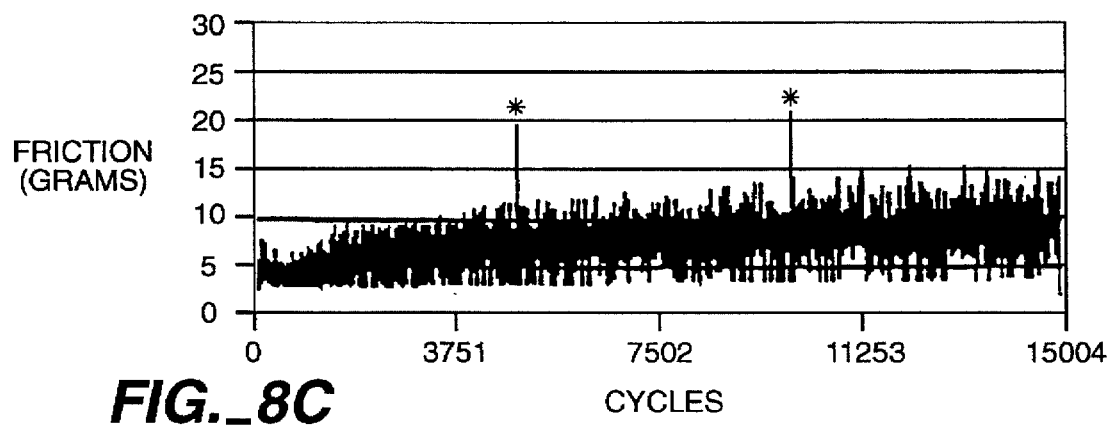
FIG._8C

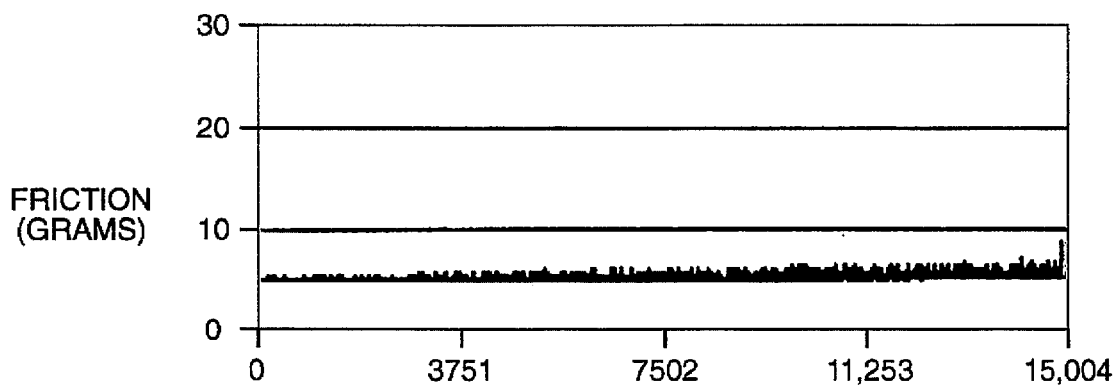
FIG._9A
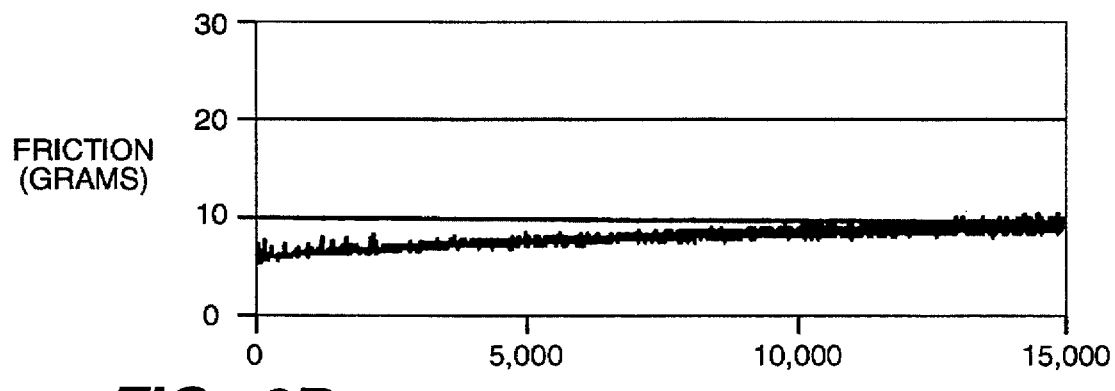
FIG._9B
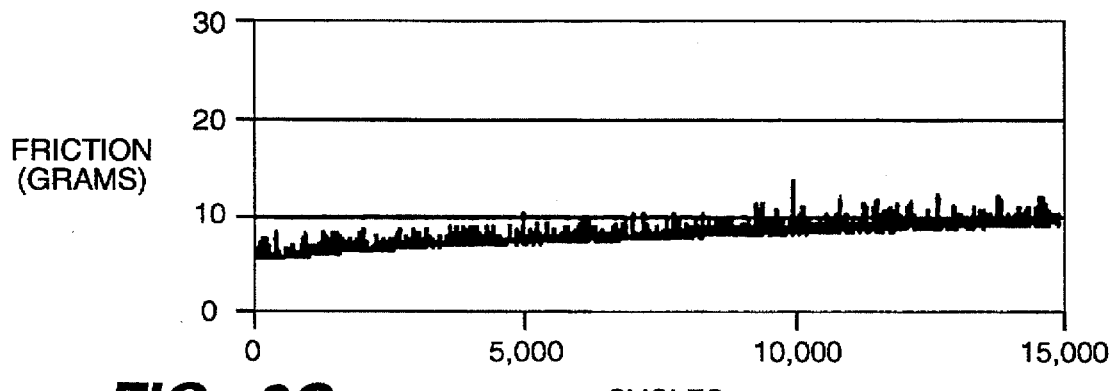
FIG._9C

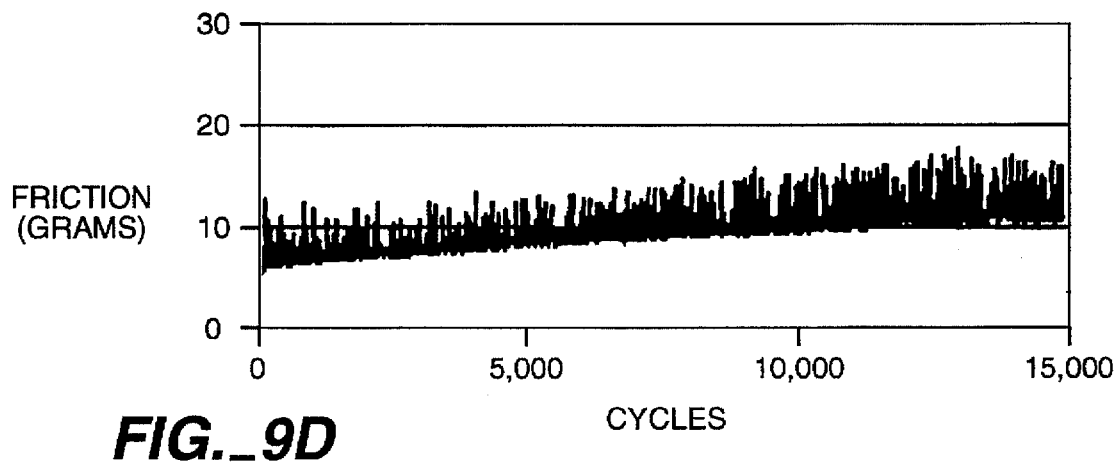
FIG._9D
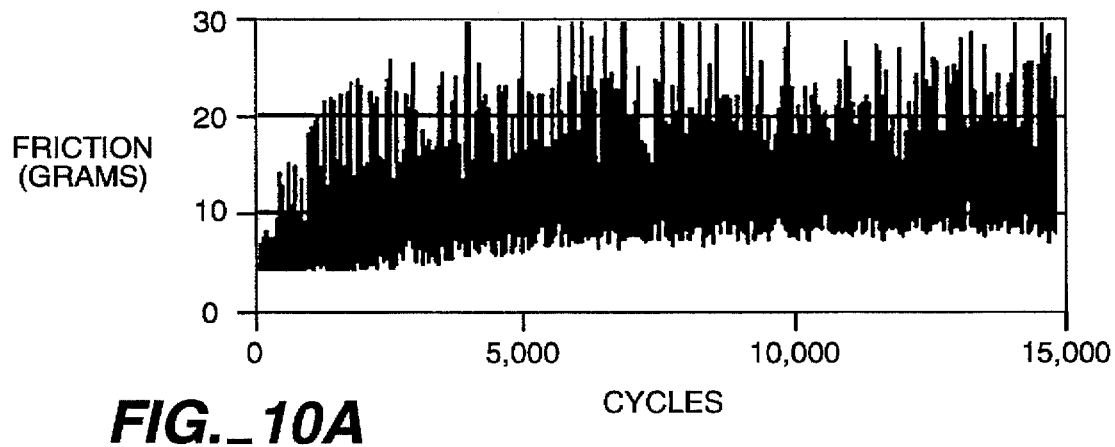
FIG._10A
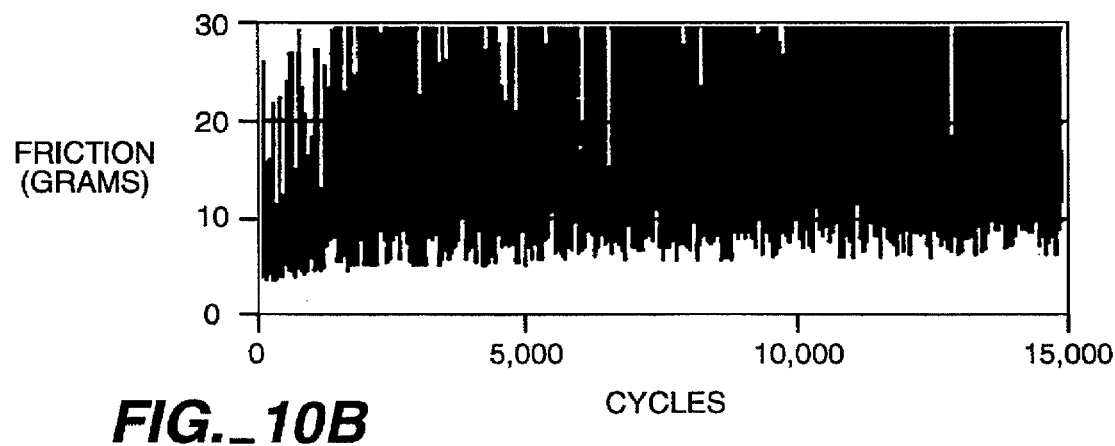
FIG._10B

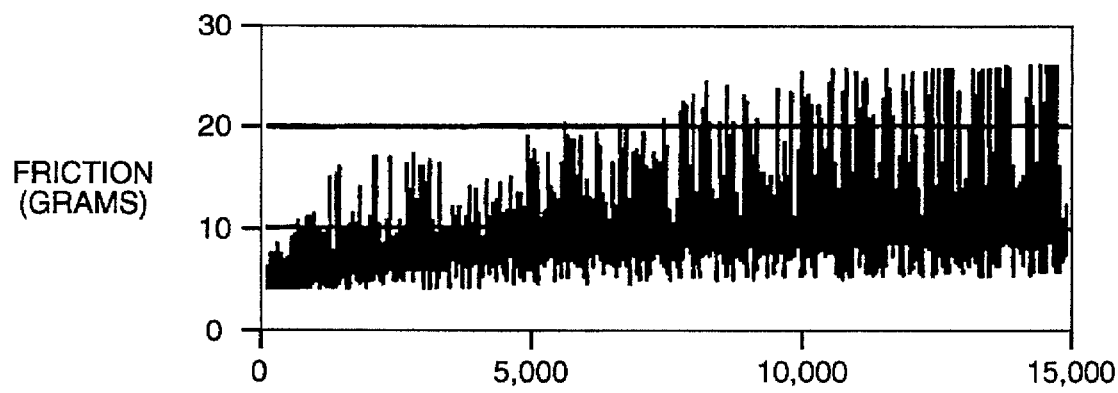
FIG._10C
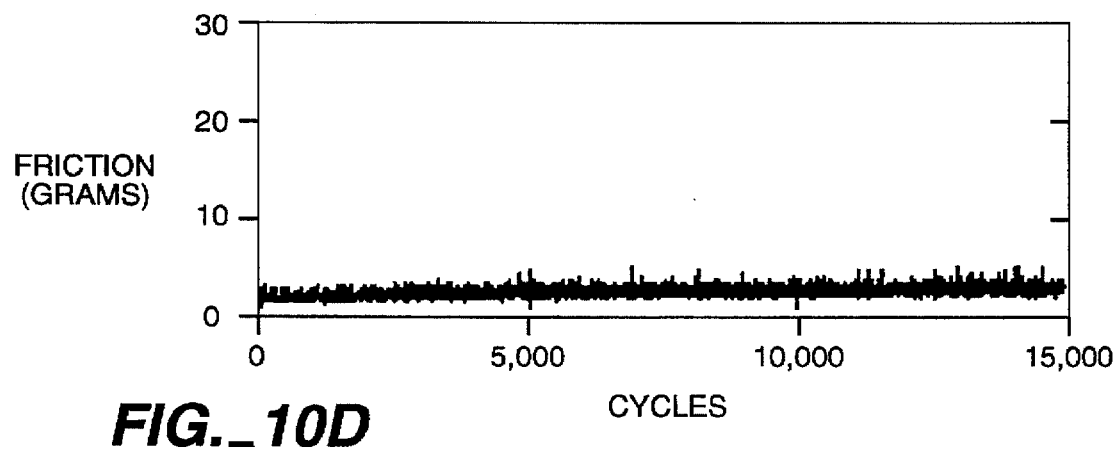
FIG._10D
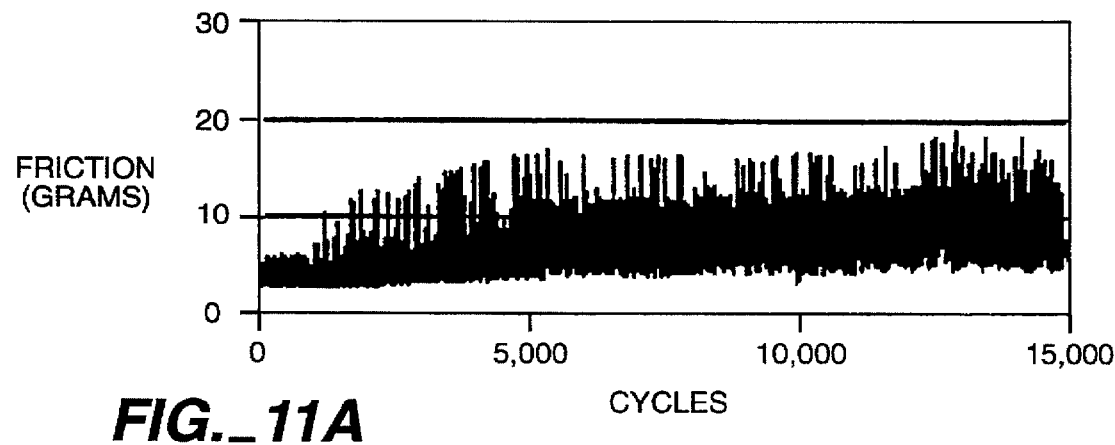
FIG._11A

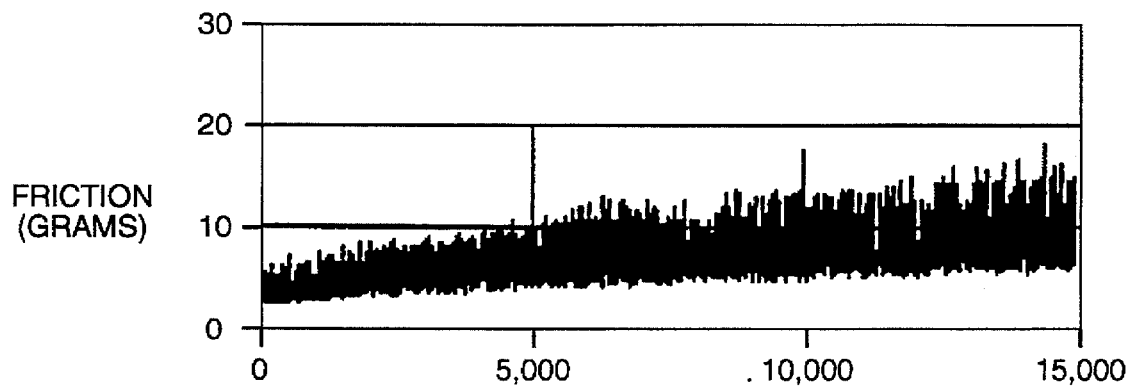
FIG._11B
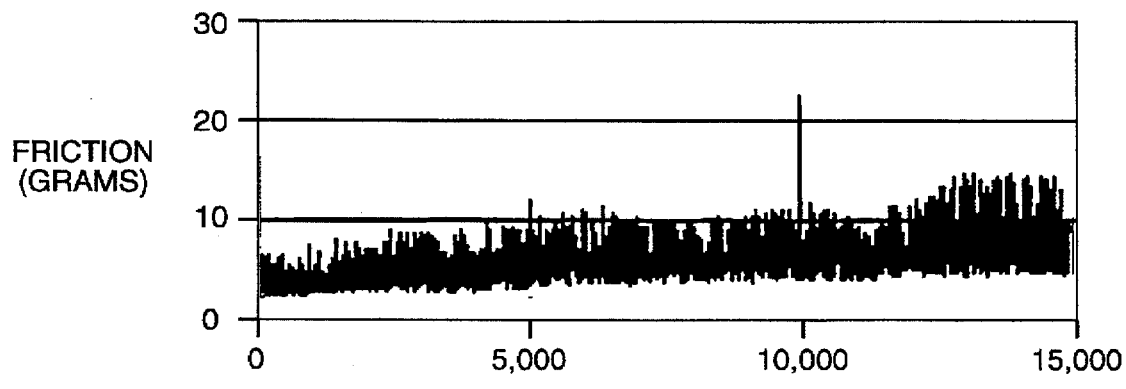
FIG._11C
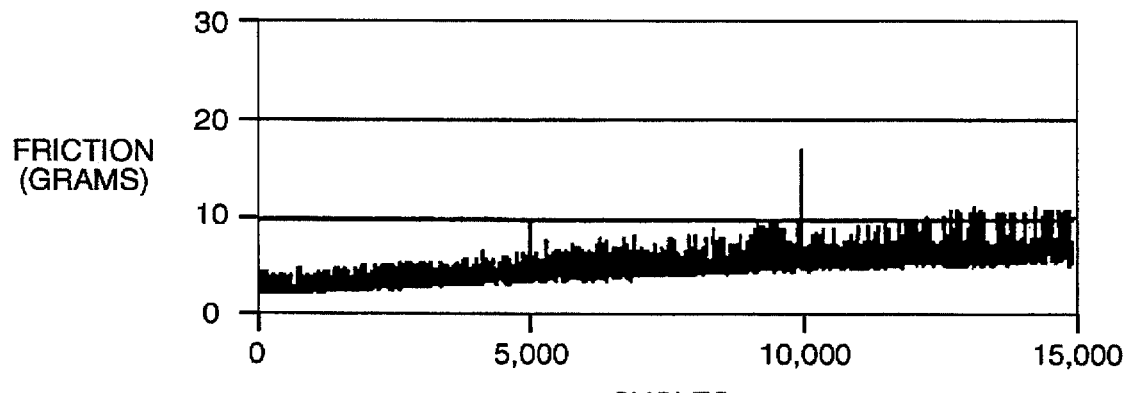
FIG._11D

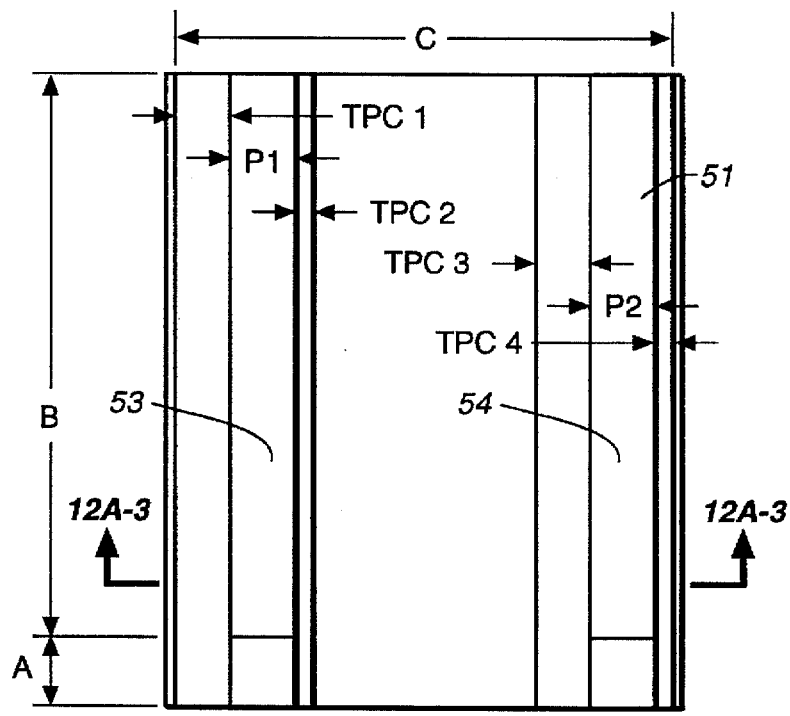
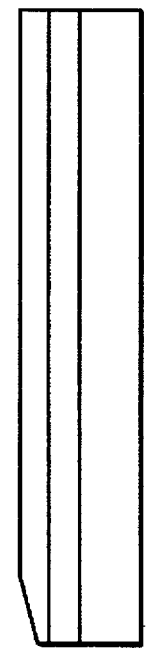
FIG._12A-1          FIG._12A-2
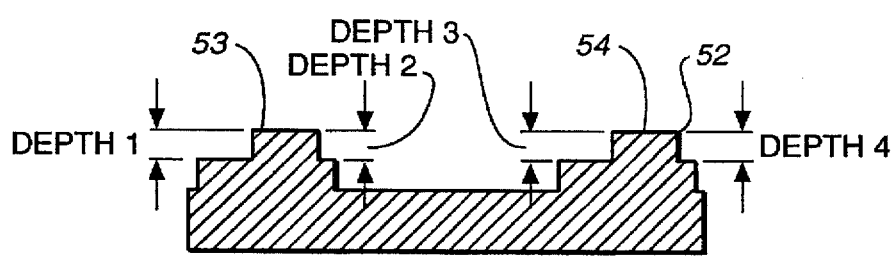
FIG._12A-3

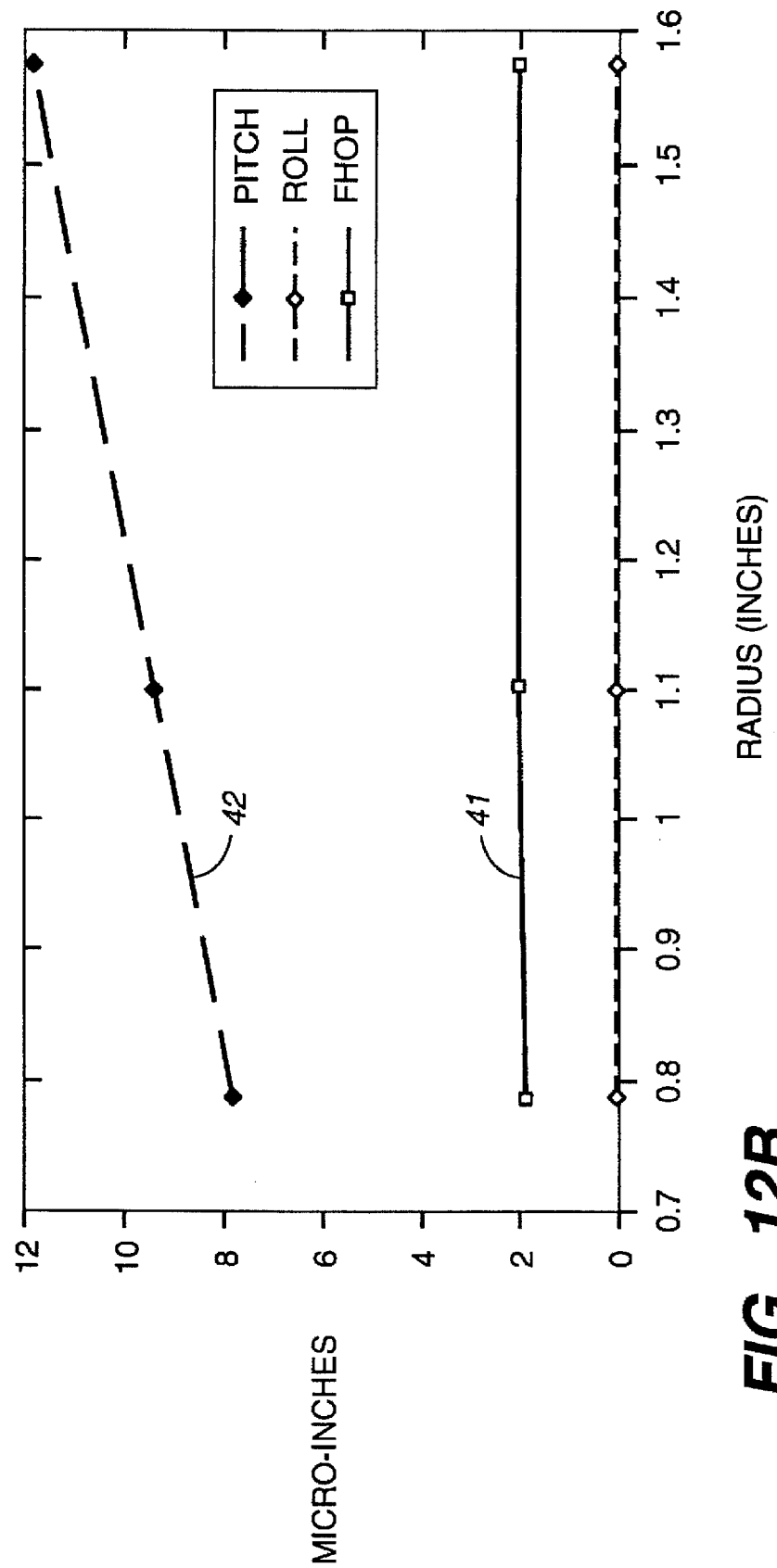
FIG._12B

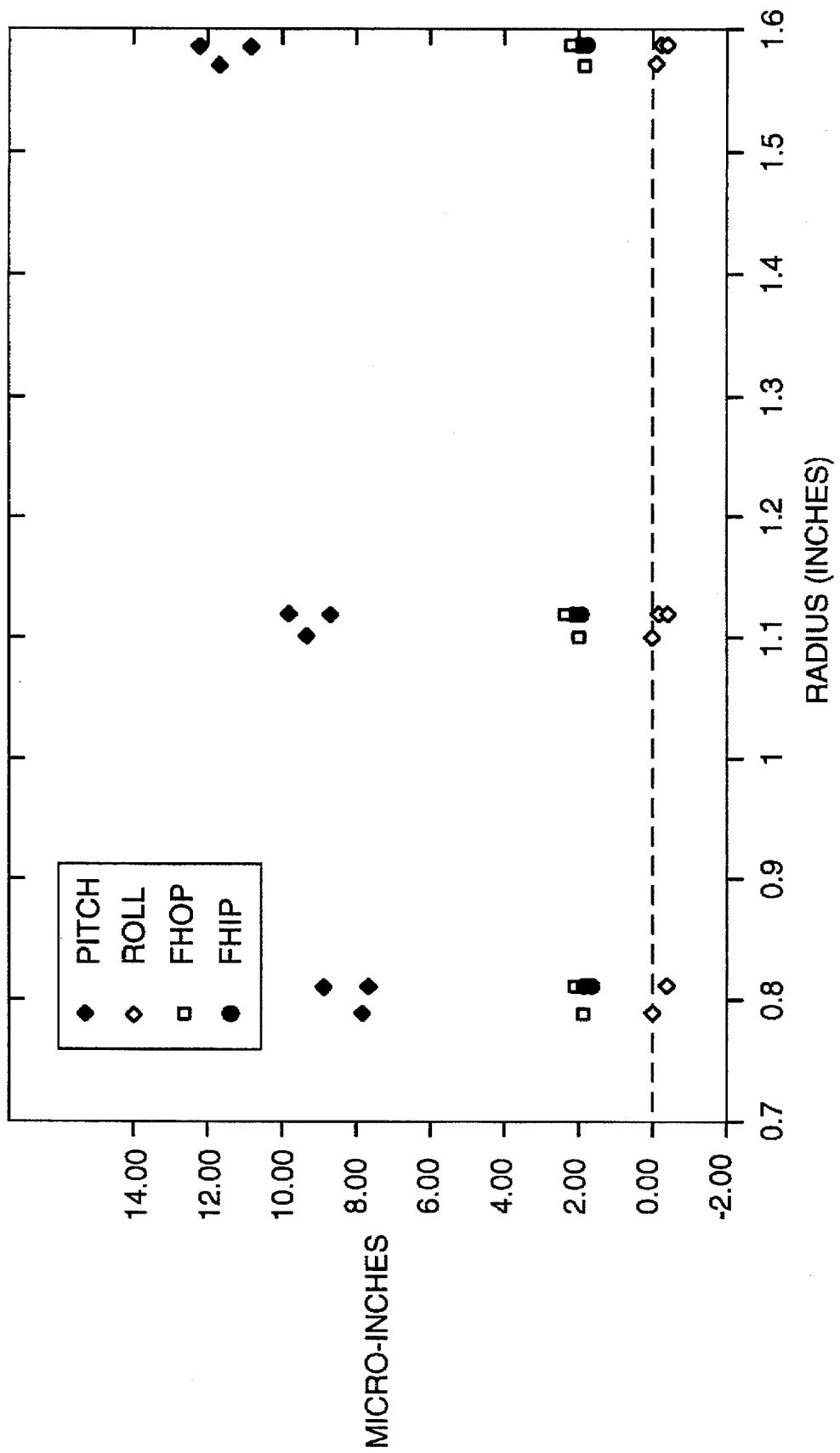
FIG._12C

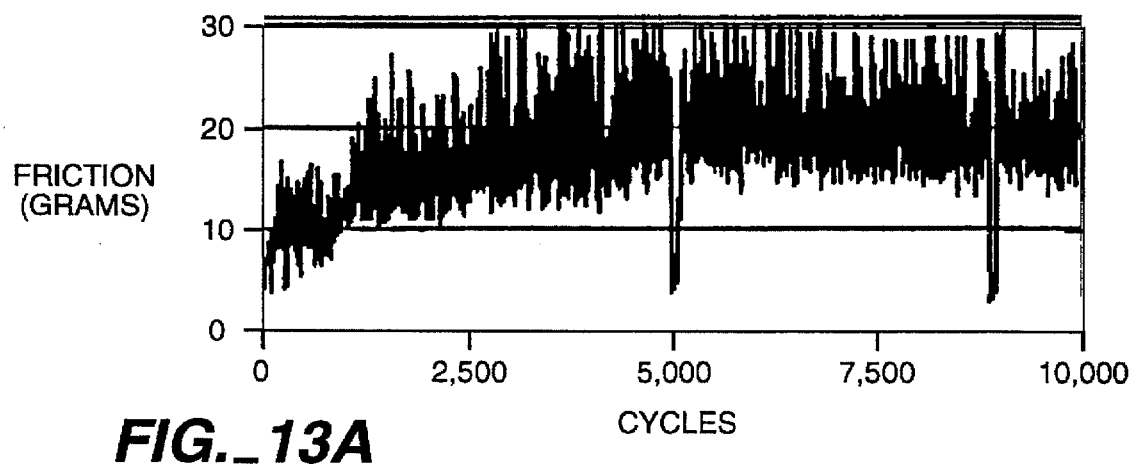
FIG._13A
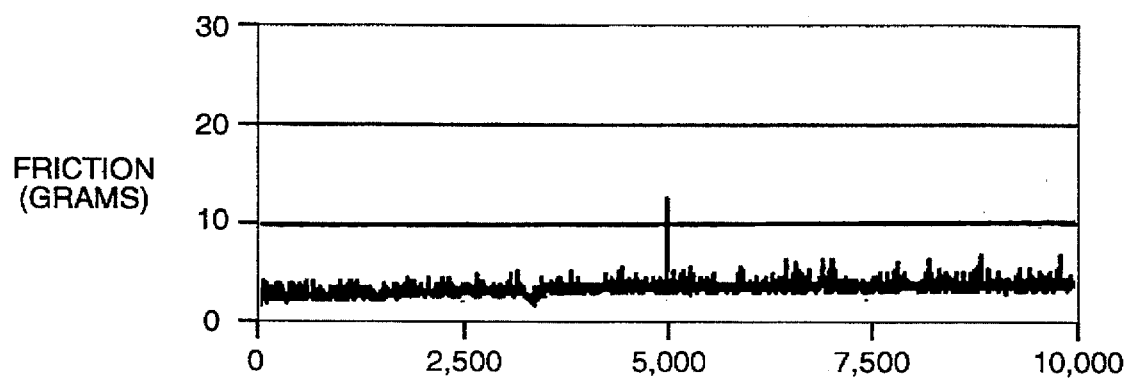
FIG._13B

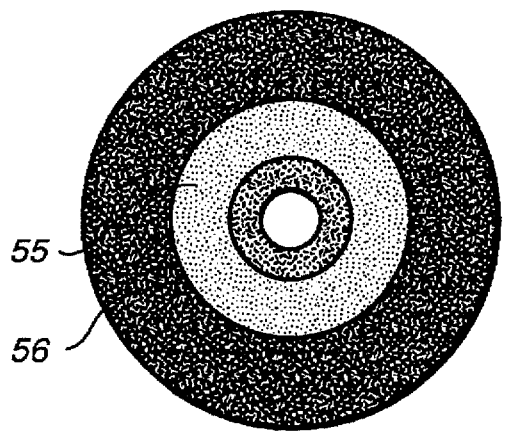
FIG._14A
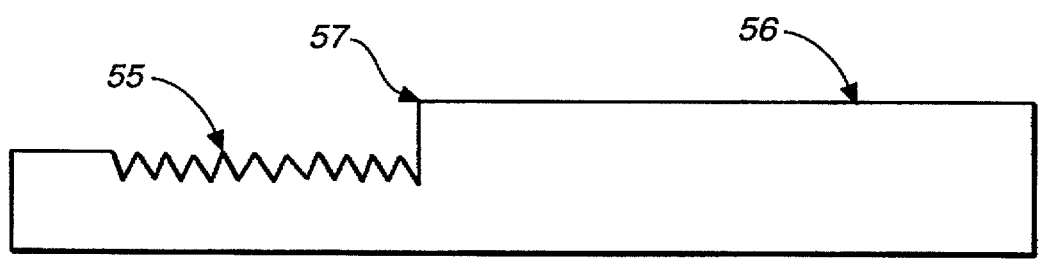
FIG._14B
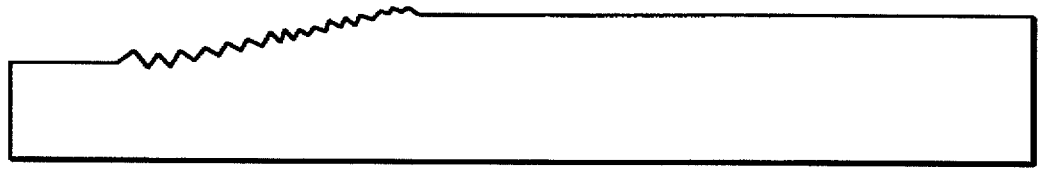
FIG._14C

HARD DISK DRIVE SYSTEM HAVING VIRTUAL CONTACT RECORDING

This application is a continuation of application Ser. No. 08/080,339, filed Jun. 21, 1993, now abandoned.

BACKGROUND OF THE INVENTION

This invention relates to hard disk drives used to store data. More particularly, the present invention relates to disk drives including a hard magnetic disk and a read-write head, and methods for texturing the disk surface and read-write head surface.

In the design of magnetic hard disk drives, the trend has been to store increasing amounts of data in smaller volumes of space. Concurrently, the cost of the drive components has either stayed about the same or decreased. The net result is that cost per megabyte of data storage has followed a predictable decreasing trend over many years. The end-user has benefitted enormously with ever increasing data storage capacity while paying a similar or lower price for the size of the package. Although such trend of increased capacity at decreased price has been fairly continuous and predictable, higher recording density sometimes can only be achieved with a drastic change in technology. For example, to increase recording density, in the past decade media technology has migrated from oxide to thin film media and head technology has migrated from ferrite heads to the thin film heads used today, and is currently moving towards magneto-resistive heads to meet the challenge of further increasing recording density. These key changes in both recording media and head technology maintain the course of achieving ever higher recording densities. Density, typically expressed in terms of number of tracks per inch over the recording disk times the linear recording density, is approaching about 200 megabits/square inch in currently available commercial drives. Recently it has been demonstrated that a recording density of 1 to 2 gigabits per square inch is achievable in a drive by using a combination of magneto-resistive head technology and extremely low flying height (less than a 2μ" or 50 nm flying height).

Regardless of these migrations to new component technology to increase recording density, there is a factor common to all the technologies which can drastically improve recording density—flying the head as close to the media surface as possible. The relationship of low flying height and increased recording density can be discerned from the following equation which expresses the dependence of the length of a pulse width PW50, generated from a recording transition, on the other recording system and component parameters.

$$PW50=\{g^2+4(d+a)(d+a+\delta)\}^{1/2}$$

where g=gap length of the recording head
d=the distance separating the head and media
a=2 Mrδ/Hc (length of a recording transition)
δ=film thickness
Mrδ=magnetization—thickness product
Hc=coercivity The equation is derived by Williams and Comstock in "An Analytical Model of the Write Process in Digital Magnetic Recording", published in 17th Annual AIP Conference Proceedings, Part 1, No. 5, 1971, pp. 738–742, American Institute of Physics. In order to increase linear recording density, pulse width PW50 should be decreased. In order to decrease pulse width, all parameters g, d, a and δ as shown in the above equation should be decreased.

It is logical that a lower flying height will directly decrease the parameter "d" or head-to-media separation, but the full impact of reduced flying height on the other parameters of the above equation is not so self evident. A lower flying height creates sharper transitions and stronger read back signals which in turn can reduce the film thickness δ requirement. Further, a lower flying height can drastically improve the media over-write. The improved over-write allows use of higher coercivity media, which results in a narrower transition length "a", and also permits use of a head with a smaller gap "g". Hence, a lower flying height can effectively reduce factors g, d, a and δ and therefore reduce PW50 and increase recording density.

For this reason, bringing the head closer to the media (i.e., decreasing "d") has been a key area of effort in increasing recording densities. At first glance it may seem to be a simple matter to design the head to fly closer to the media by making the head fly lower and making the media as smooth as possible. In practice it is very difficult to achieve desired low fly height while maintaining integrity of the drive for recording purposes as intended. This difficulty is illustrated in the following series of examples.

As flying height of the read-write head slider is reduced, frequency and likelihood of intermittent contact with the disk increases during the drive operation. The slider also undergoes sliding contact with the disk whenever the drive motor is turned on or off. This repeated contact between the slider and the disk occurring when the drive is turned on and off is known as contact start stop (CSS). The CSS motion between the slider and the disk is of great concern in the reliability of the drive since it is generally the major initiator of failure in hard disk drives. In today's commercially available disk drives, generally 20,000 CSS cycles for desk-top computer applications and up to 100,000 CSS cycles for portable or hand-held computer applications are considered adequate. A greater number of CSS cycles are needed in portable and hand-held computer applications because the drives are frequently turned on and off to conserve battery power. Recently, there has been a trend to reduce power consumption in desktop computers. Therefore it is expected that CSS requirements will greatly increase for desktop applications as well.

In order to improve the CSS performance, it is well understood that friction must be minimized between the slider and the disk, and therefore it is common to apply a lubricant to the disk. If the lubricant is placed on a very smooth disk surface and a smooth slider comes to rest on the disk, a phenomenon called "stiction" occurs. Stiction is a force which binds the two surfaces together and can be strong enough to prevent the drive motor from turning, or worse yet, can damage the head or cause the head slider to ding the disk surface during separation of the slider from the disk surface. (The term "ding" is used in the art to describe an abnormal and sudden impact of the head against the disk surface which dents the disk surface around the impact area. This can occur, for example, by accidentally dropping the disk drive on a hard surface. This can also occur when the head is stuck on the disk surface during drive start-up due to high stiction, followed by sudden release of the head, which causes the head to bounce on and thereby dent the disk surface.)

It has been recognized that stiction can be reduced by putting a "micro-texture" on the disk surface to reduce the effective contact area between the slider and the disk. See, for example, Marchon et al., "Significance of Surface Roughness Measurements. Application to the Tribology of the Head/Disk Interface," Tribology and Mechanics of Magnetic Storage Systems VI, ASLE SP-26, page 71 (1990) (incorporated herein by reference), which describes the roughness needed to achieve an acceptable rate of increase in stiction under prolonged CSS for a disk comprising an aluminum/NiP substrate with a near concentric texture pattern. Also, Lee et al., describe the effect of texture crossing angle on CSS performance in "Effect of Disk Cross Hatch Texture on Tribological Performance", published in IEEE Transaction on Magnetics, Vol. 28, No 5, September 1992, pp. 2880–2882 (incorporated herein by reference). In effect, a rougher texture and modification of texture morphology in aluminum/NiP substrates is needed to achieve acceptable CSS performance. The texture pattern in an aluminum/NiP substrate is typically put on the disk by mechanically abrading the substrate surface using either free abrasives or fixed abrasive tape.

Alternatively, for magnetic disks including a glass substrate in lieu of aluminum/NiP, the glass substrate can be textured by chemically etching the surface as described by Kijima et al., in U.S. Pat. No. 4,833,001, by spin coating silica gel with hard $SiO_2$ particles followed by heat curing as described by Kawai et al., in U.S. Pat. No. 5,029,317, or by directly sputtering a metal layer which forms small bumps on the disk surface as described by Tsuno et al., in U.S. Pat. No. 5,055,359. (The '001, '317 and '359 patents are incorporated herein by reference.) In the case of alternative substrate materials, texture is still needed for acceptable CSS performance as is the case with aluminum/NiP substrates.

In all cases where texture is created on the disk surface, abnormal asperities of various heights may exist and the height and frequency of the asperities usually increases with an increase in texture roughness for a given texturing method. These asperities can adversely interact with the head during normal operation of the drive. If the asperities are sufficiently large and high, the head can hit the asperity, causing the head to fly unstably and result in erroneous read back of data. In the worst case scenario, if the impact of the hit is too severe it may cause head crash and the destruction of the disk drive. Since the disk rotates very fast during normal operation of the drive, it must be ensured that the head will not contact the asperities. Therefore a disk is typically tested for flyability of the head using a method called a "glide height test". A glide height test allows one to determine the safe flying distance where the head can fly without hitting the asperities on the disk surface. The necessity of a safety margin for flying height, because of the disk texture, adds to the head disk separation and is therefore undesirable. However, due to CSS and stiction requirements, heavy texture is a necessary feature in nearly all disks currently used in commercial disk drives. There have been several attempts to use smooth disks (and thus avoid the problems associated with textured disks) by preventing the head from landing on the disk when the drive is turned off (thus avoiding the problem of stiction). See Morehouse et al., in U.S. Pat. No. 4,933,785. In this drive design the head is pulled up a ramp (termed a ramp-load) to keep the head clear of the disk when the drive is turned off. It has been found, however, that the head does not behave stably when the head is loading onto the disk during initial start-up, and therefore head-disk contact can occur as described by Yamada et al., "Load-Unload Slider Dynamics in Magnetic Disk Drives", IEEE Trans. on Magnetics, Vol. 24, No. 6 pp. 2742–2744 November 1988 and Jeong et al., in "An Experimental Study of the Parameters that Determine Slider-Disk Contacts During Dynamic Load-Unload", ASME Journal of Tribology 1992, paper #91, trib-29. Due to reliability concerns, ramp load mechanisms have not met much commercial success. In addition, the ramp mechanism is not easy to implement in a multiple head disk stack assembly since additional vertical spacing is needed to accommodate the mechanism. Stacking multiple heads and disks is a key feature that allows for very high volumetric density in a drive, and being unable to provide this feature is a serious disadvantage.

In another design, Chew et al., describe in U.S. Pat. No. 4,839,756 a much more complicated scheme to load the head on and off the disk. However, the Chew mechanism takes up considerable vertical space and mass, and it is unsuitable for use in small drives. Further, the complexity of the mechanism adds significantly to the cost and is therefore currently used in only the most expensive large drive systems.

There have been even more radical approaches to address the problem of low flying height. Lemke et al., in U.S. Pat. No. 5,097,368 describe a drive wherein the entire head-disk interface is immersed in a non-Newtonian liquid lubricant in combination with a modified head bearing surface, which allows a head to slide at a distance on the order of 1µ" above the disk surface. This design could provide a much closer spacing between the head and disk than otherwise possible in air. In Lemke's device, the liquid contacts everything inside the drive, and significant problems will occur if the liquid becomes contaminated by various materials it contacts inside the drive. Also, means must be provided to maintain and replenish the liquid at the head-disk interface. The radical nature of the drive design introduces considerable technical challenges not normally encountered in conventional systems.

Similar to the media, designing a low fly height slider for flying in a conventional drive using an air bearing design is not difficult in principle, but satisfying the total requirement of the drive environment is not a trivial task. For example, conventional two rail taper flat sliders can be designed to fly lower by either reducing the rail width, increasing the suspension load, or a combination of the two. However either approach increases the unit contact pressure on the slider air bearing surface (ABS) which causes increased friction and aggravated media wear during CSS. To achieve high density recording evenly across the whole surface of a disk, the head not only needs to fly low but also to remain at a constant flying height without roll as the head moves across the disk surface. For this reason, a more sophisticated solution is needed to allow the head to fly lower and constant and accommodate the change in relative linear velocity between head and media as the head moves from the inner diameter (ID) to the outer diameter (OD), while still satisfying the disk drive CSS requirements.

Reducing friction to prolong CSS life of the disk and providing constant low flying height has been the focus of much of the effort on slider air bearing designs. Negative pressure air bearing designs as described by Garnier et al., in U.S. Pat. No. 3,855,625 provide constant and low flying height as the read-write head moves from the inner diameter (ID) to the outer diameter (OD) of the disk because negative pressure bearings are relatively velocity insensitive. In such designs, a sub ambient pressure is created under the negative pressure air bearing, which pulls the slider down during flight to allow the head to fly as close as possible to the media surface at a constant velocity from ID to OD. This design also effectively increases suspension load during flight and results in increased stiffness of the air bearing to provide more stable flying. However, Garnier's design works only with linear read-write head actuators, and it does not prevent rolling of the slider if a large skew angle is introduced between the disk and the read-write head. Therefore, Garnier's design is inapplicable for use in small drives which use a rotary actuator wherein skew is introduced between the slider and the disk to facilitate faster access.

More recently, Chapin et al., in U.S. Pat. No. 5,128,822 describe several slider designs which maintain constant and low flying height even if a skew angle is introduced between the disk and the read-write head. In addition, Chapin's slider design incorporates complicated air-bearing geometries that include channels and spoilers which are designed in part to allow fast take-off to reduce wear during CSS. Unfortunately, Chapin's approach has some severe disadvantages. For example, conventional diamond lapping techniques usually used to manufacture sliders inevitably cause the slider to generate debris during CSS cycles. This is because such diamond lapping techniques damage slider material, and the damaged material dislodges from the slider during CSS operation, as described by Chen et al., in U.S. patent application Ser. No. 07/933,431. Chapin's slider design does not address this problem. Therefore, no matter how fast Chapin's read/write head takes off or lands, this debris generation cannot be avoided. This debris accelerates additional wear of the disk. Therefore, in using this type of head, a rough disk texture similar to that needed for conventional heads must be used to reduce stiction and friction to thereby offset the acceleration of wear. In addition, the head and disk debris material thus generated combine with the lubricant on the disk and tend to agglomerate and stick to the slider ABS. The negative pressure region in Chapin's slider is particularly sensitive to debris collection due to stagnant air flow, and smaller structures such as channels and spoilers described by Chapin could quickly fill with debris. Such ABS contamination can cause the head to fly unstably and errors could occur during reading and writing. At worst, the slider may contact the disk and cause a head crash. Chapin's slider designs are also sensitive to asymmetrical contamination of the ABS. If the debris attaches itself first to one side or the other of the negative pressure region, or to the channels or the spoilers, the head can tip or roll to one side during flight. If the roll is severe enough, the lower rail will contact the disk and lead to catastrophic failure by head crash. In addition, the complex geometry of Chapin's air bearing surface requires complicated multi-step photo-lithography and plasma etching fabrication processes which are expensive. Unfortunately, even with such a complex design, Chapin's slider only achieves fly heights greater than 2μ". In order to fly such a slider below 2μ", there must be either some modification of the ABS or application of heavier gram load to the suspension, both of which can eventually lead to more severe CSS problems.

A simple and less expensive way to achieve constant flying height is described by Clifford et al., in "An Air Bearing Minimizing the Effects of Slider Skew Angle", published in IEEE Transaction on Magnetics, Vol. 25, No. 5 September 1989 pages 3713–3715, and by White in U.S. Pat. No. 4,870,519, each incorporated herein by reference. In Clifford's article, a cross-cut is made across the slider rail and in combination with a heavy gram load, a flat flying profile across the disk is obtained. In White's patent, a transverse pressure contour (TPC) is formed by placing a low step on both sides of the rail to obtain additional lift or a negative pressure effect so that the head flies at nearly constant flying height even if the skew angle varies. TPC and cross-cut designs are less expensive means of achieving a flat flying profile since they are generally easier to fabricate. These slider designs are much like conventional taper sliders in that lower flying height is achieved by narrowing the rails or increasing the suspension load. There are some constraints in narrowing the rails, since transducers must be placed in the width of the rails. Some amount of rail width is needed in order to place the coils and other transducer structures. Consequently, increasing gram loading of the suspension is the most effective way to lower the flying height for these types of constant flying height air bearing designs. Increasing gram loading is relatively easy. However, as discussed in earlier examples, an increased gram load aggravates media wear and therefore the applicability of this kind of air bearing for low fly height drives is limited by tribological constraints.

Thus far, all types of slider air bearing designs for low and constant fly height require a disk surface which must be roughened extensively to reduce stiction. Particularly, head designs with heavier suspension gram loading to achieve lower flying heights cause more severe media wear. For these heavy gram load designs, disk surface texture roughness must be increased even more to ensure continued reliability in light of greater tribological demands during prolonged CSS operation. No viable head structure and media surface morphology have yet been proposed for low flying height that satisfies tribological requirements and is also cost effective.

OBJECTS OF THE INVENTION

It is an object of our invention to provide a hard disk drive system including media and a read-write head which flies at a very low flying height.

It is another object of the invention to provide a hard disk drive system in which the head flies at near contact or virtual contact over the entire disk surface.

It is another object of the invention to provide a hard disk drive system which minimizes stiction and friction between the head and disk.

It is another object of the invention to provide a hard disk drive system in which disk wear is minimized.

It is another object of the invention to provide a hard disk drive system in which head flight is insensitive to skew with a near contact recording performance.

SUMMARY OF THE INVENTION

A hard disk system in accordance with our invention comprises a read-write head and a magnetic disk. Of importance, the disk texture is smoother than typical presently available disks. The disk should also be capable of a glide height of 1.2μ" or less, or have glide height capability equivalent to that of an untextured polished disk. In one embodiment, the disk has a roughness having an RA(high freq.) less than or equal to about 60 Å, and preferably less than or equal to about 50 Å, and an RA(low freq.) less than or equal to about 20 Å, and preferably less than about 15 Å. The slider ABS is mechanically conditioned and has a texture RA(AFM) between about 20 Å and 150 Å, and in one embodiment between 50 Å and 150 Å. Whereas in the prior art, most if not all of the texturing in a hard disk system was in the disk, we have shifted much of the texturing from the disk to the read-write head. This permits us to maintain low friction and stiction between the head and the disk. However, for reasons described in greater detail below, this does not cause a greater separation between the read-write head and the disk, nor does it cause other problems associated with a rough disk texture, e.g. creation of asperities, discussed above.

Throughout this patent, roughness is expressed in terms of RA. RA is a well-known measure of surface roughness, and is described in the Metals Handbook, edited by H. E. Boyer and T. L. Gall, published by the American Society for Metals in November 1985, incorporated herein by reference. The values for RA(high freq.) and RA(low freq.) are given as measured by a contact profiler using a 0.15 µm diameter diamond stylus scanned over a distance of 50 µm and a 2.5 µm diameter diamond stylus scanned over a distance of 1200 µm, respectively. The values for RA(AFM) are RA values as measured by an atomic force microscope. Further details concerning these RA values are described below.

In one embodiment of our invention, a flat head flying height is maintained at or less than 2µ" everywhere above the disk surface by using a TPC or cross-cut design along with the gram load required to maintain the head at 2µ". A gram load greater than 6 grams can be used with a slider having a nano-slider geometry and a gram load greater than 4 grams can be used with a slider having a pico-slider geometry to ensure low fly height. (The terms "pico-slider", "nano-slider" and "micro slider" are well-known terms used to describe the slider dimensions.) The potential risks of heavier gram loading to CSS performance are overcome by providing a novel combination of disk texture, slider ABS texture, and slider ABS conditioning process described below.

As mentioned above, the ABS texture roughness RA(AFM) is preferably between 20 and 150 Å. Pole-tip recession is preferably maintained at less than 0.5µ". The texture on the disk surface should be minimal, whether created by mechanical, sputtered or chemical means, to ensure adequate glide performance minimized head-disk spacing loss.

In one embodiment, the slider ABS texture is provided using a conditioning process performed by sliding the ABS over a rotating $ZrO_2$ overcoated disk. By this method, a slider texture roughness RA(AFM) between 20 and 50 Å can be conveniently obtained. In order to obtain a higher roughness RA(AFM) (between 50 and 150 Å), the slider ABS can be conditioned using a disk made from a glass ceramic material, for example, consisting of MgO, ZnO, $TiO_2$, $Al_2O_3$, $B_2O_3$, CaO and $SiO_2$, with about 30% crystalline phase material.

In another embodiment, the slider ABS surface RA(AFM) is about 20 to 50 Å. The magnetic disk comprises a mechanically abraded aluminum/NiP substrate with near concentric texture RA(high freq.) between 40 and 60 Å and a RA(low freq.) of less than or equal to about 25 Å. Alternatively if a disk is used comprising a chemically textured glass substrate instead of aluminum/NiP, the RA(high freq.) is between about 20 Å and 50 Å and the RA(low freq.) is less than or equal to about 10 Å.

In another embodiment, the slider surface RA(AFM) is about 50 to 75 Å, and a near concentric texture in the aluminum/NiP substrate of the disk has a RA(high freq.) between about 30 and 50 Å and a RA(low freq.) less than or equal to about 15 Å. Alternatively if the disk includes a chemically textured glass substrate instead of aluminum/NiP, the RA(high freq.) is between 20 and 30 Å and the RA(low freq.) is less than 10 Å.

In another embodiment, the slider surface RA(AFM) is between about 75 and 150 Å, and a near concentric texture provided in the aluminum/NiP substrate of the disk has a RA(high freq.) of about 20 to 30 Å and a RA(low freq.) less than or equal to about 10 Å. Alternatively, if a chemically textured glass substrate is used, the RA(high freq.) of the disk is between 10 to 20 Å and the RA(low freq.) less than 10 Å.

In other embodiments, other substrate materials textured by mechanical abrasion can be used. For such substrates, the RA values set forth above for aluminum/NiP may be used.

In other embodiments, other substrate materials that are chemically textured may be used. For such substrates, the RA values set forth above for glass may be used.

In another embodiment the texture provided on the disk is formed by deposition, e.g. vacuum deposition such as sputtering, for example by forming bumps on the substrate surface. In this case the roughness RA(AFM) of the slider ABS can be between about 20 and 150 Å, the sputtered texture on the disk surface RA(high freq.) is between about 10 and 50 Å and the RA(low freq.) is less than 10 Å. Typically, a substrate textured by this technique should have a RA as set forth for glass substrates, above.

The slider typically flies at a constant flying height. In one embodiment, the variation in flying height during use is less than 0.5µ" as the head changes position over the disk surface.

In another embodiment, a zoned texture disk is used. In other words, the disk includes a take-off and landing zone (the CSS zone) located at the inside radius of the disk. However, the portion of the disk surface where data is recorded (the data zone) is smooth and polished. The CSS zone texture roughness still can be reduced to avoid damaging contact between the low flying head and disk. The ABS surface roughness has a RA(AFM) of 20 to 150 Å, the CSS zone texture RA(high freq.) is between 20 to 50 Å, the CSS zone RA(low freq.) is less than 30 Å and the non-textured data zone has a maximum RA(high freq.) and RA(low freq.) of less than or equal to 10 Å.

In yet another embodiment, the texture on the disk is graded, so as to have a rough surface at the CSS zone, comparable to that of the CSS zone texture described above, but the CSS zone roughness decreases to form a gradual transition between the CSS and data zones to avoid a step at the transition between the CSS and data zones.

A drive comprising a slider and disk in accordance with our invention exhibits excellent CSS performance and virtual contact recording.

BRIEF DESCRIPTION OF THE DRAWINGS

FIG. 1 is a schematic representation of the slider to disk surface spacing loss.

FIG. 2 is a schematic plot showing that as flying height is lowered, it becomes more difficult for the head to take off or clear the disk. The plot shows friction coefficient (µ) vs. disk rotation speed for 2 and 4µ" flying height heads, and for heads designed for 3600 and 6400 rpm disk rotation speeds.

FIG. 3A is a Tencor trace of a 95 mm 2µ" glide height disk containing an aluminum/NiP substrate with a near concentric texture. (All disks described herein included aluminum/NiP substrates unless otherwise noted.) The trace was taken with 2.5 µm diameter diamond stylus over a scan length of 1200 µm. The disk was prepared by using 3 µm free alumina abrasive particles and a velvet cloth polishing pad, and finished with 2 µm alumina particles.

FIG. 3B shows a Tencor trace of the same disk as FIG. 3A, except that 0.15 µm diameter diamond stylus was used over a scan length of 50 µm.

FIG. 3C is a Tencor trace of 95 mm 1.2µ" glide height disk with a near concentric texture, which is capable of virtual contact recording performance. The trace was taken with 2.5 μm diameter diamond stylus over a scan length of 1200 μm. The disk was prepared by using 2.0 μm fixed alumina tape with softer binder material, and finished with nylon velvet without the abrasives.

FIG. 3D shows Tencor trace of the same disk as FIG. 3C, except that a 0.15 μm diameter diamond stylus was used over a scan length of 50 μm.

FIG. 4A shows a plot of low frequency amplitude modulation vs. RA(low freq.) for disks prepared by different texturing methods. Points in the left bottom corner are those for disks including a smooth untextured glass substrate.

FIG. 4B shows oscilloscope trace of the read-back amplitude signal of a 95 mm disk with a texture roughness RA(high freq.) of 68 Å and RA(low freq.) of 48 Å, using a head flying at 3μ".

FIG. 4C is an optical micrograph of the disk used to obtain the oscilloscope trace of FIG. 4B. Recorded tracks appear as light bands revealed by applying ferrofluid "decoration". Individual bits are also revealed by applying ferrofluid solution to the bits.

FIG. 5A is a high resolution SEM micrograph showing abnormal film growth around a texture gouge in an aluminum/NiP substrate textured with a near concentric pattern.

FIG. 5B is an AFM micrograph of an asperity (formed as a result of a texturing process) on a 95 mm disk having a RA(high freq.) of 68 Å and RA(low freq.) of 48 Å, textured using the same method as the disk B in Table I, below.

FIG. 5C is a single AFM trace taken at about 6000 nm along the Y axis into the depth of the image of FIG. 5B showing two peaks representing asperities created as a result of a gouging line formed during texturing.

FIG. 6A is a glide height avalanche curve of a 95 mm disk having an RA(high freq.) of 68 Å and RA(low freq.) of 48 Å, which was textured using the same method as disk B in Table I, with a texture crossing angle of 16 degrees at the ID of the disk.

FIG. 6B is a glide height avalanche curve of a 95 mm textured disk prepared in the same manner as disk C of Table I having a RA(high freq.) of 85 Å and RA(low freq.) of 25 Å, with a texture crossing angle of 16 degrees at the ID of the disk, and having fewer asperities than disk B of Table I.

FIG. 6C is a glide height avalanche curve of a 95 mm disk prepared in the same manner as disk D in Table I with a RA(high freq.) of 47 Å and RA(low freq.) of 11 Å, with a texture crossing angle of 22 degrees at the ID of the disk.

FIG. 6D is a glide height avalanche curve of a 95 mm disk having an RA(high freq.) of 37 Å and RA(low freq.) of 10 Å, prepared in the same manner as disk E in Table I with texture crossing angle of 11 degrees at the ID of the disk.

FIG. 6E is a glide height avalanche curve of a 95 mm disk having a RA(high freq.) of 34 Å and RA(low freq.) of 10 Å, prepared in the same way as disk F in Table I, with a texture angle of 0 degrees at the ID of the disk.

FIG. 6F is a glide height avalanche curve of an untextured 95 mm disk (i.e. polished) prepared in the same manner as disk G in Table I. The disk had a RA(high freq.) of 10 Å and RA(low freq.) of less than 10 Å.

FIG. 7A is an AFM micrograph of an unconditioned ABS surface of a micro-slider, with a RA(AFM) of 13 Å.

FIG. 7B is an AFM micrograph of a conditioned ABS surface of a micro-slider having a RA(AFM) of about 28 Å, where conditioning was done by sliding the head against a conditioning disk having a sputtered $ZrO_2$ overcoat.

FIG. 7C is an AFM micrograph of a conditioned ABS surface of a micro-slider having a RA(AFM) of about 56 Å, where conditioning was done by sliding the head against a glass ceramic disk.

FIG. 7D is an AFM micrograph of various parts of a conditioned ABS of a micro-slider having a RA(AFM) ranging from 14 to 86 Å. Conditioning was done by sliding the head against a glass ceramic disk.

FIG. 8A shows a CSS result using a 130 mm diameter disk prepared in the same manner as disk B of Table I with a RA(high freq.) of 64 Å and RA(low freq.) of 42 Å. CSS testing was done with an unconditioned AlTiC micro-slider using an 11 gram load at a test radius of 1.2 inches. (Hereinafter, "AlTiC" describes a slider comprising 70% $Al_2O_3$ and 30% TiC.)

FIG. 8B shows a CSS result using a 95 mm disk prepared in the same manner as disk B of Table I with a RA(high freq.) of 68 Å and RA(low freq.) of 48 Å. CSS testing was done with an unconditioned AlTiC micro-slider using an 11 gram load at test radius of 0.7 inches (17.8 mm).

FIG. 8C shows a CSS result using a disk similar to the disk in FIG. 8B, and an unconditioned AlTiC micro-slider using a 4.5 gram load at a test radius of 0.70 inches (17.8 mm).

FIG. 9A shows friction vs. CSS cycles for a 95 mm disk prepared in the same manner as the disk in FIG. 8B. An AlTiC micro-slider with a conditioned ABS having a RA(AFM) of 30 Å and an 11 gram load was used at a test radius of 0.7 inches.

FIG. 9B shows friction vs. number of cycles for a CSS test for a 95 mm disk textured with fixed 2 μm abrasive particles on a tape similar to the texture method of disk D of Table I. The RA(high freq.) of the disk was 58 Å and RA(low freq.) was 11 Å, with a crossing angle of 22 degrees. A micro-slider which was conditioned using a disk with a sputtered $ZrO_2$ coating and an 11 gram load were used.

FIG. 9C shows friction vs. number of cycles for a CSS test using a 95 mm disk textured using fixed 2 μm abrasive particles on a tape similar to the texture of disk D of Table I. The RA(high freq.) of the disk was 52 Å and RA(low freq.) was 11 Å, with a crossing angle of 22 degrees. A micro-slider which was conditioned with a disk with a sputtered $ZrO_2$ coating and an 11 gram load were used.

FIG. 9D shows friction vs. number of cycles for a CSS test using a 95 mm disk textured using fixed 2 μm abrasive particles on a tape similar to the texture of disk D of Table I. The RA(high freq.) of the disk was 37 Å and RA(low freq.) was 10 Å, with a crossing angle of 22 degrees. A micro-slider which was conditioned with a disk with sputtered $ZrO_2$ coating and an 11 gram load were used.

FIG. 10A shows friction vs. number of cycles for a CSS test using a 95 mm disk with a RA(high freq.) of 37 Å and RA(low freq.) of 10 Å and a crossing angle of 11 degrees. ABS conditioning was done by rubbing a nano-slider with a 3 gram suspension load against a $ZrO_2$ coated disk for 15 minutes resulting in an ABS texture RA(AFM) of about 15 Å.

FIG. 10B shows friction vs. number of cycles for a CSS test using the same type of 95 mm disk and test conditions as FIG. 10A, except that ABS conditioning was done by rubbing the slider against a $ZrO_2$ coated disk for 30 minutes to form an ABS texture RA(AFM) of about 15 Å.

FIG. 10C shows friction vs. number of cycles for a CSS test using the same type of 95 mm disk and test conditions as FIG. 10A, except that ABS conditioning was done by rubbing the slider against a ZrO$_2$ coated disk for 60 minutes to form an ABS texture RA(AFM) of about 25 Å.

FIG. 10D shows friction vs. number of cycles for a CSS test using the same type of disk and test conditions as FIG. 10A, except that ABS conditioning was done by rubbing the slider against a glass ceramic disk for 15 minutes to form an ABS texture RA(AFM) of about 50 Å.

FIG. 11A shows friction vs. number of cycles for a CSS test for a textured 95 mm disk having a RA(high freq.) of 47 Å and RA(low freq.) of 11 Å, and crossing angle of 22 degrees. The disk was textured using a method similar to that of disk D of Table I. ABS conditioning was done by rubbing a nano-slider with a 3 gram suspension load against a ZrO$_2$ coated disk for 15 minutes to form an ABS texture RA(AFM) of about 15 Å.

FIG. 11B shows friction vs. number of cycles for a CSS test for the same type of 95 mm disk and test conditions as FIG. 11A, except that ABS conditioning was done by rubbing the slider against a ZrO$_2$ coated disk for 30 minutes to form an ABS texture RA(AFM) of about 17 Å.

FIG. 11C shows friction vs. number of cycles for a CSS test for the same type of 95 mm disk and test conditions as FIG. 11A, except that ABS conditioning was done by rubbing the slider against a ZrO$_2$ coated disk for 60 minutes to form an ABS texture RA(AFM) of about 25 Å.

FIG. 11D shows friction vs. number of cycles for a CSS test for the same type of 95 mm disk and test conditions as FIG. 11A, except that ABS conditioning was done by rubbing the slider against a glass ceramic disk for 15 minutes to form an ABS texture RA(AFM) of about 50 Å.

FIGS. 12A-1 to 12A-3 are schematic drawings of a 50% Al$_2$O$_3$/50% TiC TPC nano-slider design.

FIG. 12B shows the theoretical flying height and pitch angle of the slider shown in FIG. 12A.

FIG. 12C shows the actual measured flying height and pitch angle of the slider shown in FIG. 12A.

FIG. 13A shows friction vs. number of cycles for a CSS test using a TPC slider as shown in FIG. 12A without ABS conditioning, tested on a 95 mm disk with a RA(high freq.) of 37 Å and RA(low freq.) of 10 Å, and a crossing angle of 11 degrees, textured using the same method as that of disk E in Table I.

FIG. 13B shows friction vs. number of cycles for a CSS test using a TPC slider as shown in FIG. 12A with ABS conditioning, having a RA(AFM) on the order of about 30 Å, tested using same type of disk and test conditions as FIG. 13A. Conditioning was done using a ZrO$_2$ coated disk with rose pattern texture, having crossing angle of 120 degrees.

FIGS. 14A and 14B are schematic representations of a plan view and cross sectional view of a conventional zone textured disk, respectively, having uniform rough texture in the landing zone and a smooth surface in the data zone.

FIG. 14C is a schematic representation of a cross sectional view of a disk including zone texture showing gradually decreasing texture roughness from the ID toward the OD in order to eliminate an abrupt transition between the landing and data zones.

DETAILED DESCRIPTION OF THE INVENTION

A hard disk drive typically includes a thin film sputtered disk and thin film magnetic head. One type of magnetic disk, and a method for making same, are described in detail in U.S. Pat. No. 5,180,640, issued to Yamashita et al., and incorporated herein by reference. A cross section of a typical thin film sputtered magnetic hard disk 10 and the head 20 are schematically illustrated in FIG. 1. The substrate material is typically an aluminum substrate 11 with plated NiP layer 12. NiP layer 12 is textured, generally in a concentric or near concentric pattern around the disk. The films deposited above NiP layer 12 conform to the texture morphology. A first deposited layer is an undercoat 13 above which a magnetic layer 14 is deposited. The magnetic layer in which the recording takes place is separated from the recording head transducer by the thickness of an overcoat 15, the spacing between the top of overcoat 15 and the slider surface 16 (also called the flying height), and the recession between slider surface 16 and the magnetic poles 18 of the transducer (also called the pole-tip recession). Typical thicknesses of the above layers and separations are as follows: The thickness of magnetic layer 14 is about 500 Å, the thickness of overcoat 15 is between 200 and 300 Å, the flying height is typically 3 to 5μ", and pole tip recession is between 0.5 and 1.0μ". (There is also a thin layer of liquid lubricant 19 on overcoat 15 which is typically 20 to 40 Å thick.)

The true magnetic separation (often termed the magnetic separation or spacing loss) between the media and the head is measured from the top of magnetic layer 14 to the lower tip of the magnetic poles 18 Å. The texture contributes to the spacing loss because the spacing loss is measured from an average height of the top of the magnetic layer to the pole-tip. As flying height is lowered, the contribution that rough texture makes to the spacing loss becomes very significant, and has important consequences in high density recording. When a high track density is used, uneven and excessively deep texture lines can cause significant signal amplitude loss in individual bits and cause them to be read back as errors. When texture lines are excessively deep, the signal loss extends over many bits and is observed as amplitude modulation.

In order to obtain the highest recording density, the spacing loss must be minimized as much as possible. This is achieved by minimizing pole-tip recession, flying height, texture roughness and overcoat thickness. Flying height can only be reduced by smoothing the disk surface through reduction of texture roughness. During texturing, asperities form as a result of gouging and other interactions between the disk and abrasive particles used to texture the disk. As texture is roughened, the number of asperities generally increases. If the head flies too low, it can collide with the asperities, thus causing the head to fly unstably, which causes errors to occur during read-write operations. If the contact is severe, the head can crash, thus destroying the drive. To avoid damaging contact, the head must fly at a safe distance above the level of roughness of the disk and the asperities. Texture is needed, however, to maintain low friction and stiction during CSS, and therefore it is difficult to reduce the texture roughness if a conventional slider is used. Generally the texture roughness is minimized as much as possible, while still maintaining adequate CSS performance. As CSS requirements become more severe, however, the texture roughness must actually be increased, and sometimes the overcoat thickness is also increased to provide additional protection from wear. In both cases, spacing loss is increased.

FIG. 2 schematically illustrates the friction vs. disk rotation speed in rpm for conventional two-rail taper flat heads designed to fly at 2μ" and 4μ". When the disk rotates slowly, the head drags along the disk surface and therefore friction is high. As rotation velocity increases, the friction decreases until the head clears the disk surface and starts to fly. At that point, friction reduces to a minimum value. A head designed to fly at a lower flying height has more difficulty taking off from the disk, and thus the head remains in contact with the disk for a longer time and friction between the disk and head remains higher for higher disk rotation speeds. For illustrative purposes, numerical values were arbitrarily assigned for take-off rpm in FIG. 2. These are not necessarily actual take-off rpm values for a given drive. Actual values could be higher or lower, depending on the given drive configuration and head-disk combination. For a head designed to fly at 4μ" with a 3600 rpm drive (curve 21), the take-off speed is 1000 rpm, while for a head designed to fly at 2μ" (curve 22), the take-off speed is 2000 rpm. A longer take-off time means that the head drags across the disk for a longer time and distance, and therefore the CSS wear will be more severe. For a drive designed to rotate at a higher speed such as 6400 rpm, the CSS situation becomes even more severe. For the head designed to fly at 4μ" (curve 23), the take-off speed increases to 3500 rpm, and for a head flying at 2μ" (curve 24), the take-off speed is 4300 rpm. Generally the disk rotation speed is greater for higher performance drives to obtain a faster data rate and shorter access time. It can be seen that lower flying heads and faster disk rotation speeds cause more severe CSS conditions.

As described above, the disk surface must have certain amount of roughness (or texture) to provide low stiction and good CSS performance. A number of methods are available to form the texture. In Table I, several aluminum/NiP disk types with varying textures prepared by several methods are tabulated. These disks and the processes used to make them serve as examples to illustrate the combination of disk and head features used to achieve the low flying height and excellent CSS characteristics that result from our invention.

TABLE I

| Disk ID | Texture Method | Disk Size (mm) | Cross Angle | RA (high freq.) (Å) | RA (low freq.) (Å) | Glide Height (μm) |
| --- | --- | --- | --- | --- | --- | --- |
| A | free abrasive | 130 | 4–7 | 93 | 77 | 4.0–5.0 |
| B | free abrasive | 95 | 20–40 | 68 | 48 | 2.0 |
| C | tape | 95 | 16 | 85 | 25 | 1.5 |
| D | tape/soft binder | 95 | 22 | 47 | 11 | 1.2 |
| E | tape/soft binder | 95 | 11 | 37 | 10 | 1.2 |
| F | tape/soft binder | 95 | 0 | 34 | 10 | 1.2 |
| G | as polished | 95 | — | 10 | 10 | 1.2 |

To accurately describe roughness of a surface, we have chosen to define roughness in terms of two RA parameters which are indicative of the effect of roughness on magnetic performance and the tribology of the surface. A stylus profiler such as the Tencor model P2 made by Tencor Instruments, Santa Clara, Calif. is appropriate for the roughness measurements. A typical surface roughness is composed of many frequency components. By using a very fine stylus diameter of 0.15 μm scanned over a distance of 50 μm, very small wavelength (or high frequency) features can be discerned. In this patent, the RA from this measurement is labeled as "high frequency RA", or RA(high freq.). Alternatively, a use of 2.5 μm stylus scanned over a much longer distance of 1200 μm provides information about long wavelength features or low frequency components. In this patent, this RA is labeled as "low frequency RA" or RA(low freq.). It will become more apparent as examples are shown that this convention is useful. In the literature, it is more common to define RA based on a large stylus diameter, such as a 2.0 μm stylus as described by Marchon et al., in "Significance of Surface Roughness Measurements. Application to the Tribology of the Head/Disc Interface" cited above. We will show that such RA (low frequency by our definition) is inadequate to describe the surface in terms of its behavior during CSS.

It is noted that there are other more sophisticated methods of roughness measurement such as by atomic force microscopy (AFM), which uses a stylus tip that is several orders of magnitude finer than those used in a contact profiler. An atomic force microscope measures essentially only the short wavelength or high frequency components of the texture and the scan area is generally very small. (One such atomic force microscope is the AFM Nano Scope II, made by Digital Instruments of Santa Barbara, Calif.) The RA obtained from AFM is quite different from those that are obtained from a contact profiler. Therefore RA measurements depend upon the method used, and care must be taken when interpreting RA values cited in literature. Stylus profiler measurements are fast and convenient, and use of high frequency and low frequency RA values are sufficient to describe the disk texture for the purpose at hand.

The method used to build the disks in Table I is described in more detail below. All the disks contain aluminum/NiP substrates, and all except disk A are 95 mm diameter disks. All the textured disks have a near concentric pattern.

The substrate of disk A was textured using a Strasbaugh Model 6DE-2SP texturing machine made by Strasbaugh Co., San Luis Obispo, Calif. The texture pad was type Suba IV, made by Rodel, Inc. of Newark, Del., and 3 μm free abrasive alumina particles were used to create the texture. The RA(low freq.) was 77 Å and RA(high freq.) was 93 Å. The texture crossing angle of the disk was between 4 and 7 degrees. This disk had a glide performance of approximately 4 to 5μ" with a flying height well above 7μ". The disk was 130 mm in diameter. The texture roughness was quite high, and such disks are no longer made due to excessive flying height.

The substrate of disk B was textured using the Strasbaugh texturing machine as for disk A. 3 μm free abrasive alumina particles were used, and finished with 2 μm particles. A texturing pad made from velvet cloth was used. RA(low freq.) was 48 Å and RA(high freq.) was 68 Å. The disk had a mixture of crossing angles, ranging from 20 to 40 degrees at the ID diameter of 0.7 inches. The disk was subjected to tape burnishing using a 1 μm diameter alumina tape. Tape burnishing is a method where a dry tape is passed over a rapidly rotating disk to remove asperities on the disk, and it is typically applied after the sputtering and lubrication steps. Generally tape burnishing does not change the RA of the disk. Because of the tape burnishing process, disk B has glide height capability of about 2μ", and flying height capability of about 4μ". If tape burnishing were not done, the glide height capability would be degraded by 0.5 to 1.0μ", and the flying height capability for the same disk would have been about 5μ". Tape burnishing is very commonly used now because it allows the use of a rougher texture while reducing the glide height problems caused by asperities. However, if the tape burnishing is overly aggressive, it can cause scratches on the disk surface and remove the magnetic layer and hence cause magnetic defects on the disk. FIGS. 3A and 3B show a Tencor profiler trace of low frequency and high frequency scan, respectively, of disk B.

The substrate of disk C was textured using an EDC model 1800 texturing machine, manufactured by EDC Corporation, San Carlos, Calif. A fixed alumina abrasive tape with 2 µm abrasive particles and a lubricant was used, then finished with a second step using a nylon velvet tape and lubricant only. The RA(low freq.) of the disk was 25 Å and the RA(high freq.) was 85 Å. The texture crossing angle at the 0.7 inch radius was 16 degrees. The glide height capability of the disk was 1.5µ" after the tape burnish process was applied, which was better than the disk B, even though the RA(high freq.) was actually higher. The flying height capability was expected to be around 3µ". The glide capability was much better because the RA(low freq.) was significantly reduced, and the method by which the high frequency texture was put on the disk reduced the formation of asperities over that of the process used for the disk of FIG. 3A (disk B).

The substrate of disk D was textured by an EDC texturing machine as for disk C using fixed abrasive tape. The abrasive particle size was the same as for disk C but the abrasive alumina particles were attached to the tape using a softer binder material. The corresponding RA(low freq.) of the disk was about 11 Å and the RA(high freq.) was 47 Å. The texture crossing angle at the 0.7 inch inner diameter was about 22 degrees. After the tape burnish step, the glide height performance of this disk was about 1.2µ", and it could support a 2µ" or lower flying height. The low frequency and high frequency Tencor scan trace for disk D is shown in FIGS. 3c and 3d, respectively.

The texture for disk E was prepared in the same manner as disk D, except that crossing angle was reduced to 11 degrees at the 0.7 inch radius.

The texture for disk F was prepared in the same manner as disk D, except that texture was completely concentric.

Disk G included a polished aluminum/NiP disk without any additional texturing. RA(low freq.) was about 10 Å and the RA(high freq.) was 10 Å. The glide height performance of this disk was about 1.2µ" and it could support a 2µ" flying height.

Typical currently available commercial media has high frequency RA that ranges from 60 to 150 Å, while the low frequency RA ranges from 35 to 80 Å. These ranges are the minimum texture roughness that each manufacturer has decided that can be tolerated while still maintaining good CSS performance with today's combination of head and media. Otherwise, they would have made the texture roughness smoother in order to achieve lower flying height. The minimum glide capability of most of the disks are around 2µ" which provides flying height of around 4µ". The mix of high and low frequency RA depends upon the texturing process and the equipment used. To some extent, the high and low frequency can be traded for each other. For example, greater high frequency RA values allow use of smaller low frequency RA values, and vice versa. This can be seen by comparing disk B and C in Table I, for example. Low frequency RA was reduced significantly for disk C in Table I but high frequency RA was actually increased. This was done to maintain adequate CSS performance in going from disk B to C. However, in order to fly lower, both low and high frequency roughness RA must be reduced. In current combinations of heads and disks, only so much roughness reduction is possible. Disks D to G, for example, are very smooth and have sufficiently low glide performance to allow the flying height to approach 2µ". However, the texture is actually too smooth (Disk G actually does not have any texture) and disks D to G do not provide good CSS performance using conventional head-disk combinations. For rougher disks, there is some improvement in glide height performance after the application of tape burnishing, but the gain is limited. Successively more aggressive tape burnishing is needed to improve glide performance of rougher disks, and too aggressive a burnishing process can start to damage the disk surface.

In addition to improving the glide performance, the texture roughness must be reduced in order to reduce the read-back amplitude modulation resulting from uneven head to disk spacing that comes from the texture. High and low frequency roughness contributes differently to the amplitude modulation, as expected by the relative distances that are involved in the measurements. In the low frequency roughness measurement, the short wavelength cut-off is of the order of 12 µm. In other words, the features being measured during low frequency RA measurement are larger than 12 µm wide. Since typical bit sizes are 5 to 10 µm long (i.e., 5 to 10 µm in a direction perpendicular to the recording track) by only a few tenths of a micron wide (i.e., a few tenths of a micron in the direction of the recording track), there will be many bits contained within the smallest texture feature that can be observed by a low frequency RA measurement. Likewise, for the high frequency RA measurements, the short-wavelength cut-off is about 700 Å. RA(high freq.) therefore can measure features that are on the order of the widths of individual bits.

Typically, the low frequency amplitude modulation of a read-back signal is measured in terms of the percent deviation from the average amplitude over a certain timing interval. FIG. 4A plots the modulation values as function of RA(low freq.) for disks with variety of texture types and roughnesses. A Guzik tester made by Guzik Technical Enterprises, San Jose, Calif., was used, and the head was a thin film micro-slider with track width of 12 µm, gap width of 0.45 µm and a flying height of 5µ". The recording frequency was 5 MHz. There was a good correlation between RA(low freq.) and the low frequency amplitude modulation values. The result is indicative of the space loss represented by the low frequency RA. Points in the left bottom corner of the plot are for disks including a smooth glass substrate which represent the best that can be achieved in terms of low frequency modulation. As flying height and track width are reduced further, the RA(low freq.) must be reduced as much as possible to the level of smooth substrates to reduce amplitude modulation.

High frequency roughness acts more locally, and affects the individual bits. In a severe case, an individual scratch line can cause a drop in signal amplitude of an individual bit which can lead to bit shift errors. FIG. 4B is an oscilloscope trace of read back amplitude from a disk including an aluminum/NiP substrate which was prepared in the same manner as disk B with a RA(high freq.) of 68 Å and a RA(low freq.) of 48 Å. The jaggedness in the readback amplitude represents modulation from amplitude variation in a chain of individual bits. The variation occurs because the disk texture was rough and spacing loss between the head and the magnetic layer fluctuated from one location to another. A corresponding optical micrograph of the disk surface is shown in FIG. 4C. Light horizontal lines correspond to recorded tracks, and individual bits within the track have been decorated (i.e., delineated) by applying ferrofluid marker. The central dark band with three light vertical marks are an erased band marker used to locate a deep pit (see the arrow drawn in the figure) which caused the large amplitude fluctuation seen in FIG. 4B (see arrow). The head used to generate the trace of FIG. 4C was a 5 µm track width thin film head with 0.3 µm gaps which flew at 3µ". As track width is further narrowed and flying height is reduced, the amplitude fluctuation due to spacing loss from texture scratches becomes even more significant, and could cause large numbers of bit and tracking errors to occur during read/write operation. Therefore the texture roughness must be reduced significantly in order to obtain higher recording density, particularly for a system designed to increase areal recording density by decreasing track width.

During mechanical texturing of aluminum/NiP substrates, asperities are generated as a result of abnormally large particles gouging the disk surface. (Such a gouge is shown in FIGS. 5B and 5C below). Asperities are those peaks which rise a significant height above the average roughness of the disk surface. Asperities can collide with the head, and potentially cause severe damage to the head and the media. While mechanical substrate texturing causes asperities and gouges, similar problems arise during chemical texturing of glass. For example, U.S. Pat. No. 5,087,481, issued to Chen et al., (incorporated by reference), teaches that asperities (referred to as "linkage bumps") are generated during chemical texturing of a glass substrate as a result of microcracks or dust particles present on the glass substrate prior to etching. Some chemical and mechanical processes are more prone to create asperities than others, but generally they are nearly always present. Generally, asperity density and height increase as roughness is increased for a given texturing process. The head must fly safely above the asperities to avoid damaging collisions.

FIG. 5A is a high resolution scanning electron micrograph (SEM) of an abnormal film growth around a small pit formed as result of gouging by the texture process. In addition to asperities generated during the texture process, the sputtered film can grow abnormally high around irregularities on the disk surface. Irregularities on the disk surface can be anything from small pits to sharp texture gouge lines. At low flying heights, such growths must be taken into account when one determines how low the head can fly.

FIG. 5B is an atomic force micrograph (AFM) image taken from a textured surface near a heavy gouge line showing a high ridge created by the NiP material extruded from the valley of the gouging area. This phenomena is also illustrated by the single AFM trace shown in FIG. 5C taken at approximately 6000 nm into the depth of the image of FIG. 5B. During texturing, an abnormally large abrasive particle can dig into the NiP and sharply deform it, causing material to flow onto the sidewall of the texture and form a high ridge. After sputtering, abnormal growth can occur along the ridge, causing the ridge to become even higher. Thus, the texture roughness again must be significantly reduced in order to reduce the texture generated asperities in order to permit a lower flying height.

The method used to determine the flyability of a disk is illustrated in FIGS. 6A to 6F, using the same type of disks as listed in Table I. The figures are a series of "glide avalanche" measurements. Glide avalanche measurement is a means of testing the "flyability" of the disk surface by successively lowering the flying height of a test slider which has a sensor attached to it to determine the frequency and strength of mechanical interaction between the head and asperities on the disk. The tests of FIGS. 6A to 6F were done using a thin film micro-slider comprising 70% alumina and 30% titanium carbide (hereinafter, referred to as AlTiC), 2.1 mm wide, 2.8 mm long and 0.610 mm thick. (In addition to the glide tests, all the CSS tests described below were also performed with AlTiC sliders unless otherwise noted.) The term micro-slider is a well-understood term in the industry and refers to the slider dimensions.

A piezo-electric crystal sensor attached to the read-write head flexure was used to generate a voltage as the head vibrated as a result of contact between the head and the disk. The flying height of the head was determined by another instrument so that flying height as function of linear velocity was known beforehand. In addition, a "bump" of known height on the disk was used to calibrate the strength of glide head sensor voltage to the size or the height of asperity the head has contacted. The plots of FIGS. 6A to 6F show the glide sensor signal in millivolts vs. linear velocity of the disk relative to the head expressed in inches per second (ips), which then can be converted to flying height. The data is taken from right to left, i.e., the head was initially flying well above the disk, and the sensor voltage was very low. Gradually, the disk rotation speed was reduced and eventually, the head began to contact the disk and the sensor voltage increased or "avalanched" rapidly. The knee in the voltage curve where the avalanche started is defined as the glide capability of the disk. Actual flying height of the head would be higher than the glide height capability of the disk because there must be a margin between the flying height and the glide height (called flying height budget) to ensure reliability. The flying height budget depends, among other things, on the distribution of the flying height of the heads. Currently, for disks with glide capability of 2.0μ", the head typically flies at 3.5 to 4.0μ". At a 1.5μ" glide capability, the head flies at about 3.0μ". For a 2.0μ" or lower flying height, the glide capability of the disk must approach 1.0μ" or lower.

All the disks in FIGS. 6A to 6F were sputtered with an approximately 500 Å thick CoNiCrPt alloy and a 200 Å carbon film. The disks were lubricated with 20 to 30 Å thick perfluoropolyether lubricant. Except for the disk in FIG. 6E (an untextured disk), all the disks were tape burnished using 1 μm alumina tape. The glide capability measured in FIGS. 6A to 6F are tabulated in Table I.

FIG. 6A shows a glide height avalanche curve for the disk B in Table I. The glide capability of this disk was approximately 200 ips, which corresponds to 2.0μ". The texture produced by this method had high asperities due to formation of texture gouges and sputter induced abnormal growth as described earlier in the discussion of FIGS. 5A and 5C.

FIG. 6B is a glide height avalanche curve of disk C of Table I with a RA(high freq.) of 85 Å and RA(low freq.) of 25 Å, with a texture crossing angle of 16 degrees at the ID. The glide height capability was improved over that of disk B to 150 ips, which corresponds to 1.5μ". It is again noted that this disk was actually rougher in terms of RA(high freq.) than disk B, but the RA(low freq.) was markedly lower. Much of the glide height improvement for disk C came from the fact that asperities due to texturing were significantly reduced over that of disk B.

FIG. 6C is a glide height avalanche curve of disk D of Table I with a RA(high freq.) of 47 Å and RA(low freq.) of 11 Å and a texture crossing angle of 22 degrees. Glide capability was a little under 120 ips, which corresponds to a glide height of about 1.2μ". This glide capability was much better than that achieved using the texturing processes of disks A to C. Particularly in comparison with disk C, disk D used the same two-step texture method except for a softer binder, resulting in much better glide height performance. This demonstrates that without a high disk RA requirement, one could use a less aggressive tape during texturing which would create fewer gouges and better glide height performance to allow for lower flying height.

FIG. 6D is a glide height avalanche curve of disk E of Table I with a RA(high freq.) of 37 Å and RA(low freq.) of 10 Å. The disk was prepared in the same way as disk D, except the texture angle was 11 degrees. Glide capability was a little under 120 ips, which corresponds to about 1.2μ".

FIG. 6E is a glide height avalanche curve of textured disk F of Table I with a RA(high freq.) of 34 Å and RA(low freq.) of 10 Å prepared in the same way as disk D, except that the texture angle was 0 degrees. Glide capability was also a little under 120 ips, which corresponds to about 1.2μ".

FIG. 6F is a glide height avalanche curve of disk G of Table I which included a polished aluminum/NiP substrate with a RA(high freq.) of 10 Å and RA(low freq.) of 10 Å. Glide capability was a little under 120 ips which corresponds to about 1.2μ". It can be seen that disks in FIGS. 6C to 6E (Disk D, E, F) with finer texture have excellent glide capability similar to that of a smooth untextured disk. Apparently, when the texture is at the level of these disks, there is much less likelihood of creating texture gouges and forming abnormal sputter growths. Consequently the glide performance can be similar to that of untextured polished disks. The results shown in FIGS. 6A to 6F demonstrate that if there were no need for high texture roughness, one could use gentler materials such as a soft binder, which creates less roughness but also creates less gouging. Thus, a low flying height could be achieved.

Prior to texturing, the substrates used in disks D, E and F were smooth and untextured, i.e. like the substrate of disk G. The glide results achieved with disks D to G suggest that glide performance is limited by the smoothness of the starting substrate before texturing. This further suggests that if the substrates prior to texturing were even smoother, even better glide performance could be achieved.

In spite of the glide height performance advantages shown for the smooth disks D to F, these disks cannot be used in a practical drives in use today, because the CSS performance is poor when used with conventional sliders. The disks are simply too smooth, and stiction values are too high. Further, if one attempted to use smooth disks with conventional sliders, debris generation from the sliders would exacerbate friction, stiction and wear to an extent even greater than if conventional sliders were used with rough disks. To understand why, one must understand how long and short wavelength roughness (i.e., low and high frequency RA roughness) interact with debris during CSS.

We have discovered that long and short wavelength roughness have important consequences in CSS performance. During CSS, the slider rubs against the disk surface, thereby generating debris from the slider and disk surface. This effect was described previously in U.S. patent application Ser. Nos. 07/933,431 and 07/957,535 filed by Chen et al., (incorporated herein by reference), where it was found that a conventionally prepared slider has a damaged layer on its ABS which sheds particles into the slider/disk interface during CSS and causes rapid increase in the friction and stiction values. The hard debris particles generated from the slider act as an abrasive to wear the disk surface.

We have discovered that in the presence of both short and long wavelength roughness, the debris generated during CSS can be hidden away in the texture crevices and delay the abrasive wear of the disk surface. The greater the roughness, the more debris can be hidden in the texture crevices. Although both long and short wavelength roughness effectively creates the volume necessary to "hide" CSS debris, we have discovered that higher value of long wavelength or RA(low freq.) roughness is quite effective in masking debris dislodging from the head, as opposed to having only the short wavelength roughness. This effect is described in more detail below in the discussion of CSS test results.

Debris generation from the slider is a critical factor which degrades CSS performance. When one attempts to use smooth disks which lack crevices for the debris to "hide", it is even more critical that debris not be generated. The Chen applications describe a slider surface conditioning process which removes all possible debris generating events and also results in a textured slider. We have discovered that the Chen surface conditioning can be performed in such a way as to leave an ABS texture which can be used with a smooth disk. Central to this discovery was our realization that one of the reasons smooth disks could not be used in the past was that there are no crevices in a smooth disk where debris could hide. Since Chen's conditioning process prevents further debris generation during CSS, we discovered that a conditioned slider can be used with a smooth disk.

Briefly, head manufacturing and conditioning involve the following steps:

1. The slider is cut from a wafer using a saw.

2. The slider is subjected to a first diamond lapping step using relatively coarse diamond particles (about 2 μm or larger in diameter) to rapidly remove excess slider material to bring the slider dimensions (and particularly with respect to the "throat height" distance, i.e. the distance between the ABS and the pole tip) close to an ultimately desired value. (Diamond lapping is a more precisely controlled process than a saw. Thus, it is desirable to use diamond lapping to control this distance.)

3. Thereafter, the slider is subjected to a second diamond lapping step using smaller diamond particles (e.g. about 0.1 to 0.25 μm in diameter) to more slowly and more precisely bring the throat height to the ultimately desired value.

4. Thereafter, the slider is rubbed against a material that has a hardness comparable to or softer than the slider hardness (in one embodiment less than 120% of the Knoop hardness of the slider material) to remove slider material damaged during lapping, thereby eliminating all the debris generation, even on the ABS, and leaving the slider ABS textured. This step is referred to as "conditioning". The above-incorporated Chen et al., applications described in more detail materials that can be used to condition the ABS.

FIG. 7A is an AFM micrograph of a AlTiC micro-slider having a non-conditioned, as-lapped ABS surface, with a RA(AFM) of 10 Å and a RMS roughness of 13 Å. (RMS means "root mean square", and is an alternative measure of roughness.)

FIG. 7B is an AFM micrograph of a conditioned ABS surface with a RA(AFM) of 21 Å (RMS=29 Å), conditioned by sliding the head against a conditioning disk covered with a sputtered $ZrO_2$ film. The slider had an 11 gram load. The conditioning process was as follows: The conditioning disk rotation speed was ramped from 0 to 1300 rpm over a period of 4 seconds, and then held at 1300 rpm for 1 second. Then the speed was lowered to 100 rpm in 4 seconds, and held at 100 rpm for 1 second. The process was then repeated 30 times. The speed was then ramped to 500 rpm in 4 seconds and held there for 10 minutes, and then ramped down to zero rpm in 4 seconds.

FIG. 7C is an AFM micrograph of a conditioned ABS surface, with a RA(AFM) of 56 Å (RMS=77 Å) conditioned by sliding the head against a glass ceramic disk. The glass ceramic contained 52.2 mol % $SiO_2$, 10.2 mol % $Al_2O_3$, 2.3 mol % $B_2O_3$, 19.3 mol % MgO, 4.7 mol % CaO, 4.7 mol % ZnO, and 6.5 mol % $TiO_2$, and the remainder consisting of impurities. The main crystalline phase was a mixture of enstatite, gahnite and rutile. The crystalline phase constituted about 30% of the disk by volume. This material is available under the tradename "New Cryston," manufactured by Asahi Glass Co. Japan.

The same disk rotation program as described above in relation to FIG. 7B was used in FIG. 7C. The glass ceramic material was more aggressive than sputtered $ZrO_2$ for conditioning the slider, and resulted in faster conditioning and a deeper texture.

The reason glass ceramic can provide faster and more effective conditioning can be explained as follows: A glass ceramic consists of fine and hard crystalline particles embedded in a mechanically weaker glass phase. During conditioning, the weak glass phase is worn down more than the slider and the resulting debris from both the slider and glass ceramic is pushed outside the conditioning disk wear track, continuously exposing the hard crystalline phase to rub the slider. A groove is formed on the glass ceramic surface which conforms to the slider topology, hence resulting in more effective conditioning, i.e. deeper and more uniform texture across the ABS surface in less time compared to hard surface conditioning material such as $ZrO_2$ of FIG. 7B. A sputtered $ZrO_2$ surface is hard and relatively tough and thus will not wear down as easily as glass ceramic to allow a head to penetrate below the $ZrO_2$ surface for optimal conditioning. The optimal conditioning occurring below the surface of the glass ceramic disk is not only faster and more effective for conditioning the slider ABS, but also results in more effective removal of sharp and damaged particles from the corners of the ABS.

FIG. 7D shows AFM micrographs from various parts of an ABS conditioned using the same method as in FIG. 7C. It is important that the conditioning process cover the entire ABS to achieve the best CSS results. FIG. 7D shows that glass ceramic material is effective in conditioning the entire ABS. The trailing edge of the ABS is less conditioned than other areas of the ABS, as can be discerned from the AFM image of position 4 and the corresponding low RMS and RA shown in FIG. 7D. However, this non-uniformity of conditioning can be improved by modifying the conditioning process, e.g. by changing the ramping profile, addition and placement of gram load, or disk rotation. For example, if conditioning of the trailing edge of the ABS of FIG. 7D is to be improved, extra weight can be applied to the suspension during the conditioning process, or the rotation speed of the disk can be varied or a ramp profile of speed can be provided to allow the trailing edge of the slider to drag on the conditioning disk longer than other parts of the ABS.

FIG. 8A shows the result of a CSS test. This test (and all other CSS tests described herein) were performed in an environment of about 20° C. and normal ambient room humidity. The disk used was a 130 mm diameter disk prepared in the same manner as Disk B in Table I with a RA(low freq.) of 64 Å and RA(high freq.) of 42 Å. This roughness is somewhat lower than that obtained for a 95 mm disk due to slight difference in the texturing machine setup for a larger 130 mm diameter disk. An unconditioned micro-slider was used with an 11 gram load. The slider was placed at a radius of 1.2 inches from the disk center. The head was designed to fly at around 4 to 5µ" and the disk was capable of a 2µ" glide height. The disk was lubricated with a perfluoropolyether lubricant that was 30 Å thick. The CSS plot shows initial rapid increase in the friction value from about 5 grams which peaked at 25 grams at around 3000 cycles. Then, friction decreases somewhat and stabilizes to a high but constant value (about 20 grams). The interpretation of the "hump" in the CSS plot is as follows. Initially, the interaction of disk surface and the head caused particles to dislodge from the slider ABS into the head/disk interface during CSS. One of any number of causes for the initial event can be cited. The disk surface may be quite abrasive due to its texture, the overcoat or the amount of lubricant, for example. The dislodged particles then interacted with the slider surface and even more particles were generated. The resulting chain reaction was manifested by rapid increase in friction. Eventually, however, the slider surface generated whatever amount of particles could dislodge therefrom, and particle generation from the slider eventually diminished. At this point the dynamic friction started to decrease and finally the total friction value stabilized at a high value of 25 grams. By then, the damage had been done to the disk surface in the form of wear so that part of the disk surface became smoother. Although the CSS testing shown in FIG. 8A did not distinguish between dynamic and static friction due to the way the data was collected, it is reasonably certain that initial hump was largely due to increased dynamic friction from the presence of a large amount of particles at the head/disk interface. Once the particle generation subsided, the friction was largely of a static friction type.

The texture and the abrasiveness of the disk surface contributed to the extent of slider debris generation. When the texture surface is rough, for example, the particles generated from the head may be hidden away in the texture crevices and do not act upon the slider surface again. If the texture is smooth, the particles cannot hide in the texture crevices, and continue to interact with the slider ABS and disk surface. Therefore the smoother surface actually may enhance the slider generated debris formation by causing a cascade of additional particles to dislodge from the slider. Thicker lubricant on the other hand may slow down the particles dislodging from the slider by reducing the friction between the slider and the disk.

FIG. 8B shows friction vs. number of CSS cycles for a CSS test on a 95 mm diameter disk, using an unconditioned micro-slider with an 11 gram suspension load as in FIG. 8A. CSS testing was performed at a radius of 0.70 inches. The disk was prepared in the same manner as disk B, but with a higher RA(high freq.) of 68 Å and a RA(low freq.) of 48 Å. The CSS result shows initial erratic friction behavior up to about 2000 cycles, followed by steady increase up to around 10,000 cycles. The friction then appears to stabilize at a high value up to 25 grams thereafter. The interpretation of the result is again based on the interaction of the slider ABS with the disk surface. Initial erratic friction behavior indicated particles dislodging from the head into the head/disk interface. Unlike the 130 mm disk of FIG. 8A, the friction increase was much more gradual and there was no large "hump" in the curve. This difference is thought to depend at least in part upon disk texture roughness and lubricant thickness as mentioned previously. Nevertheless, the friction increase was noticeably large and the performance was considered barely adequate.

By conventional wisdom, one of the method to improve the CSS performance of FIGS. 8A and 8B would be to increase the texture roughness, and/or increase carbon thickness, and/or increase the lubricant thickness. These solutions, however, as previously mentioned lead to greater spacing loss. Another conventional method of reducing friction during CSS is to reduce gram loading of the head. This is illustrated in FIG. 8C, which shows friction vs. number of cycles for a CSS test using an unconditioned micro-slider with a lighter 4.5 gram suspension load. The disk used was 95 mm in diameter prepared in the same manner as the disk in FIG. 8B (disk B in Table I). By using lower suspension gram loading, the CSS result of FIG. 8C improved over that of FIG. 8B as indicated that by lower maximum friction value of about 15 grams at 15000 cycles. However, friction still increased with CSS cycles up to around 4000 cycles, and the friction behavior still indicated that debris was generated from the slider ABS.

In order to efficiently generate sufficient data for qualification purposes in a laboratory setting, a CSS chart is typically generated using short cycle times between dynamic and resting modes. For example, the CSS tests performed to create these figures had a total cycle time of 15 seconds, including approximately 5 seconds of rest and 10 seconds of disk rotation. Stiction and dynamic friction values were taken at each cycle when the disk began to rotate from 0 to 3600 rpm.

In actual use, the drive may routinely be turned off, leaving the head parked on the media for an extended period, on the order of at least a few hours. Because longer parking can increase stiction between the head and media, it is customary during routine CSS testing to also take stiction values at intervals of several thousand cycles after parking the head for several hours. This stiction measurement after prolonged parking ensures that the maximum stiction in actual use will not exceed the design limitation of the drive.

In FIG. 8C, discrete lines at 5000 cycle intervals (marked with an asterisk) are stiction values of the head-media interface after parking for two hours. As can be seen, prolonged parking stiction values increased with the number of CSS cycles and were approximately twice as high as stiction values for the normal short period (about 5 seconds) CSS test cycles. The stiction values following prolonged parking are indicative of wear on the disk surface. The surface was smoothed out, and making the head rest on it for a while caused the head to tend to stick. For FIGS. 8A and 8B, stiction tests following prolonged parking were not done. If they were, the value would have been even much higher than in FIG. 8C.

The results of FIGS. 8A, 8B and 8C show that if the slider ABS is not conditioned and textured, even a roughly textured disk surface with limited flying capability (a glide height of 2µ") will exhibit very high stiction and friction values. FIG. 8B shows stiction values approaching 25 grams by 10,000 CSS cycles for an 11 gram load, without even considering parking stiction. Stiction values approaching 25 grams by 15,000 CSS cycles can be seen in FIG. 8C for a 4.5 gram load, with parking stiction taken into account. These high stiction values, even if they were within specifications, would make the design of a drive difficult due to the greater torque requirement for the motor and also because the CSS reliability of such a drive would be marginal at best. If a rougher texture were created on the disk using prior art texture methods to achieve better margin for design and CSS requirements, producing a glide height of 2µ" would be almost impossible, not to mention a glide height of 1.2µ" or lower, which is required for flying heights of 2µ" or lower as required in virtual contact recording.

FIGS. 9A to 9D show the extent to which the disk texture can be smoothed while using conditioned but otherwise conventional sliders. The sliders used in the CSS tests were micro-sliders with an 11 gram suspension load as in FIGS. 8A and 8B, except the sliders were conditioned. $ZrO_2$ coated disks were used to condition the slider ABS using the same process as described for FIG. 7B. The RA(AFM) of the slider ABS was typically around 30 Å using this ABS conditioning method. Disks of various texture roughnesses were prepared to determine the disk roughness needed to satisfy the CSS requirement if a slider roughness RA(AFM) of about 30 Å is used.

The disk of FIG. 9A was a 95 mm diameter disk prepared in the same manner as disk B in Table I using free abrasive particle texturing method. Lubricant thickness was about 40 Å. The RA(low freq.) was 48 Å, and the RA(high freq.) was 68 Å. CSS testing was done at a radius of 0.7 inches (17.8 mm). The glide height capability of the disk was approximately 2.0µ". The friction value was initially about 3.5 grams and rose to about only 6 grams after 15,000 CSS cycles. Compared to the results shown in FIG. 8B, which used the same type of disk, unconditioned slider and 11 gram load, the CSS performance improved significantly by using a conditioned head. It is noted that there was absolutely no erratic behavior in the friction values, thus indicating an absence of particle generation from the slider ABS. Consequently, it would appear that a smoother disk texture may be used while still obtaining acceptable CSS performance.

FIG. 9B shows the results of a CSS test using a disk having a texture prepared using the same two-step process and abrasive tape as that of disks D to F in Table I. The RA(high freq.) of the disk was 58 Å, and RA(low freq.) was 11 Å. RA(high freq.) was higher than the disks D to F, due to a higher tape feeding speed, and the texture had a crossing angle of 22 degrees. Lubricant thickness was about 42 Å. As shown in FIG. 9B, the friction was initially about 7 grams and stayed low and did not increase by much for up to about 15,000 CSS cycles. After 15,000 cycles, stiction was less than 10.5 grams. Therefore it can be seen already that smoother texture disks can be used with conditioned sliders even though in this case the gram loading of the slider was still very high (11 grams).

FIG. 9C shows the results of a CSS test using a disk with a texture prepared in the same manner as the disk in FIG. 9B, with a RA(high freq.) of 52 Å and RA(low freq.) of 11 Å. Lubricant thickness was about 39 Å. The texture was smoother than FIG. 9B due to a change in tape feeding speed. The crossing angle of the texture was still 22 degrees. The disk was smoother than that in FIG. 9B, and friction was again relatively low, although some variation in friction values can be seen. Stiction was initially 8 grams and rose to about 11 grams after 15,000 cycles.

FIG. 9D shows the results of a CSS test on a disk with a texture prepared by the same process as that in FIG. 9B, but the RA(high freq.) of the disk was further reduced to 37 Å and RA(low freq.) was 11 Å, due to another change in tape feeding speed. The crossing angle of the texture was 22 degrees. Lubricant thickness was about 26 Å. The CSS results were still better than for an unconditioned slider of FIG. 8B. Friction in FIG. 9D increased faster than in FIGS. 9A to 9C, and friction was higher as can be seen from the amplitude of the envelope of the CSS trace. Specifically, friction was initially about 8 grams and rose to about 15 grams after 15,000 cycles. However, it is noteworthy that for such a smooth disk, the CSS was still much better than that of the unconditioned slider in FIG. 8B using the same 11 gram load and a much rougher disk. This result shows that for a slider ABS having a RA(AFM) of 30 Å, CSS requirements could be satisfied using disks with a RA(high freq.) between 37 and 52 Å.

In the next set of CSS data shown in FIGS. 10A to 10D, disks using identically textured carbon-coated disks having aluminum/NiP substrates were used throughout the series. The disks were all 95 mm in diameter, and CSS testing was performed at a radius of 0.70 inches (17.8 mm). They were textured in the same way as disk E in Table I which had a RA(high freq.) of 37 Å, a RA(low freq.) of 10 Å, a crossing angle of 11 degrees and the same glide height capability as a polished untextured disk (approximately 1.2µ"). All the disks in the CSS test were lubricated with perfluorinated polyether lubricant, and a lubricant thickness of about 27 Å. While keeping the disk texture the same, the slider texture roughness was modified by using different conditioning processes. AlTiC nano-sliders were used, with a suspension load of 3.0 grams, and the head flew at 3μ". (The term "nano-slider" is well known in the art. The nano-slider was 1.5 mm wide, 2.0 mm long and 0.5 mm thick.)

FIG. 10A is a CSS test result using slider which was conditioned by dragging the slider over a disk having the same structure as a normal magnetic disk, but included a sputtered $ZrO_2$ overcoat instead of a carbon overcoat. The conditioning disk had a texture cross angle of about 30 degrees created with a fine slurry similar to the disk B in Table I. The conditioning disk rotation was varied from 0 to 1300 rpm sinusoidally with a period of 20 seconds, and this was repeated for 15 minutes. This process resulted in an ABS RA(AFM) of 15 Å. (Due to RA variations within a slider's ABS as well as variations from slider to slider, ABS texture RA values used in FIGS. 10, 11 and 13 are process averages taken from a large number of sliders subjected to the same conditioning procedure.) The CSS results show numerous spikes indicating a stiction problem. This result indicates that the disk surface RA was too smooth for the ABS being used under the present disk lubrication conditions and hence caused stiction. The "base-line" of the CSS trace shows a well-behaved, slightly linear increase which indicates that wear is controlled and not excessive. Visual observation of the disk surface after testing also indicated that minimal wear had occurred.

FIG. 10B is a CSS test result for a slider conditioned in the same way as described for FIG. 10A, except that the dragging time during conditioning was increased to 30 minutes. The resulting RA(AFM) of the slider ABS was 17 Å. The CSS result again shows considerably high spikes indicating high stiction between the disk and head for the same reason as in FIG. 10A.

FIG. 10C is a CSS test result using a slider which was conditioned for 60 minutes. This resulted in an ABS RA(AFM) of 25 Å. The roughness of the ABS was higher and CSS improved considerably over that of FIGS. 10A and 10B. The stiction values were considerably better than the smoother slider texture of FIGS. 10A and 10B, and remained under 20 grams even after 7,000 cycles.

FIG. 10D is a CSS test result using an ABS conditioning process where the $ZrO_2$ disk was replaced with glass ceramic disk as described earlier for FIG. 7C. The total conditioning time was only 15 minutes, but because the ceramic disk was much more aggressive for head conditioning than the $ZrO_2$ disk, the resulting ABS roughness RA(AFM) was up to 50 Å. Consequently, it can be seen now that CSS results were markedly improved over previous results. Stiction remained below 5 grams, even after 15,000 cycles.

The results shown in FIGS. 10A to 10C, which used $ZrO_2$ for conditioning, indicate that increasing the conditioning time from 15 to 60 minutes improved CSS performance. This may not only be because a prolonged conditioning time increases the RA of the ABS, but also because it may produce greater uniformity of conditioning across the ABS. The significance of uniformity of conditioning across the ABS is mentioned above in the detailed description of FIG. 7D. The best results shown in FIG. 10D indicate that using a glass ceramic disk for only 15 minutes is more effective than conditioning the ABS for 60 minutes on a $ZrO_2$ surface. The reason for the enhanced effectiveness of glass ceramic is described above in the discussion of FIG. 7C.

FIGS. 11A to 11D show a similar set of data as in FIGS. 10A to 10D, but using disks having aluminum/NiP substrates textured with the same process as that of disk D in Table I. The disks used for this series had the same RA(high freq.) of 37 Å and RA(low freq.) of 11 Å, and glide height capability of 1.2μ" as for disks used in FIG. 10, but with a higher crossing angle of 22 degrees rather than the 11 degrees of the disks in FIG. 10. A higher texture crossing angle may provide somewhat increased roughness in a microscopic sense, which means a decreased effective contact area between the head and disk. This is seen in the high frequency RA values. The decreased effective contact area can reduce stiction. In all cases the disks had a lubricant thickness of about 28 Å, similar to those of FIGS. 10A to 10D. The sliders were AlTiC nano-sliders conditioned in the same way as described for FIGS. 10A to 10D. A 3 gram suspension load was used.

FIG. 11A is a CSS test result with a slider conditioned using a conditioning disk having a sputtered $ZrO_2$ overcoat. The conditioning disk speed was varied sinusoidally as in FIG. 10A for 15 minutes. The slider ABS RA(AFM) was 15 Å. In FIG. 12A, stiction was initially about 7 grams, but increased to 11 grams with spikes as high as 18 grams. The CSS result of FIG. 11A was better than that of FIG. 10A, but results still show some stiction spikes.

FIG. 11B is a CSS test result with a slider conditioning time of 30 minutes. The ABS RA(AFM) was 17 Å. The CSS results were slightly improved over that of FIG. 11A. Stiction rose from about 6.5 grams to 11 grams after 7,000 cycles, with one 20 gram spike at about 5,000 cycles.

FIG. 11C is a CSS test result using slider with 60 minutes of ABS conditioning and RA(AFM) of 25 Å. There was more improvement in CSS performance over those of FIGS. 11A and 11B. Stiction was initially 7.5 grams and rose to 10 grams after 7,000 cycles. The CSS of FIGS. 11A, 11B and 11C improved over the corresponding results for FIGS. 10A, 10B and 10C, possibly due to the increased texture crossing angle or reduction in head-disk effective contact area as hypothesized earlier.

Finally, FIG. 11D is a CSS test result using slider with only 15 minutes of ABS conditioning on a glass ceramic disk. The resulting RA(AFM) was about 50 Å. As in FIG. 11D, the CSS result of 11D was the best of this series because of the high RA of the textured ABS achieved using a glass ceramic conditioning disk. The friction value was initially 7 grams and rose to about 10 grams after 15,000 cycles.

CSS results shown in FIGS. 10A to 10D and 11A to 11D clearly show that considerable reduction can be made in the disk texture if the slider ABS is conditioned to appropriate texture roughness. In FIGS. 10A to 10D and 11A to 11D, the disks used were capable of approaching a smooth polished texture in terms of their glide avalanche capability. Therefore the disks are appropriate for flying height at or below 2μ". More importantly, by using slider with appropriate roughness matched to the disk texture, the CSS performance can be made good enough for practical application in the drives using otherwise conventional designs and still approach virtual contact recording.

What remains to be discussed is whether acceptable CSS performance can be achieved on a low glide height capability fine textured disk using a slider designed for a low and flat flying profile across the disk surface and appropriate for use with a rotary actuator. FIGS. 12A-1 to 12A-3 are schematic drawing of a 50% $Al_2O_3$-50% TiC TPC nano-slider design. TPC sliders contain a step cut into the slider body and rails to minimize sensitivity to skew angle. The theory of TPC air bearing design is described by White in U.S. Pat. Nos. 4,870,519 and 4,673,996, each being incorporated herein by reference. Geometrical parameters of the FIG. 12A slider are tabulated in Table II.

TABLE II

| Distances | Dimensions |
|---|---|
| A | 0.203 mm |
| B | 1.829 mm |
| C | 1.575 mm |
| P1 | 0.201 mm |
| P2 | 0.201 mm |
| TPC1 | 0.173 mm |
| TPC2 | 0.076 mm |
| TPC3 | 0.196 mm |
| TPC4 | 0.069 mm |
| Depth 1 | 890 nm |
| Depth 2 | 890 nm |
| Depth 3 | 890 nm |
| Depth 4 | 890 nm |

The slider suspension load for the head was 5 grams, and the slider was designed to fly flat at 2µ" using a balanced skew of minus 9 degrees at the innermost inner diameter (ID) and plus 11 degrees at the outer diameter (OD) of the disk in the drive. FIG. 12B shows a theoretical flying height (curve 41) and pitch angle (curve 42) of the slider shown in FIG. 12A. It is seen that flying height is maintained at constant 2µ" across the disk radius for a 95 mm diameter disk. FIG. 12C shows actual measured flying height and pitch angle for three sliders with the design shown in FIG. 12A. The comparable results of the theoretical values in FIG. 12B and experimental values in FIG. 12C indicate that an actual head gimbal assembly having low and constant flying height based on the simple TPC design can be produced for near contact recording.

The flatness variation of flying height from ID to OD of the disk is excellent, as can be seem from Table III, which lists height parameters of three heads, including fhip, fhop, pitch and roll. Flying height at the rear end of the slider at the inside rail 53 is indicated by fhip and at the rear end of the outside rail 54 by fhop. Roll is the difference in flying height of the inside rail and the flying height of the outside rail at the rear end of the slider. Pitch is the flying height of the leading edge of the slider just behind the taper minus the flying height at the rear end of the slider.

TABLE III

| RADIUS | FHIP (µ") | FHOP (µ") | PITCH (µ") | ROLL (µ") |
|---|---|---|---|---|
| 0.8" | 1.97 | 1.93 | 7.85 | 0.05 |
| 1.1" | 2.07 | 2.05 | 9.42 | 0.02 |
| 1.6" | 1.99 | 1.98 | 11.76 | 0.02 |

RPM = 4900  Roll offset = 0.0025"
Gram load = 5.0  Pitch offset = 0.006"

As seen in Table III, a properly designed simple TPC structure can achieve very flat flight across the disk surface with almost negligible roll. If a simple TPC structure can achieve such favorable results and in addition provide satisfactory CSS performance, it would not be logical to use a more complex design for flat flying and control of roll as proposed by Chapin et al., in U.S. Pat. No. 5,128,822. The more complicated solution may never even achieve comparable flat flying and roll performance as shown in Table III for this simpler structure. The TPC slider has a relatively simple design. Although it requires photolithography and etching of the slider ABS, only one step of relatively shallow etching of about 1 µm is needed, so it represents a low cost and practical approach to obtaining low and flat flying characteristics from the slider.

In FIGS. 13A and 13B, CSS results were obtained from sliders with nearly the same design criteria as in FIG. 12A to demonstrate that a low and flat flying TPC design slider can be successfully used with a lightly textured disk having low glide height capability by using simple ABS conditioning on the TPC slider. The disks used in the CSS tests included aluminum/NiP substrates textured using the same process as disk E in Table I, having a RA(high freq.) of 37 Å and RA(low freq.) of 10 Å, a crossing angle of 11 degrees and glide height capability of 1.2µ". Lubricant thickness was 24 Å.

FIG. 13A is a CSS result using a TPC slider without ABS conditioning. The CSS results show rapidly increasing friction and stiction which fluctuated considerably. Friction was initially 7 grams and rose to about 30 grams after 10,000 cycles. The performance indicated wear of the disk overcoat and was not acceptable.

FIG. 13B is a CSS result using a TPC slider which was conditioned by dragging the slider over a conditioning disk having a sputtered $ZrO_2$ overcoat in place of the carbon overcoat of a typical magnetic disk. The conditioning disk was rotated at 250 rpm for 60 minutes, while the slider was placed at a radius of 0.9 inches. The resulting RA(AFM) was 30 Å. The $ZrO_2$ sputtered conditioning disk included a aluminum/NiP substrate textured using the same method as the disk of FIG. 6A but with a large texture cross angle of 120 degrees (the so-called rose pattern). The CSS result in FIG. 13B was excellent, starting at about 4 grams and showed hardly any increase in friction with time, even after about 10,000 cycles. This improvement of CSS due to the higher RA of the slider of FIG. 13B is not only due to the difference in texture cross angle of the conditioning disk, but also because of the heavier gram load on the slider from the flexure during conditioning (5 grams as opposed to 3 grams for FIG. 11C). In addition, the ABS area of FIG. 13B was only half of that of FIG. 11C, as one can discern from the dimensions presented in Table II. Consequently a greater gram load per unit area was applied to the ABS of FIG. 13B during conditioning which resulted in more effective conditioning. Alternatively, an external load in addition to the normal suspension load can be applied to the head during conditioning to reduce the conditioning time on the head.

Comparing the CSS data shown in FIG. 13A to that of FIG. 13B illustrates that similar to the case of non-TPC design sliders, conditioning a TPC slider ABS improves CSS performance, and such improvement in the TPC head may be even more drastic. The reasons for improvement in the TPC head not only involve the removal of debris and creation of texture on the flat portion of ABS 51 (FIG. 12A) (which is also true for non-TPC design heads), but also because TPC head conditioning can reduce the aggressiveness of the sharp corner 52, which could aggravate the wear of the disk surface.

In the TPC slider design (as well as other modified TPC designs used to create a flat flying slider such as described by Chapin et al., in U.S. Pat. No. 5,128,822), the ABS geometry requires a precise step which is on the order of 1 µm deep (see FIG. 12A). To achieve the necessary geometric precision of such a delicate step on the ABS, a complex photolithographic process followed by ion etching and then precision lapping is required. The sequence of processes creates a very sharp corner at the edge of the step which will rub against the disk and severely scrape the disk surface, thereby aggravating the rate of wear, particularly in the presence of a large skew angle during CSS operation. To make matters worse, the sharp corner of the ABS may also contain material damaged by the lapping of the flat area, and abrasive diamond particles used for lapping may be retained at the edge of the step and dislodge during CSS, even further aggravating the rate of wear.

Conventional techniques for smoothing the sharp corners (also known as "blending") such as rubbing the slider back and forth along the direction normal to the length of the ABS on diamond particle embedded tape cannot be applied to round off the sharp corner of the TPC slider because of the precision of the step. The conditioning process however can effectively fine blend the edge of the step and remove the damaged material and embedded particles from the edge area, thereby reducing aggressiveness of wear during CSS. For TPC design heads or Chapin's partial negative pressure ABS design heads which use ion milling to create a fine step, it will be very difficult to pass a CSS test with smoother disks having a very fine texture as required for virtual contact recording without using a good conditioning process.

Conditioning a TPC slider ABS on a $ZrO_2$ overcoat or on a glass ceramic disk would both be effective. However, as mentioned above, glass ceramic allows for penetration of the disk surface to form a groove conforming to the topology of the ABS. Conditioning a slider with glass ceramic is more effective to condition the sharp edge of a TPC step as well as to blend a fine edge than $ZrO_2$.

In conclusion, by combining a very smooth texture disk with glide capability of 1.2μ" and a conditioned TPC slider, a practical 2μ" or lower flying height drive system can be made using an otherwise conventional drive design having a dedicated CSS landing zone. This was achieved without resorting to a complex slider design, e.g. as described by Chapin et al., in U.S. Pat. No. 5,128,822, a radical drive design as suggested by Lemke et al., in U.S. Pat. No. 5,097,368, or ramp loading as suggested by Morehouse et al., in U.S. Pat. No. 4,933,785.

FIG. 14A schematically represents a conventional zone textured disk where a shaded area 55 near the ID represents the landing zone (CSS zone) for the head to land and take off from. For a zone textured disk design, the landing zone is roughened to permit CSS operation, while a data zone 56 is smooth to provide the best surface for the lowest possible flying height and minimum spacing loss. A conventional zone texture disk is shown in cross-section in FIG. 14B to schematically illustrate the relative surface morphology of the CSS zone texture and the data zone texture. As shown in FIG. 14B, conventional CSS zone 55 has a uniform and relatively high roughness texture to provide reliable CSS performance. Because of the relatively rough and uniform texture at CSS zone 55, a clear and discrete step 57 between zone 55 and data zone 56 is created. This step 57, which can be as high as 1 to 2μ" (25 to 50 nm), creates a hurdle which the head must clear as it attempts to swing from CSS zone 55 to data zone 56 after take off from the disk surface at the CSS zone. Clearing the step may become even more difficult if the head is designed to fly very low, such as below 2μ" for near contact recording. This is because for flying heights less than 2μ", the head may fly below the height of the step at full operational linear velocity or disk rpm. In this case the head will have difficulty, or perhaps be incapable of, flying across the step to reach data zone 56.

To eliminate this difficulty, a new type of zone texture is provided having a graded roughness across the CSS zone.

The texture at the innermost radius of the CSS zone in this structure is relatively rough (e.g. for a mechanically textured substrate, a RA(high freq.) of about 60 Å) and then gradually decreases in roughness towards the OD of the CSS zone, as schematically illustrated in FIG. 14C. The gradient of the roughness depends on the minimum texture requirement on the disk with respect to the outer rail of the slider. Thus the portion of the CSS zone where the other rail lands and takes off should have a sufficient roughness to sustain good CSS characteristics for that slider as described above. This graded zone texture without the discrete step, coupled with a conditioned slider having highly textured ABS, eliminates the problem of flying across the CSS zone to the data zone and simultaneously provides reliable CSS performance. This approach can be successful because of the relative insensitivity of the CSS reliability to the disk texture roughness due to the use of a highly conditioned textured head. Consequently, a CSS zone slightly wider than the slider width is sufficient to ensure safe and reliable CSS performance in a minimum area, thereby maximizing valuable data zone space.

In one embodiment, the width of the graded CSS zone is less than about twice the slider width.

From the CSS results shown in FIGS. 9, 10, 11 and 13, it is seen that the conditioned head is gentler to the overcoat surface. Overcoats commonly used today are of high electrical resistivity materials or insulating hydrogenated carbon (see U.S. Pat. No. 5,045,165, issued to Yamashita and incorporated by reference), $ZrO_2$ (see U.S. Pat. Nos. 4,929, 500 and 4,898,774, issued to Yamashita et al., and incorporated by reference), $SiO_2$ or other hard insulating material with a thickness of at least 1μ". This thickness is needed to provide sufficient thickness to the overcoat in order to withstand abrasive wear caused by a conventional head ABS in the CSS zone. This overcoat thickness is also needed to protect the underlying metallic film from corrosion, particularly at the deepest crevices of the rough texture lines where it is more difficult to deposit the overcoat layer and therefore considerably less than the intended 1μ" of coverage is present to completely cover the metallic film at the crevices. The gentler conditioned head and shallower textured disks of the system of this invention permits a significant reduction of the overcoat thickness and therefore decreased space loss, as described earlier. Consequently, an overcoat of 150 Å or less would suffice.

As mentioned above, the RA for a disk containing a textured aluminum/NiP substrate in accordance with our invention is usually somewhat greater than the RA for a disk containing a glass substrate in accordance with our invention. The reason for this is that the RA represents a roughness average. Because aluminum/NiP substrates are generally mechanically textured, they include abnormal deep gouge regions, and the RA of the gouge regions is averaged into the RA of the disk as a whole. Although chemically textured substrates have bumps known as "linkage bumps" (see the above-incorporated U.S. Pat. No. 5,087,481, issued to Chen et al), such bumps are fewer and less severe than the gouges in a mechanically textured disk. Thus, a chemically textured substrate of a certain effective roughness (or a substrate textured by forming sputtered bumps or other non-mechanical texturing method) will have a lower RA than a mechanically textured substrate of the same effective roughness (because the RA of the mechanically textured substrate will reflect gouges not present in the chemically textured substrate).

Although disks having aluminum/NiP and glass substrates have been described above, in other embodiments alternative materials such as ceramic or carbon substrates are used. Also, although the texture used in the alternative materials may differ from aluminum/NiP substrates, a certain amount of roughness is still required on the disk surface in order to provide good CSS performance and avoid stiction. In order to reduce flying height, the texture roughness must still be reduced significantly in the same manner as described for aluminum/NiP substrates. Thus, the trade-off that is necessary between the disk roughness and the slider ABS roughness still applies to textures formed in alternative substrate materials.

While the present invention has been described in detail with reference to specific embodiments, modifications and changes while obvious to those skilled in the art which can be employed without departing from the spirit and scope of the invention. For example, although many of the above examples discuss a slider RA(AFM) less than about 150 Å, sliders having a RA(AFM) greater than 150 Å can be used. Also the invention can be practiced with other slider materials, e.g. those disclosed in U.S. patent application Ser. No. 07/957,535. In one embodiment, the slider preferably includes a matrix of at least two phases which are damaged to different extents during lapping. Also, materials other than $ZrO_2$ or glass ceramic surfaces can be used to condition the sliders. (Again, see, for example, U.S. patent application Ser. No. 07/957,535.) These conditioning surfaces need not be disk shaped. Also, instead of having disk-shaped media, other shapes can be used, e.g. a drum. Accordingly, all such modifications and changes come within the present invention.

We claim:

1. A hard disk drive system comprising:
a magnetic disk having a texture roughness RA(high freq.) greater than or equal to about 10 Å and less than or equal to about 60 Å; and
a read-write head comprising a ceramic slider comprising at least two phases, said slider being manufactured by being subjected to a first manufacturing step which introduces damage into the slider material at a surface of said slider by lapping said surface with hard abrasive particles, the damaged slider material being mechanically weaker than slider material that is not damaged, and a second manufacturing step wherein the damage at said surface of said slider is mechanically selectively removed by rubbing said surface of said slider against a treatment surface, thereby substantially preventing slider material from dislodging from said slider during use, and thereby leaving irregular texture pattern features on said surface of said slider, said features having walls at irregular and non-uniform angles, said surface of said slider being rougher and less abrasive to the disk after said second manufacturing step than before said second manufacturing step, said surface of said slider serving as an air bearing surface and having an air bearing surface roughness RA(AFM) less than or equal to about 150 Å, said surface of said slider being sufficiently textured so that said read-write head can be used in conjunction with said magnetic disk.

2. System of claim 1 wherein said damaged material is substantially completely removed from the air bearing surface of said slider.

3. System of claim 1 in which the slider air bearing surface roughness RA(AFM) is greater than or equal to about 20 Å.

4. System of claim 3 wherein said an air bearing surface roughness RA(AFM) is greater than about 50 Å.

5. System of claim 1 wherein said disk is mechanically textured.

6. System of claim 1 wherein said disk comprises a substrate textured by chemical texturing or by deposition of bumps on said substrate, said disk having a texture roughness RA(high freq.) less than about 50 Å.

7. System of claim 6 wherein said deposition of bumps is accomplished by sputtering.

8. System of claim 1 wherein said disk comprises a substrate textured by chemical texturing or by vacuum deposition of bumps on said substrate.

9. System as in claim 1 wherein said disk comprises a substrate made of a material selected from a group consisting of glass, ceramic and carbon.

10. System of claim 1 wherein said ceramic slider comprises one or more materials selected from a group consisting of $CaTiO_3$, MnZn, ferrite and yttria-stabilized $ZrO_2$.

11. System of claim 1 wherein said two phases are of different mechanical strength and are damaged to different extents during said first manufacturing step.

12. System of claim 1 wherein at least one step is formed in said slider adjacent said air bearing surface and wherein said second manufacturing step comprises rubbing said slider against glass ceramic, thereby blending the corner of the step.

13. System as in claim 1 wherein said second manufacturing step comprises rubbing said slider against glass ceramic material comprising MgO, ZnO, $TiO_2$, $Al_2O_3$, $B_2O_3$, CaO and $SiO_2$ to obtain a texture on the slider air bearing surface RA(AFM) greater than about 50 Å.

14. System of claim 1 wherein said at least two phases have different chemical compositions, and wherein said damage at said surface of said slider is mechanically preferentially removed without further damaging slider material at said surface.

15. System of claim 1 wherein said second manufacturing step does not introduce further damage into said slider material.

16. A disk drive system comprising:
a magnetic disk including a substrate having a texture roughness RA(high freq.) greater than or equal to about 10 Å and less than or equal to about 50 Å; and
a read-write head comprising a ceramic slider comprising at least two phases, said slider being manufactured by being subjected to a first manufacturing step which introduces damage into the slider material at a surface of said slider by lapping said surface with hard abrasive particles, the damaged slider material being mechanically weaker than slider material that is not damaged, and a second manufacturing step wherein the damage at said surface of said slider is mechanically selectively removed by rubbing said surface of said slider against a treatment surface, thereby substantially preventing slider material from dislodging from said slider during use, and thereby leaving irregular texture pattern features on the surface of the slider, said features having walls at irregular and non-uniform angles, said surface of said slider being rougher and less abrasive to the disk after said second manufacturing step than before said second manufacturing step, said surface of said slider serving as an air bearing surface and having a roughness RA(AFM) of at least 20 Å but less than or equal to about 150 Å, wherein said disk is sufficiently smooth that said read-write head can fly reliably at about 2μ" without striking asperities on said disk.

17. System of claim 16 wherein said substrate has a concentric texture pattern, said head flying at near constant flying height across the disk during use, said system exhibiting an initial stiction coefficient of about 1.0 or less between said air bearing surface and said disk, the friction coefficient between said head and disk being less than about 2.0 after 20,000 CSS cycles during normal operation.

18. System of claim 17 wherein said read-write head comprises a transverse pressure contour slider.

19. System of claim 17 wherein said read-write head comprises a cross-cut slider.

20. System of claim 16 wherein said second manufacturing step does not introduce further damage into said slider material.

21. A disk drive system comprising:
a magnetic disk including an aluminum/NiP substrate having a concentric texture roughness RA(high freq.) greater than about 10 Å and less than about 50 Å; and
a read-write head comprising a ceramic slider comprising at least two phases, said slider being manufactured by being subjected to a first manufacturing step which introduces damage into the slider material at a surface of said slider by lapping said surface with hard abrasive particles, the damaged slider material being mechanically weaker than slider material that is not damaged, and a second manufacturing step wherein the damage at said surface of said slider is mechanically selectively removed by rubbing said surface of said slider against a treatment surface, thereby substantially preventing slider material from dislodging from said slider during use, and thereby leaving irregular texture pattern features on said surface of said slider, said features having walls at irregular and non-uniform angles, said surface of said slider being rougher and less abrasive to the disk after said second manufacturing step than before said second manufacturing step, said surface of said slider serving as an air bearing surface and having a roughness RA(AFM) greater than or equal to about 20 Å and less than or equal to about 150 Å, wherein said disk is sufficiently smooth that said read-write head can reliably fly at about 2μ" above said disk, said read-write head flying at near constant flying height across the disk during use, said system exhibiting an initial stiction coefficient of about 1.0 or less between said air bearing surface and said disk, the friction coefficient between said head and said disk being less than about 2.0 after 20,000 start stop cycles during normal use.

22. System of claim 21 wherein said second manufacturing step does not introduce further damage into said slider material.

23. A memory device comprising:
a magnetic disk having a first surface region, said first surface region having a texture roughness RA(high freq.) greater than or equal to about 10 Å and less than or equal to about 60 Å;
a read-write head comprising a ceramic slider comprising at least two phases, said slider being manufactured by being subjected to a first manufacturing step which introduces damage into the slider material at a surface of said slider by lapping said surface with hard abrasive particles, the damaged slider material being mechanically weaker than slider material which is not damaged, and a second manufacturing step wherein the damage at said surface of said slider is mechanically selectively removed by rubbing said surface of said slider against a treatment surface, thereby substantially preventing slider material from dislodging from said slider during use, and thereby leaving irregular texture pattern features on the surface of the slider, said features having walls at irregular and non-uniform angles, said surface of said slider being rougher and less abrasive to the disk after said second manufacturing step than before said second manufacturing step, said surface of said slider serving as an air bearing surface and having an air bearing surface roughness RA(AFM) greater than or equal to about 20 Å and less than or equal to about 150 Å; and
means for holding said read-write head in proximity to said disk so that said read-write head can read data from and write data to said disk.

24. Device of claim 23 wherein said head can fly in a glide height test about 1.2μ" from said disk during use without striking said disk.

25. Device of claim 24 wherein said head comprises a slider having a pair of rails separated by a recess, and wherein transverse pressure contours are formed in said rails.

26. Device of claim 23 wherein said disk is mechanically textured.

27. Device of claim 23 wherein said disk has a texture roughness RA(high freq.) between about 40 Å and 60 Å and said air bearing surface has a an air bearing surface roughness RA(AFM) between about 20 Å and 50 Å.

28. Device of claim 23 wherein said disk has a texture roughness RA(high freq.) between about 30 Å and 50 Å and an air bearing surface roughness has RA(AFM) between about 50 Å and 75 Å.

29. Device of claim 23 wherein said disk has texture roughness RA(high freq.) between about 20 Å and 30 Å and said air bearing surface roughness has RA(AFM) between about 75 Å and 150 Å.

30. Device of claim 23 wherein said second manufacturing step does not introduce further damage into said slider material.

31. A memory device comprising:
a magnetic disk having a first surface region, said first surface region having a texture roughness RA(high freq.) greater than or equal to about 10 Å and less than or equal to about 50 Å;
a read-write head comprising a ceramic slider comprising at least two phases, said slider being manufactured by being subjected to a first manufacturing step which introduces damage into the slider material at a surface of said slider by lapping said surface with hard abrasive particles, the damaged slider material being mechanically weaker than slider material that is not damaged, and a second manufacturing step wherein the damage at said surface of said slider is mechanically selectively removed by rubbing said surface of said slider against a treatment surface, thereby substantially preventing slider material from dislodging from said slider during use, and thereby leaving irregular texture pattern features on said surface of said slider, said features having walls at irregular and non-uniform angles, said surface of said slider being rougher and less abrasive to the disk after said second manufacturing step than before said second manufacturing step, said surface of said slider serving as an air bearing surface and having an air bearing surface roughness RA(AFM) greater than or equal to about 20 Å and less than or equal to about 150 Å; and
means for holding said read-write head in proximity to said disk so that said read-write head can read data from and write data to said disk.

32. Device of claim 31 wherein said disk is either chemically textured or textured by deposition of bumps on said disk.

33. Device of claim 31 wherein said air bearing surface has an air bearing surface roughness RA(AFM) between about 20 Å and 50 Å and said disk has a texture roughness RA(high freq.) between about 20 Å and 50 Å.

34. Device of claim 31 wherein said air bearing surface has an air bearing surface roughness RA(AFM) between about 50 Å and 75 Å and said disk has a texture roughness RA(high freq.) between about 20 Å and 30 Å.

35. Device of claim 31 wherein said air bearing surface has an air bearing surface roughness RA(AFM) between 75 Å and 150 Å and said disk has a texture roughness RA(high freq.) between 10 Å and 20 Å.

36. Device of claim 31 wherein said disk has a smoothness such that said head can reliably fly above said disk at a height of about 2μ".

37. Device of claim 31 wherein said first surface region comprises a take-off and land zone, said disk also comprising a data zone that is smoother than said take-off and land zone.

38. Device of claim 31 wherein said read-write head flies at substantially the same flying height during use, independent of how far from the center of the disk the read-write head is flying.

39. Device of claim 31 further comprising a plurality of tracks on the disk, including an innermost track and an outermost track, and wherein the flying height of the slider does not vary by more than 0.5 μm as the slider moves from the innermost track on the disk to the outermost track on the disk.

40. Device of claim 31 wherein said second manufacturing step does not introduce further damage into said slider material.

41. A disk drive system comprising:
a read-write head comprising a ceramic slider comprising at least two phases, said slider being manufactured by being subjected to a first manufacturing step which introduces damage into the slider material at a surface of said slider by lapping said surface with hard abrasive particles, the damaged slider material being mechanically weaker than slider material that is not damaged, and a second manufacturing step wherein the damage at said surface of said slider is mechanically selectively removed by rubbing said surface of said slider against a treatment surface, thereby substantially preventing slider material from dislodging from said slider during use, and thereby leaving irregular texture pattern features on said surface of said slider, said features having walls at irregular and non-uniform angles, said surface of said slider being rougher and less abrasive to a disk of said system after said second manufacturing step than before said second manufacturing step, said surface of said slider serving as an air bearing surface and having an air bearing surface roughness RA(AFM) greater than or equal to about 20 Å and less than or equal to about 150 Å; and
a disk having a data zone and a contact start stop zone, the data zone having a texture roughness RA(high freq.) and texture roughness RA(low freq.) less than or equal to about 10 Å, said contact start stop zone having a region in which the texture roughness RA(high freq.) is greater than or equal to about 10 Å and less than or equal to about 50 Å.

42. A hard disk drive system comprising:
a magnetic disk; and
a read-write head comprising a ceramic slider comprising at least two phases, said slider being manufactured by being subjected to a first manufacturing step which introduces damage into the slider material at an air bearing surface of said slider by lapping said air bearing surface with hard abrasive particles, the damaged slider material being mechanically weaker than slider material that is not damaged, and a second manufacturing step wherein the damage is mechanically removed by rubbing said air bearing surface against a treatment surface, thereby substantially preventing slider material from dislodging from said slider during use, and thereby leaving irregular texture pattern features on said air bearing surface of said slider, said features having walls at irregular and non-uniform angles, said air bearing surface of said slider being rougher and less abrasive to the disk after said second manufacturing step than before said second manufacturing step, said magnetic disk being smooth enough to permit said read-write head to reliably fly at about 2μ" above said disk but having a texture roughness RA(high freq.) greater than or equal to about 10 Å, said air bearing surface of said slider being sufficiently textured so that said slider can be used in conjunction with said magnetic disk.

43. A hard disk drive system comprising:
a magnetic disk; and
a read-write head comprising a ceramic slider comprising at least two phases, said slider being manufactured by being subjected to a first manufacturing step which introduces damage into the slider material at an air bearing surface of said slider by lapping said air bearing surface with hard abrasive particles, the damaged slider material being mechanically weaker than slider material that is not damaged, and a second manufacturing step wherein the damage at said air bearing surface of said slider is mechanically selectively removed by rubbing said air bearing surface against a treatment surface, thereby substantially preventing slider material from dislodging from said slider during use, and thereby leaving irregular texture pattern features on the air bearing surface of the slider, said features having walls at irregular and non-uniform angles, said air bearing surface of said slider being rougher and less abrasive to the disk after said second manufacturing step than before said second manufacturing step, said disk being smooth enough to enable said slider to pass a glide height test at about 1.2μ" above said disk but having a texture roughness RA(high freq.) greater than or equal to 10 Å, said air bearing surface of said slider being sufficiently textured so that said slider can be used in conjunction with said magnetic disk.

44. A hard disk drive system comprising:
a magnetic disk including a substrate having a texture roughness RA(high freq.) greater than or equal to about 10 Å but less than or equal to about 60 Å; and
a read-write head comprising a ceramic slider comprising at least two phases, said slider being manufactured by being subjected to a first manufacturing step which introduces damage into the slider material by lapping a surface said slider with hard abrasive particles, the damaged slider-material being mechanically weaker than slider material that is not damaged, and a second manufacturing step wherein the damage is mechanically removed by rubbing said surface of said slider against a treatment surface, thereby leaving irregular texture pattern features on the surface of the slider, the walls of said features being at irregular and non-uniform angles, said surface of said slider serving as an air bearing surface and being rougher and less abrasive to the disk after said second manufacturing step than before said second manufacturing step, said air bearing surface having a roughness RA(AFM) of at least about 20 Å and less than or equal to about 150 Å, said disk being sufficiently smooth to enable said read-write head to pass a glide height test with said disk at a height of about 1.2μ".

45. A hard disk drive system comprising:

a magnetic disk having a texture roughness RA(high freq.) greater than or equal to about 10 Å and less than or equal to about 60 Å; and a thin film read-write head comprising a ceramic slider, said slider being manufactured by being subjected to a first manufacturing step which introduces damage into the slider material at an air bearing surface of said slider by lapping said air bearing surface with hard abrasive particles, the damaged slider material being mechanically weaker than the slider material which is not damaged, and a second manufacturing step wherein the damage at said air bearing surface of said slider is mechanically selectively removed by rubbing said air bearing surface against a treatment surface, thereby substantially preventing slider material from dislodging from said slider during use, and thereby leaving irregular texture pattern features on the surface of the slider, said features having walls at irregular and non-uniform angles, said air bearing surface of said slider being rougher and less abrasive to the disk after said second manufacturing step than before said second manufacturing step, said air bearing surface of said slider having an air bearing surface roughness RA(AFM) less than or equal to about 150 Å, said air bearing surface of said slider being sufficiently textured so that it can be used in conjunction with said magnetic disk.

46. A disk drive system comprising:

a magnetic disk including a substrate having a texture roughness texture roughness RA(high freq.) greater than or equal to about 10 Å and less than or equal to about 50 Å; and a thin film read-write head comprising a ceramic slider, said slider being manufactured by being subjected to a first manufacturing step which introduces damage into the slider material at a surface of said slider by lapping said slider with hard abrasive particles, the damaged slider material being mechanically weaker than the slider material that is not damaged, and a second manufacturing step wherein the damage at said surface of said slider is mechanically selectively removed by rubbing said slider against a treatment surface, thereby substantially preventing slider material from dislodging from said slider during use, and thereby leaving irregular texture pattern features on the surface of the slider, said features having walls at irregular and non-uniform angles, said surface of said slider being rougher and less abrasive to the disk after said second manufacturing step than before said second manufacturing step, said surface of said slider serving as an air bearing surface and having a roughness an air bearing surface roughness RA(AFM) of at least 20 Å but less than or equal to about 150 Å, wherein said disk is sufficiently smooth that said read-write head can fly reliably at about 2μ" without striking asperities on said disk.

47. A memory device comprising:

a magnetic disk having a first surface region, said first surface region having a texture roughness RA(high freq.) greater than or equal to about 10 Å and less than or equal to about 60 Å;

a thin film read-write head comprising a ceramic slider, said slider being manufactured by being subjected to a first manufacturing step which introduces damage into the slider material at a surface of said slider by tapping said surface with hard abrasive particles, the damaged slider material being mechanically weaker than the slider material which is not damaged, and a second manufacturing step wherein the damage at said surface of said slider is mechanically selectively removed by rubbing said surface of said slider against a treatment surface, thereby substantially preventing slider material from dislodging from said slider during use, and thereby leaving irregular texture pattern features on said surface of said slider, said features having walls at irregular and non-uniform angles, said surface of said slider being rougher and less abrasive to the disk after said second manufacturing step than before said second manufacturing step, said surface of said slider serving as an air bearing surface and having an air bearing surface roughness RA(AFM) greater than or equal to about 20 Å and less than or equal to about 150 Å; and means for holding said read-write head in proximity to said disk so that said read-write head can read data from and write data to said disk.

48. Device of claim 47 wherein said disk also comprises a data zone region having a texture roughness RA(high freq.) and texture roughness RA(low freq.) less than or equal to about 10 Å.

49. A hard disk drive system comprising:

a magnetic disk; and a thin film read-write head comprising a ceramic slider, said slider being manufactured by being subjected to a first manufacturing step which introduces damage into the slider material at an air bearing surface of said slider by lapping said air bearing surface with hard abrasive particles, the damaged slider material being mechanically weaker than slider material which is not mechanically damaged, and a second manufacturing step wherein the damage at said air bearing surface of said slider is mechanically selectively removed by rubbing said air bearing surface of said slider against a treatment surface, thereby substantially preventing slider material from dislodging from said slider during use, and thereby leaving irregular texture pattern features on the air bearing surface of the slider, said features having walls at irregular and non-uniform angles, said air bearing surface of said slider being rougher and less abrasive to the disk after said second manufacturing step than before said second manufacturing step, said magnetic disk being smooth enough to permit said read-write head to reliably fly at about 2μ" above said disk but having a texture roughness RA(high freq.) greater than or equal to about 10 Å, said air bearing surface of said slider being sufficiently textured so that said slider can be used in conjunction with said magnetic disk.

50. A hard disk drive system comprising:

a magnetic disk including a substrate having a texture roughness RA(high freq.) greater than or equal to about 10 Å but less than or equal to about 60 Å; and a read-write head comprising a ceramic slider, said slider being manufactured by being subjected to a first manufacturing step which introduces damage into the slider material at an air bearing surface of said slider by lapping said air bearing surface with hard abrasive particles, the damaged slider material being mechanically weaker than slider material which is not damaged, and a second manufacturing step wherein the damage at said air bearing surface of said slider is mechanically selectively removed by rubbing said air bearing surface of said slider against a treatment surface, thereby substantially preventing slider material from dislodging from said slider during use, and thereby leaving irregular texture pattern features on the air bearing surface of the slider, said features having walls at irregular and non-uniform angles, said air bearing surface of said slider being rougher and less abrasive to the disk after said second manufacturing step than before said second manufacturing step, said air bearing surface of said slider having a roughness RA(AFM) of at least about 20 Å and less than or equal to about 150 Å, said disk being sufficiently smooth to enable said read-write head to pass a glide height test with said disk at a height of about 1.2μ".

51. System of claim 50 wherein said read-write head comprises a magneto-resistive read head.

52. A hard disk drive system comprising:
a magnetic disk having a texture roughness RA(high freq.) greater than or equal to about 10 Å and less than or equal to about 60 Å; and
a read-write head comprising a slider manufactured by being subjected to a first manufacturing step which introduces damage into the slider material at a surface of said slider by lapping said surface with hard abrasive particles, the damaged slider material being mechanically weaker than the slider material which is not damaged, and a second manufacturing step wherein the damage at said surface of said slider is mechanically selectively removed by rubbing said surface of said slider against a treatment surface, thereby substantially preventing slider material from dislodging from said slider during use and thereby leaving irregular texture pattern features on said surface of said slider, said features having walls at irregular and non-uniform angles, said surface of said slider being rougher and less abrasive to the disk after said second manufacturing step than before said second manufacturing step, said surface of said slider serving as an air bearing surface and having an air bearing surface roughness RA(AFM) between about 20 Å and 150 Å.

* * * * *

UNITED STATES PATENT AND TRADEMARK OFFICE
CERTIFICATE OF CORRECTION

PATENT NO.    : 5,673,156
DATED         : Sep. 30, 1997
INVENTOR(S)   : Chen, Tu; Yamashita, Tsutomu T.; Lee, Kyou H.; Sakane, Yasuo It is certified that error appears in the above-identified patent and that said Letters Patent is hereby corrected as shown below:

Col. 32, line 15 after "MnZn," insert --NiZn--.

Signed and Sealed this

Fourteenth Day of July, 1998

Attest:

BRUCE LEHMAN

*Attesting Officer*    *Commissioner of Patents and Trademarks*